United States Patent [19]

Shefchunas

[11] Patent Number: 5,607,307
[45] Date of Patent: Mar. 4, 1997

[54] INSTRUCTIONAL APPARATUS FOR SIMULATING THE OPERATION OF AN AIRCRAFT

[76] Inventor: Thomas E. Shefchunas, 112 Edwin Cir., Franklin, Pa. 16323

[21] Appl. No.: 495,354

[22] Filed: Jun. 27, 1995

[51] Int. Cl.$^6$ .............................. G09B 9/16; G09B 9/20
[52] U.S. Cl. ................................. 434/30; 434/49
[58] Field of Search .................. 434/30, 32, 35, 434/37, 45, 49

[56] References Cited

U.S. PATENT DOCUMENTS

| D. 148,800 | 2/1948 | Laughead | 434/32 |
|---|---|---|---|
| 1,876,418 | 9/1932 | Holst . | |
| 2,331,304 | 10/1943 | Carmody . | |
| 2,428,706 | 10/1947 | Hardell | 434/32 |
| 2,495,709 | 1/1950 | Drown et al. | 235/61 |
| 2,584,113 | 2/1952 | Butler . | |
| 2,935,796 | 5/1960 | Hunt | 434/49 |
| 3,471,942 | 10/1969 | Wieitzman et al. | 434/49 |
| 3,680,230 | 8/1972 | Thompson | 434/30 |
| 3,702,504 | 11/1972 | Cramer | 434/49 |
| 3,886,334 | 5/1975 | Cummings et al. | 434/30 |
| 4,269,596 | 5/1981 | D'Andrade | 434/32 |

OTHER PUBLICATIONS

Michael A. Argentieri, *Flying Angle of Attack Can Help Pilots Make Safer, Easier Landings*, Aero, Jan., 1978.
Bud Corban, *Should You Fly By Angle-of-Attack Indicator?*, Avionics—Reprinted from *Plane & Pilot*, Feb., 1981.

Navweps 00–80T–80 *Application of Aerodynamics To Specific Problems of Flying*, pp. 350–353, Revised Jan., 1965.

Navweps 00–80T–80, *Basic Aerodynamics*, pp. 22–27 and 63–67, Revised Jan., 1965.

Richard D. Gless, Paul Bray, *Avoiding The Stall/Spin Accident*, AOPA Air Safety Foundation, pp. 1–12, 1991.

FAA, Flight Training Handbook AC61–21A, pp. 257–270, publication date unknown.

*Primary Examiner*—Paul J. Hirsch
*Attorney, Agent, or Firm*—Kirkpatrick & Lockhart LLP

[57] ABSTRACT

An instructional model. The model, in a preferred form, includes an indicator member that represents the instantaneous flight path of an aircraft. The indicator member has indica thereon that represents a range of attack angles at which the aircraft could fly relative to the instantaneous flight path. The indicator member also has indicia thereon that represents the center of pressure acting on the aircraft when flying at a selected attack angle. A second member that represents an aircraft is pivotally attached to the indicator member such that it can be selectively pivoted relative to the indicator member to an attack angle such that the center of pressure indicia identifies a point on the second member which represents a corresponding point on the aircraft at which the center of pressure forces are applied thereto when flying at that selected attack angle.

9 Claims, 54 Drawing Sheets

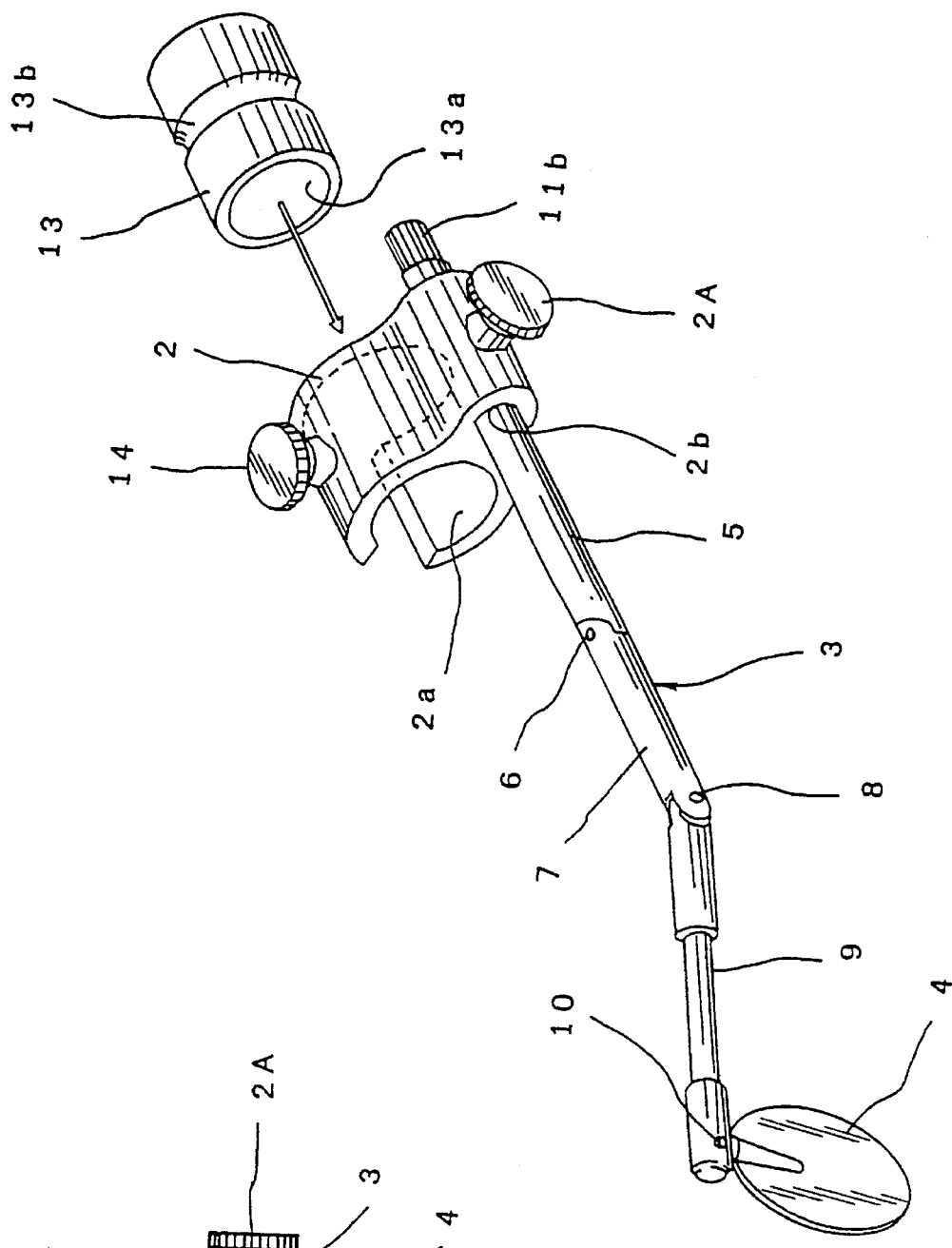
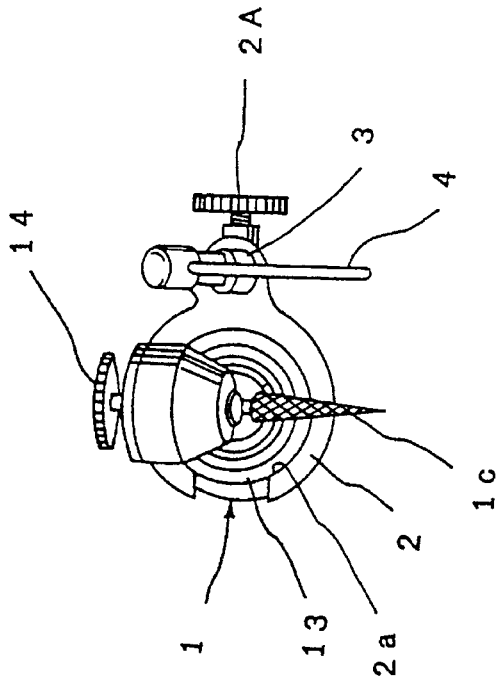

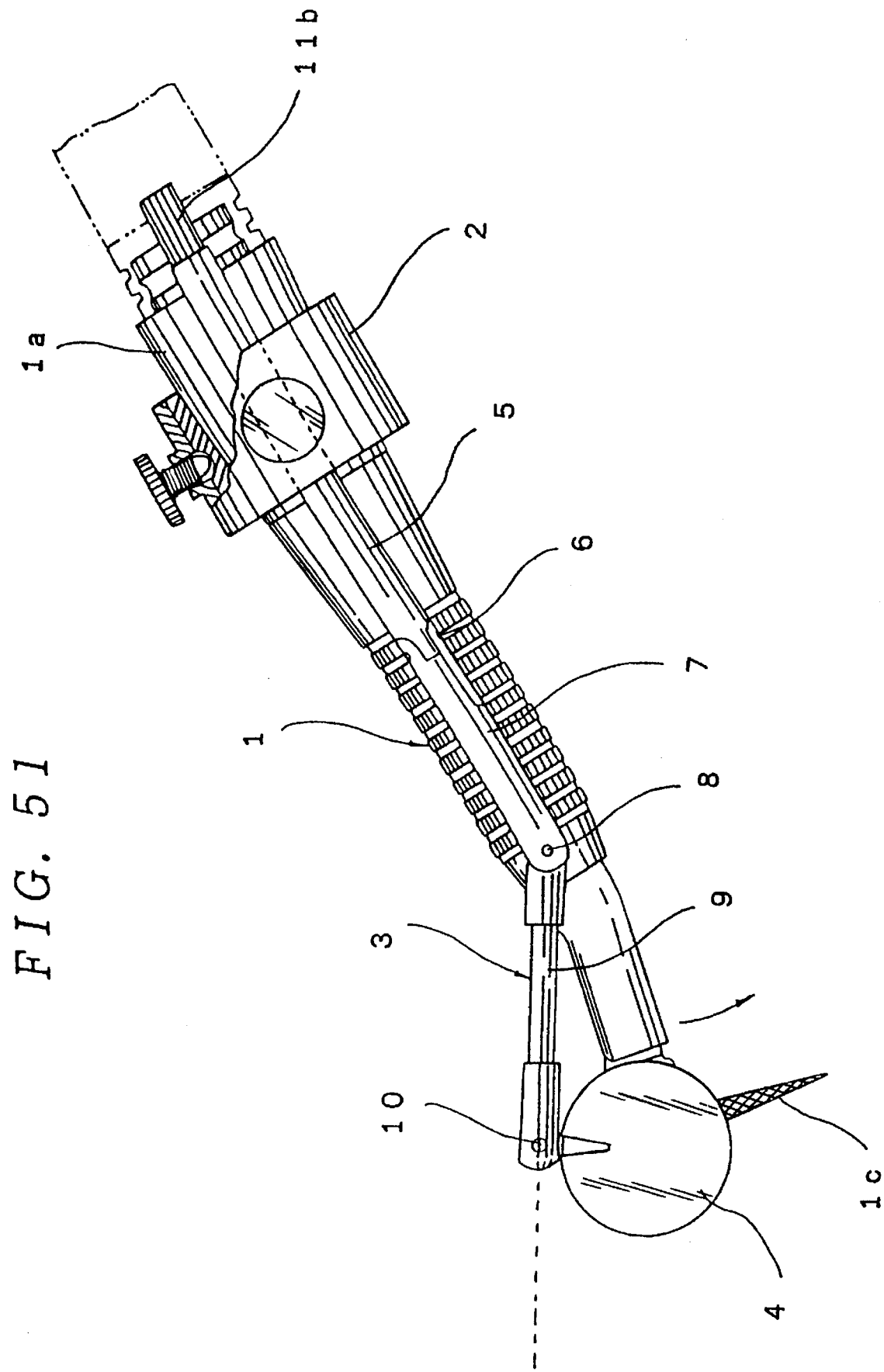

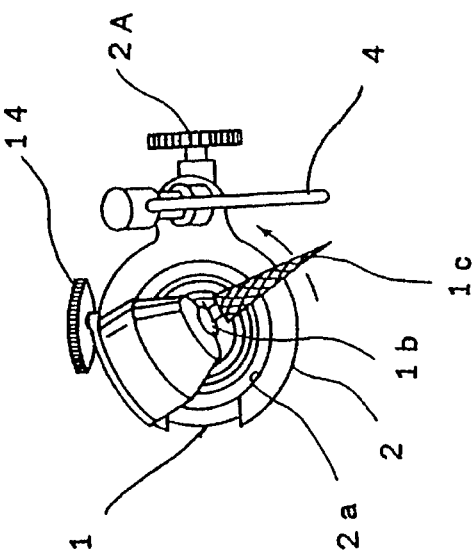
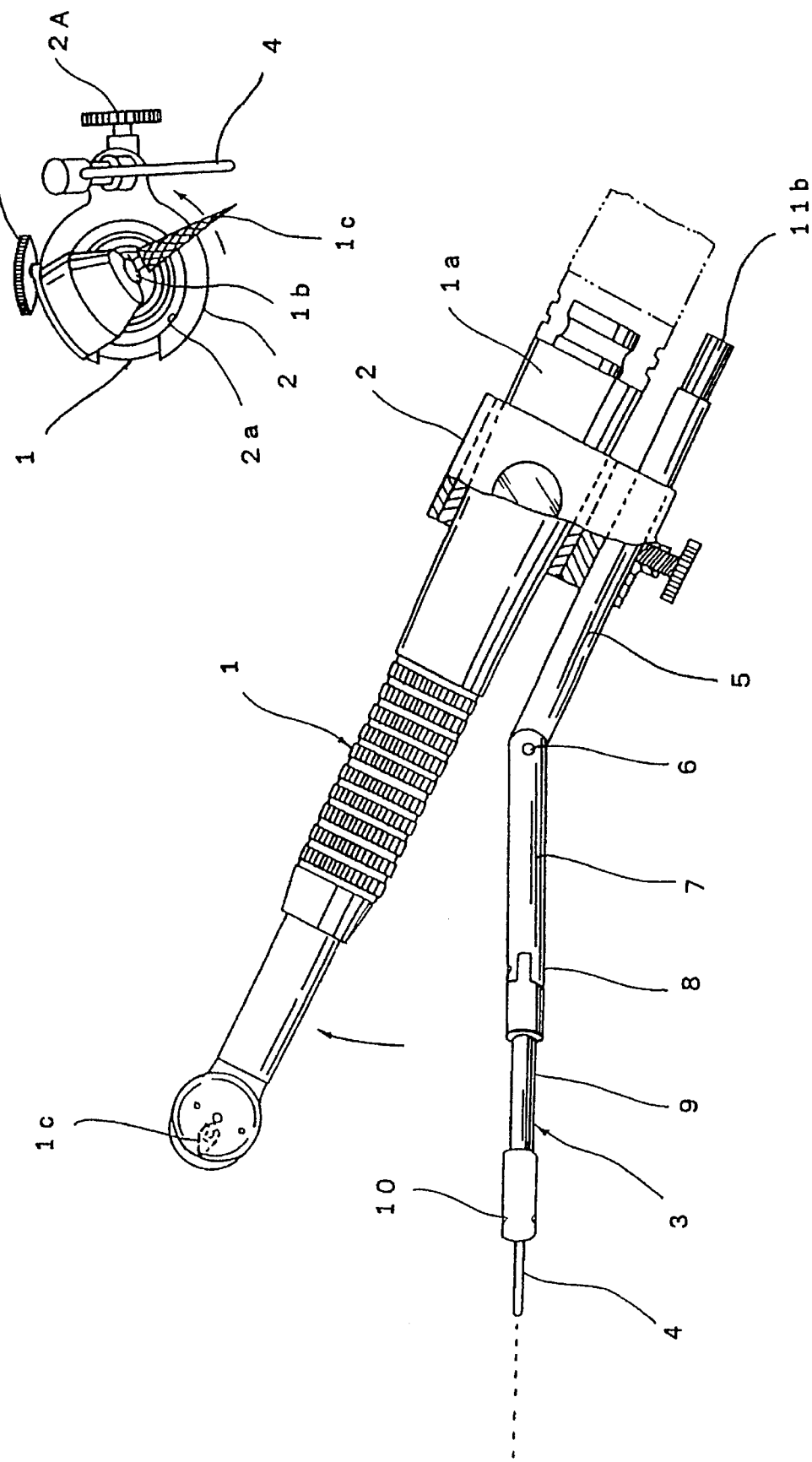
FIG. 53
FIG. 52

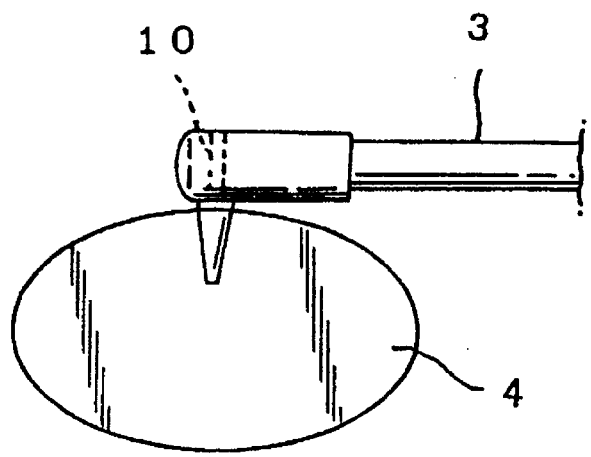
F I G. 62A
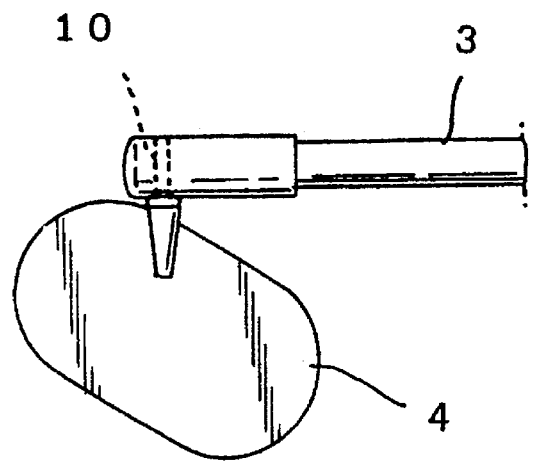
F I G. 62B
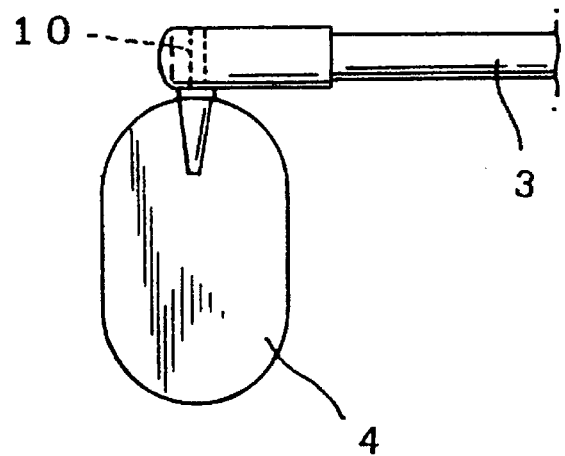
F I G. 62C

INSTRUCTIONAL APPARATUS FOR SIMULATING THE OPERATION OF AN AIRCRAFT

BACKGROUND OF THE INVENTION

1. Field of the Invention

The present invention relates to instructional devices and, more particularly, is directed to apparatus for demonstrating the operation of an aircraft.

2. Description of the Invention Background

Today, prospective airplane pilots must undertake a rather extensive study of the principles of flight and log a number of hours in the air under the watchful eye of a flight instructor before they can be licensed to fly airplanes. Such study involves acquiring a basic understanding of the aerodynamic theory relating to wings and airfoils.

Aircraft wings are constructed so as to take advantage of certain physical principles. Perhaps the single most important wing characteristic that determines its continued flight is its "angle of attack". A wing's angle of attack is the angle between the "relative wind" and the wing's "chord line". The relative wind is the direction of airflow with respect to an aircraft's wings as it moves through the air. The aircraft's "instantaneous flight path" determines the direction of the relative wind. A wing's chord line is a reference line that extends from the wing's leading edge to its trailing edge. By changing an aircraft's angle of attack, the pilot can control the lift, airspeed and drag experienced by the aircraft. Even the total load supported in flight by the wing may be modified by variations in the angle of attack and, when coordinated with power changes and manipulation of auxiliary devices such as flaps, slats, etc., is the essence of airplane control.

Tests conducted in wind tunnels have shown that, as air flows along the surface of a wing at different angles of attack, areas of negative pressure and areas of positive pressure are created along the wing's surfaces. As the angle of attack changes, so does the various pressure distribution characteristics. Wing designers total these positive and negative forces created by these areas of pressure to obtain a resultant force on the wing for a particular angle of attack. The point of application of this resultant force is known as the "center of pressure". For any given angle of attack, the center of pressure is the point where the resultant force crosses the wing's chord line. Thus, if the designer could locate the wing so that its center of pressure was always at the aircraft's center of gravity (i.e., a point on the aircraft at which all of its weight is concentrated such that the aircraft could be balanced thereon), the aircraft would always be balanced. This is not possible, however, because the location of the center of pressure changes with the wing's angle of attack.

In an airplane's normal range of flight attitudes, the center of pressure moves forward as the angle of attack increases. As the angle of attack decreases, the center of pressure moves rearwardly. Because the center of gravity for an unloaded aircraft is fixed, the forward movement of the center of pressure as a result of an increase in the angle of attack tends to raise the nose of the aircraft and causes the angle of attack to increase even more. Conversely, if the angle of attack is decreased, the center of pressure moves rearwardly and tends to decrease the angle a greater amount. As such, it is evident that an ordinary aircraft wing is inherently unstable and that an auxiliary device, such as the horizontal tail surface must be added to enable the aircraft to balance longitudinally.

Thus, the balance of an aircraft depends on the relative position of the aircraft's center of gravity and the center of pressure on the aircraft's wings. Moreover, aircraft loading and weight distribution affect the aircraft's center of gravity and, thus, affect the balance of the aircraft. Accordingly, a pilot must have a good understanding of the relationship between the angle of attack, the center of pressure and the center of gravity in order to keep the aircraft stable.

Pilots must also have an understanding of how the aircraft's angle of attack and the aircraft's velocity relate to the lift forces created on the wings of the aircraft. In particular, if an aircraft is traveling at a constant velocity and the aircraft's angle of attack is increased, the aircraft will climb. Similarly, if the angle of attack is maintained constant and the aircraft's velocity is increased, the aircraft will climb. Therefore, to maintain the aircraft in a state of equilibrium, as velocity is increased, the lift forces must be decreased by decreasing the angle of attack. Similarly, if the aircraft's velocity is decreased, the angle of attack must be increased to keep the aircraft flying level.

Aircraft designers calculate recommended air speeds for every angle of attack, based on a standard set of parameters regarding aircraft weight and loading distribution and various atmospheric conditions such as air temperature and humidity. The designers also calculate the maximum angle of attack the aircraft can assume, based on those parameters, without ceasing to fly. These recommended flying parameters are set forth in materials that the pilot typically takes aboard with him while flying the aircraft. Of course, on days wherein the atmospheric conditions vary from the atmospheric conditions upon which such calculations were based, the pilot must make the necessary adjustments, often instantaneously, to keep the aircraft flying. Thus, it becomes even more evident why a pilot must have a thorough understanding of how an aircraft's angle of attack affects its ability to fly.

Another reason why pilots must have a thorough understanding of the effects brought about by changes in an aircraft's angle of attack, is centered around a pilot's inability to perceive such changes. For example, due to such imperceivable changes, a pilot could be flying at an angle of attack that is dangerously close to the aircraft's stall angle.

In an effort to provide pilots with an instantaneous indication of the aircraft's angle of attack, various automatic angle of attack indicators have been developed and are being used on some aircraft; however, angle of attack indicators are not, to date, standard equipment on every aircraft. Some individuals have postulated that the reason for not having angle of attack indicators on every aircraft centers around pilot ignorance. That is, the current methods and models used to educate pilots fail to provide pilots with an adequate appreciation and understanding of the relationships between an aircraft's angle of attack, loading and load distribution characteristics and center of pressure.

For example, U.S. Pat. No. 1,876,418 to Holst, issued Sep. 6, 1932; U.S. Pat. No. 2,331,304 to Carmody, issued Oct. 12, 1943; U.S. Pat. No. 2,495,709 to Drown et al., issued Jan. 31, 1950; and U.S. Pat. No. 2,584,113 to Butler, issued Feb. 5, 1952 all disclose educational apparatuses and models for simulating the operation of an aircraft. However, those apparatuses are expensive to manufacture, cumbersome to transport and operate and none of them serve to demonstrate the interrelationships between, among other things, an aircraft's angle of attack, instantaneous flight path, center of pressure, load distribution, and a pilot's viewing attitude.

Thus, there is a need for an educational apparatus that is relatively inexpensive to manufacture and easy to use that serves to demonstrate the interrelationships between an aircraft's angle of attack, instantaneous flight path, center of pressure, load distribution, and a pilot's viewing attitude.

SUMMARY OF THE INVENTION

In accordance with a particular preferred form of the present invention, there is provided an instructional model that includes an indicator member having a means thereon that represents the instantaneous flight path of an aircraft. The indicator member is provided with indicia representing a range of attack angles at which the aircraft can fly relative to the instantaneous flight path. The indicator member also includes a center of pressure indicator for representing the center of pressure acting on the aircraft when flying at a selected attack angle. A second member representing the aircraft is pivotally attached to the indicator member. The second member is adapted to be selectively pivoted relative to the indicator member to a selected attack angle. After the attack angle has been selected, the center of pressure indicator identifies a point on the second member which represents a corresponding point on the aircraft at which the center of pressure forces are applied thereto when the aircraft is flying at the selected attack angle.

It is an object of the present invention to provide an instructional model that can demonstrate the relationship between an aircraft's attack angle and the point at which a center of pressure force is applied to the aircraft, It is another object of the present invention to provide an instructional model that can demonstrate the relationship between a pilot's viewing attitude and the attack angle of an aircraft flying at an instantaneous flight path.

It is yet another object of the present invention to provide an instructional model that can demonstrate the position of an aircraft's elevators relative to the attack angle at which the aircraft is flying.

It is still another object of the present invention to provide an instructional model that can demonstrate the relationships between an aircraft's angle of attack and its center of pressure and center of gravity.

Yet another object of the present invention is to provide an instructional model having the above-mentioned attributes that is easy to use and relatively inexpensive to manufacture.

Another object of the present invention is to provide an instructional model having the above-mentioned attributes that can be hand held.

Accordingly, the present invention provides solutions to the aforementioned problems associated with prior methods and models used to train aircraft pilots. However, these and other details, objects and advantages will become apparent as the following detailed description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF THE PREFERRED EMBODIMENTS

Figure 1:
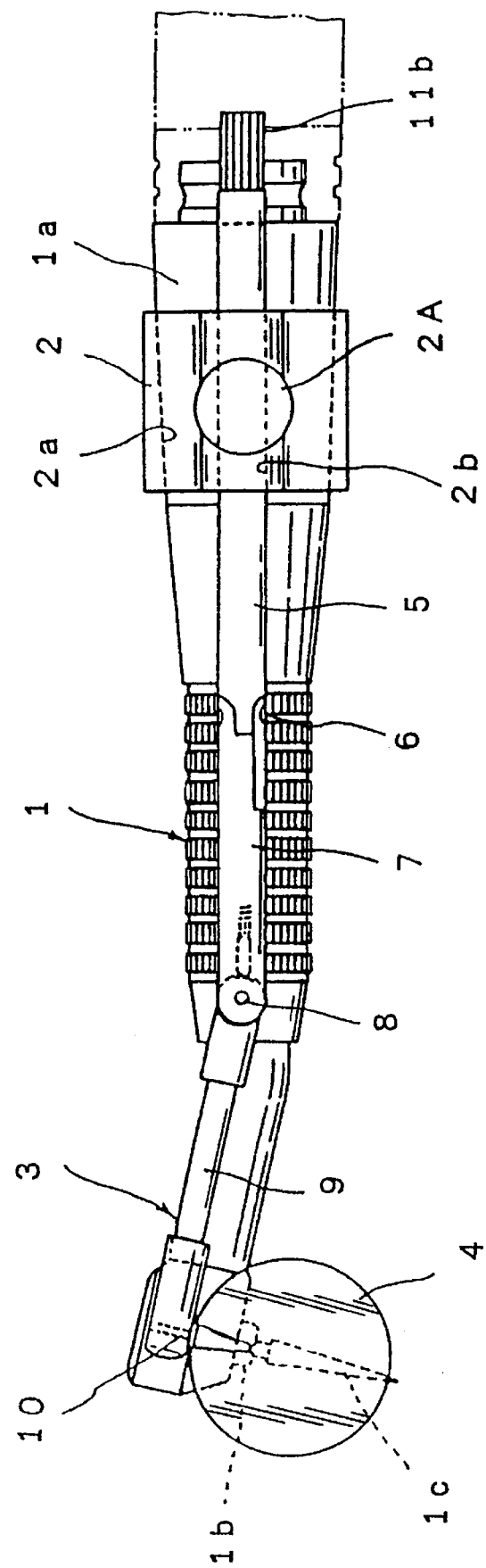
FIG. 1 is a side elevational assembly view of a preferred instructional model of the present invention.

Referring now to the drawings for the purposes of illustrating the present preferred embodiments of the invention only and not for purposes of limiting the same, the Figures show an instructional model generally designated as 10. As the present Detailed Description continues, the skilled artisan will readily appreciate that the present instructional model 10 can be easily used to demonstrate the interrelationships between the angle of attack of an aircraft, the aircraft's center of gravity, the viewing attitude of the pilots the center of pressure acting on the aircraft, the instantaneous flight path of the aircraft and the position of the aircraft's tail elevator in a unique and novel manner.

Figure 2:
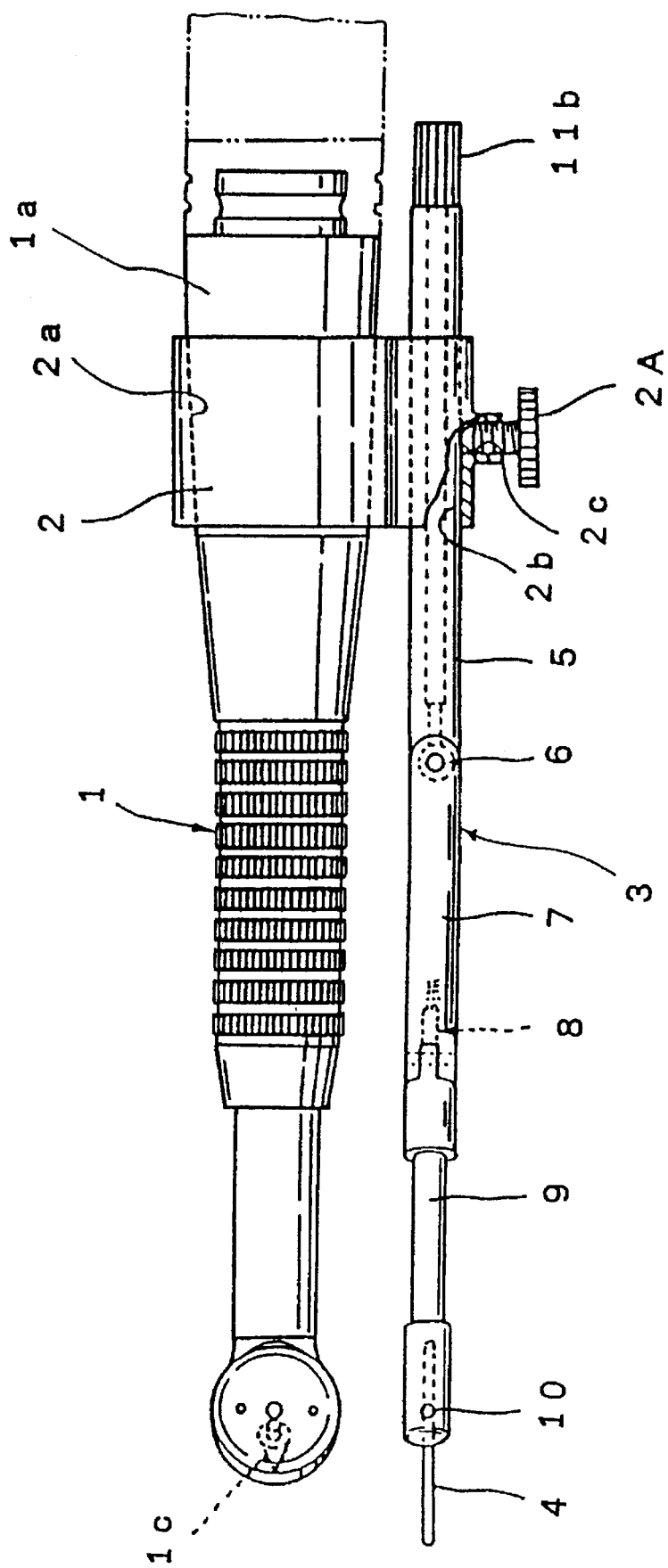
FIG. 2 is a side elevational view of a preferred attitude indication member of the subject invention.
Figure 5:
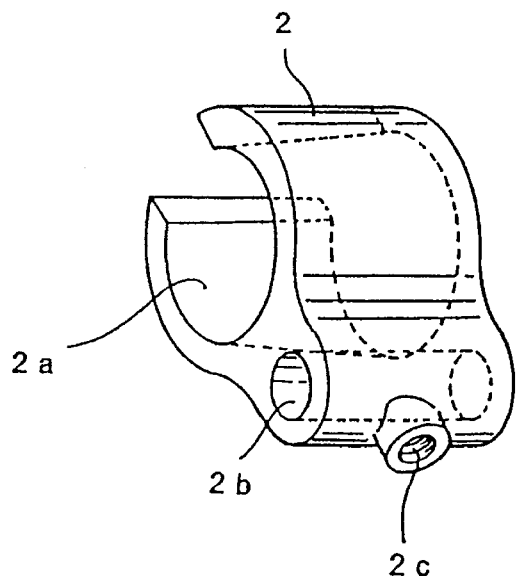
FIG. 5 is a side elevational view of a preferred aircraft member of the present invention.
Figure 18:
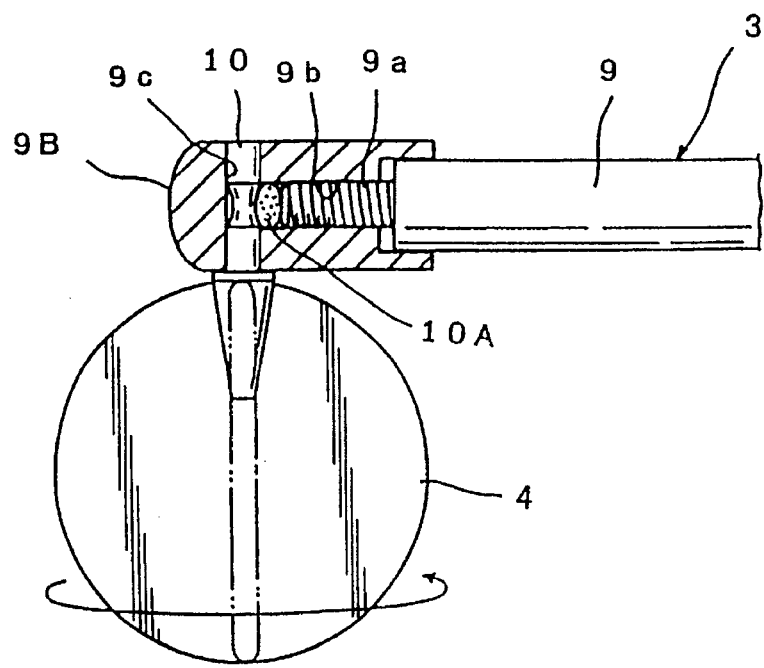
Figure 19:
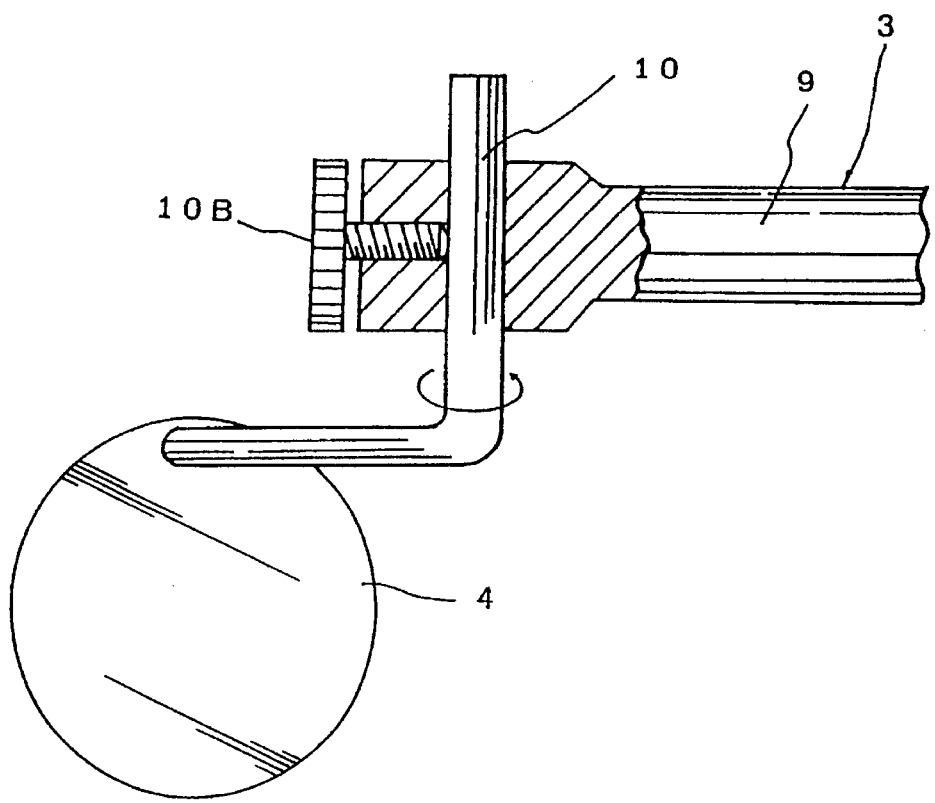
Figure 20:
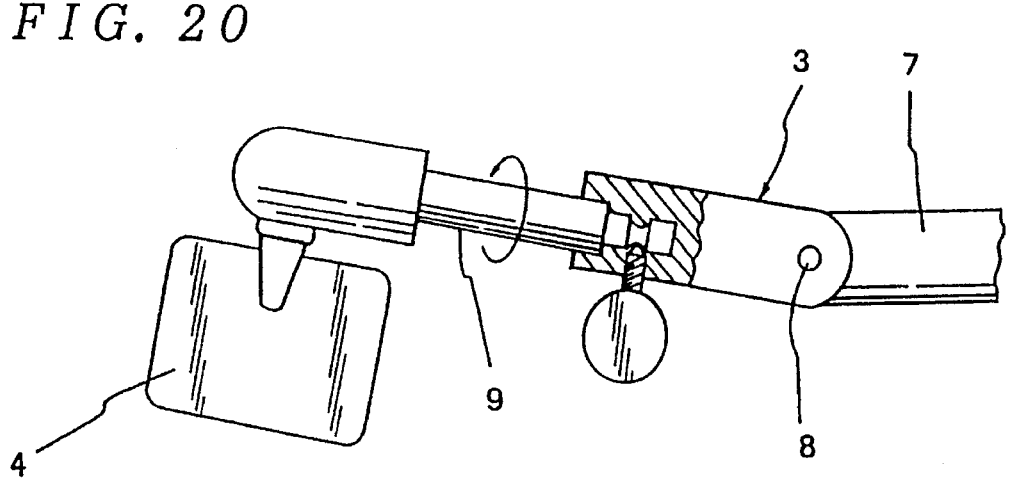
Figure 21:
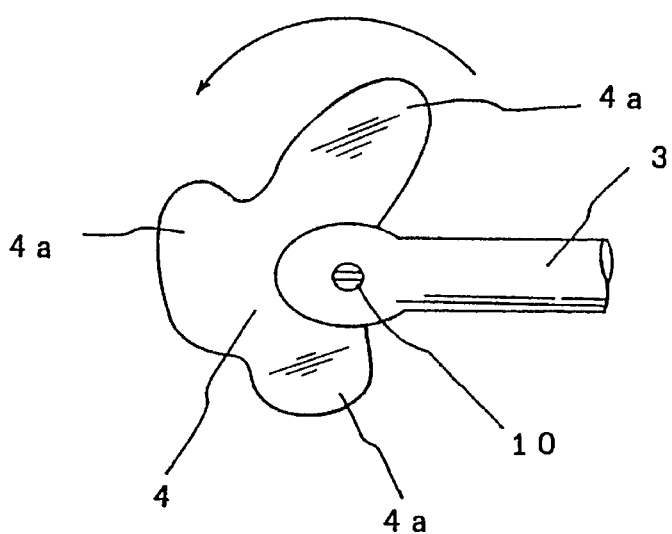
Figure 22:
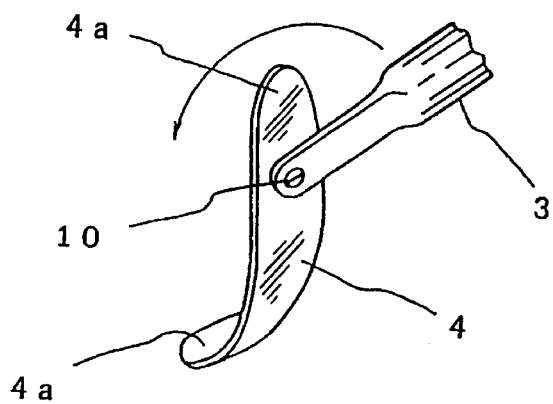
Figure 23:
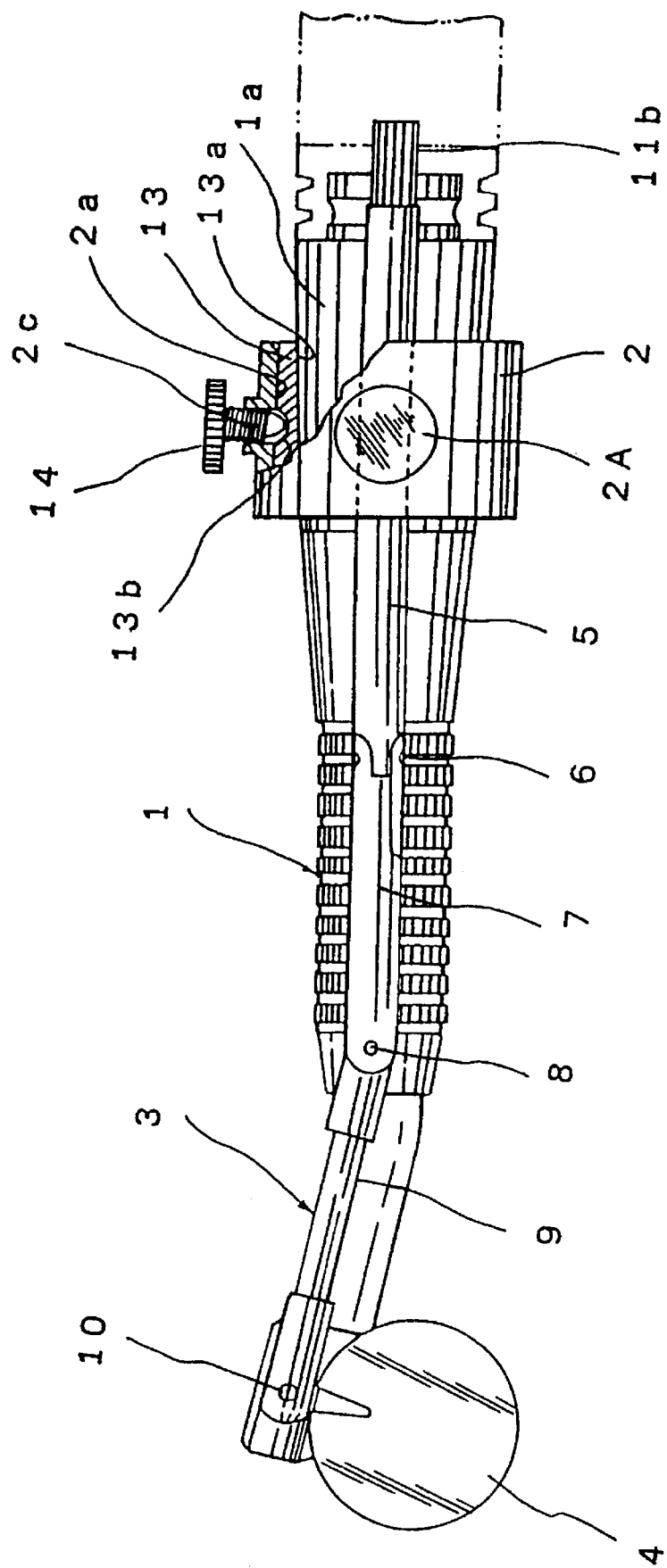
Figure 24:
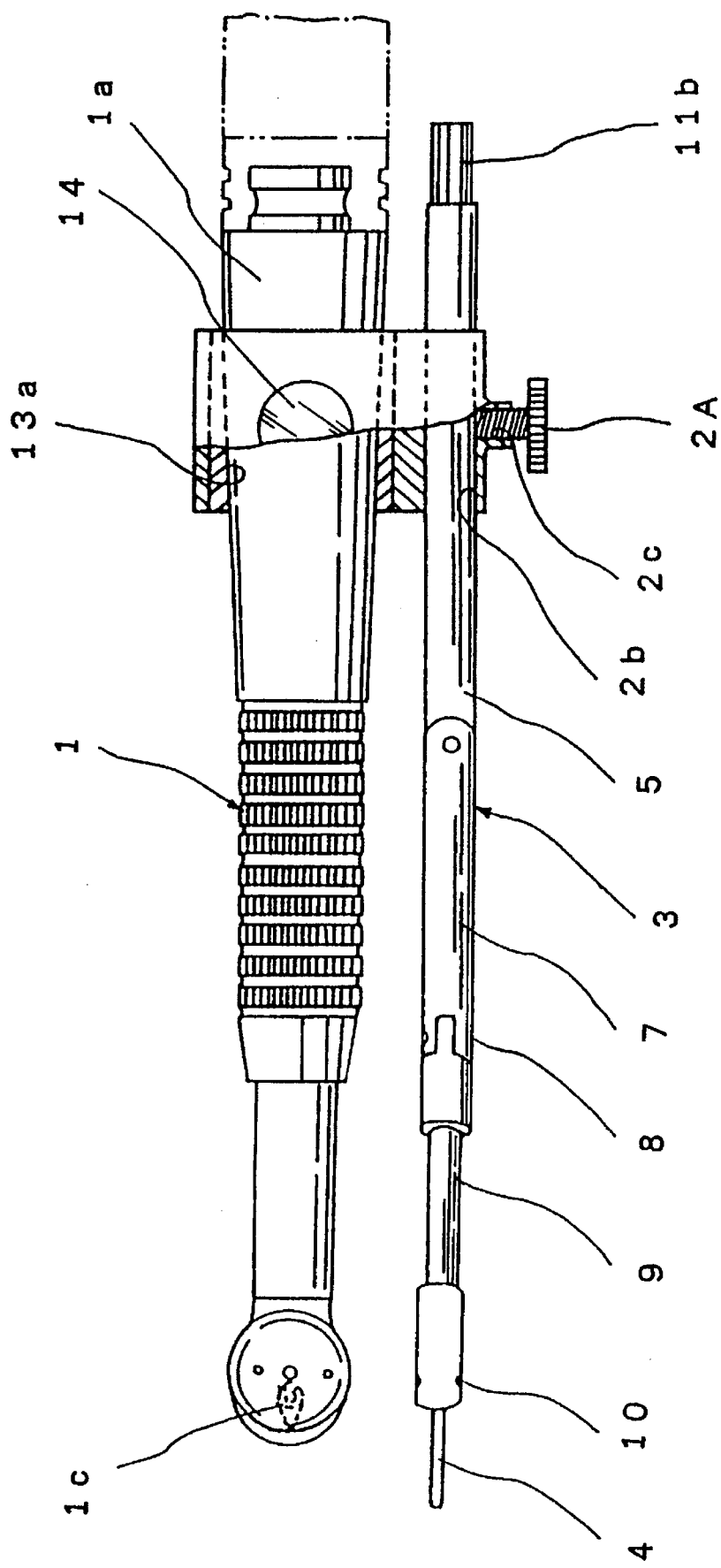
Figure 27:
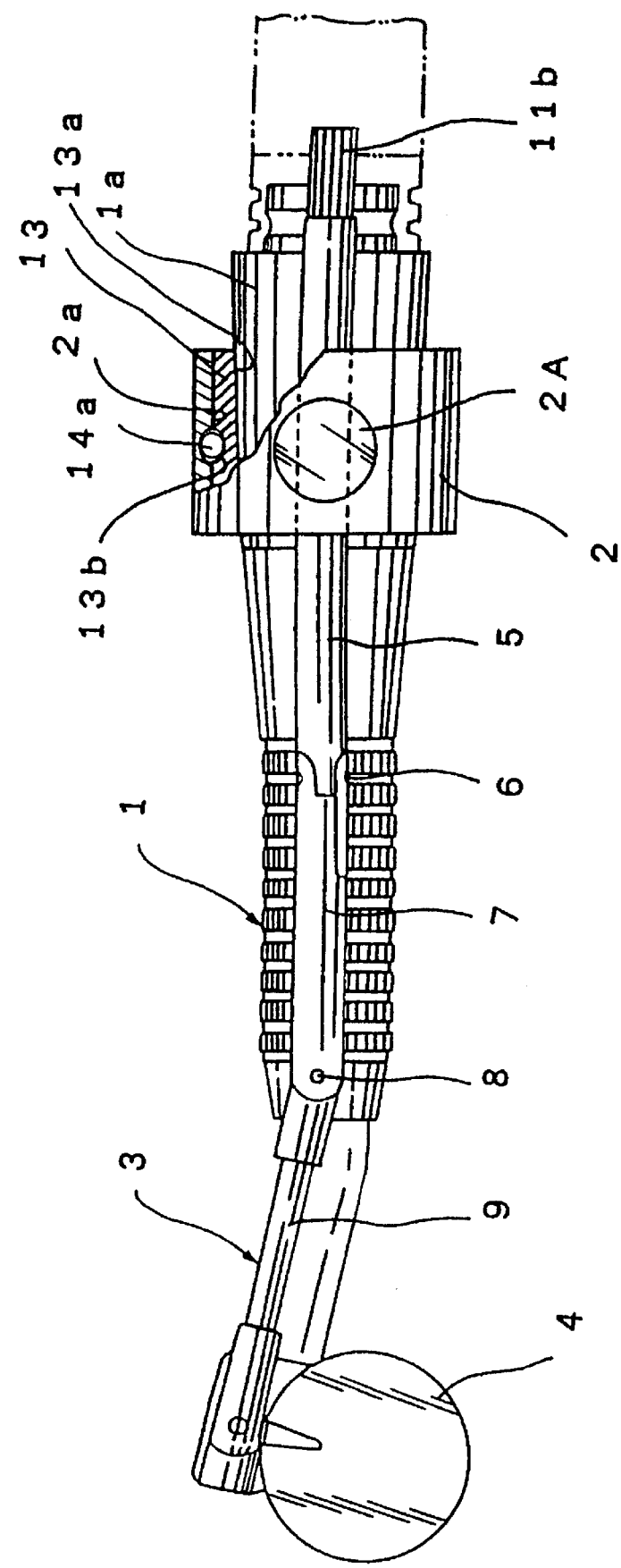
Figure 28:
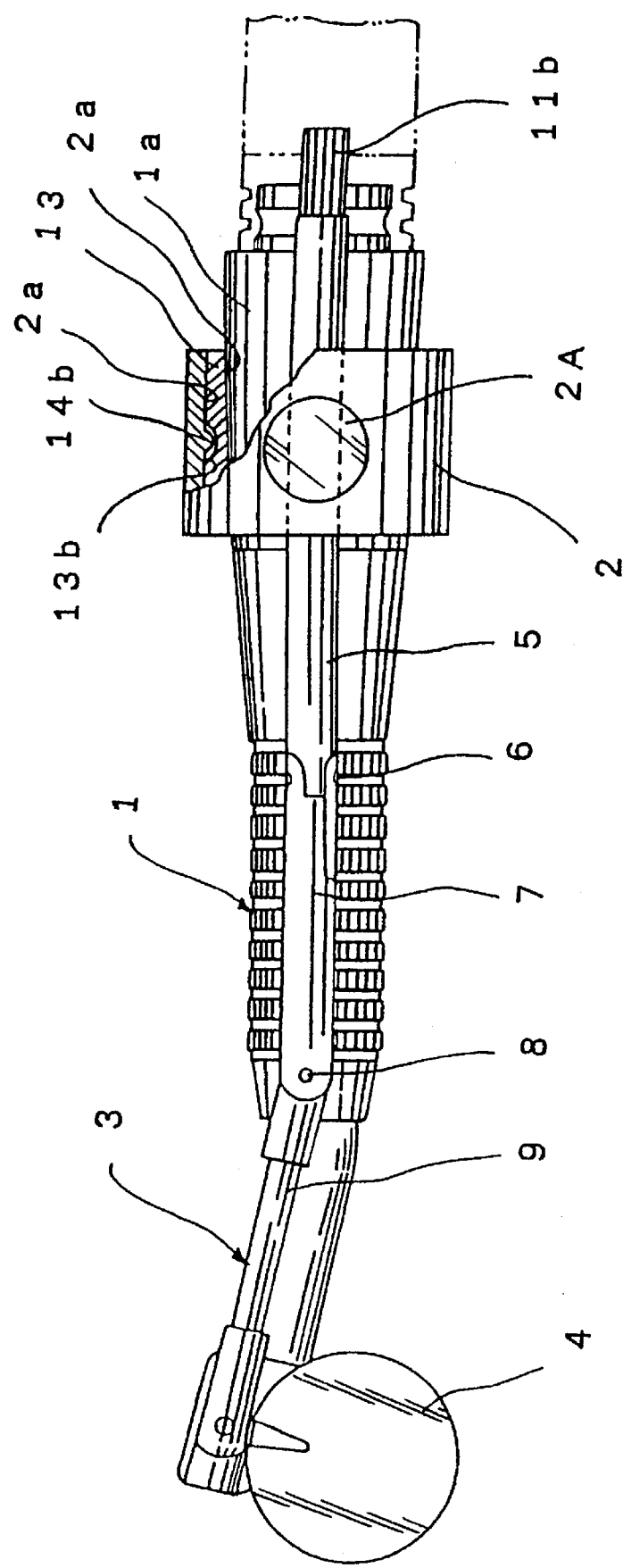
Figure 29:
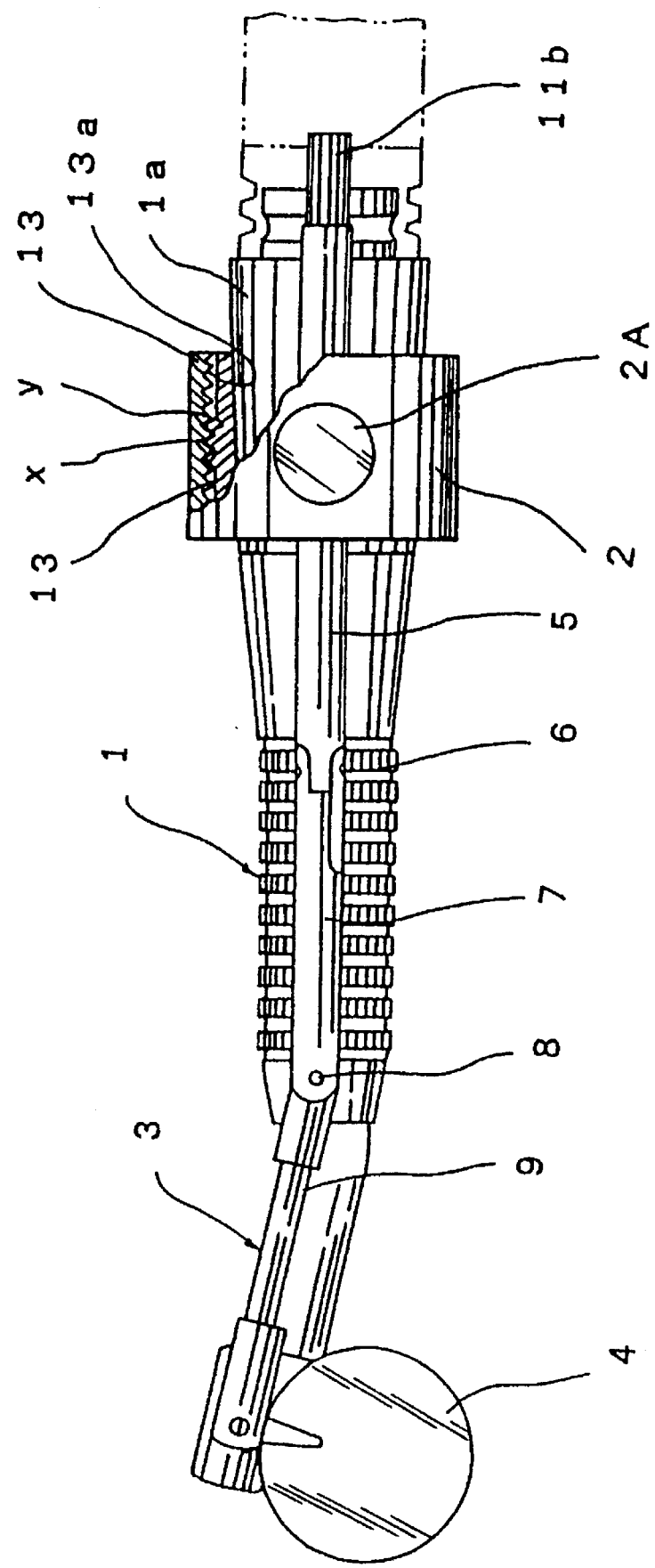
Figure 30:
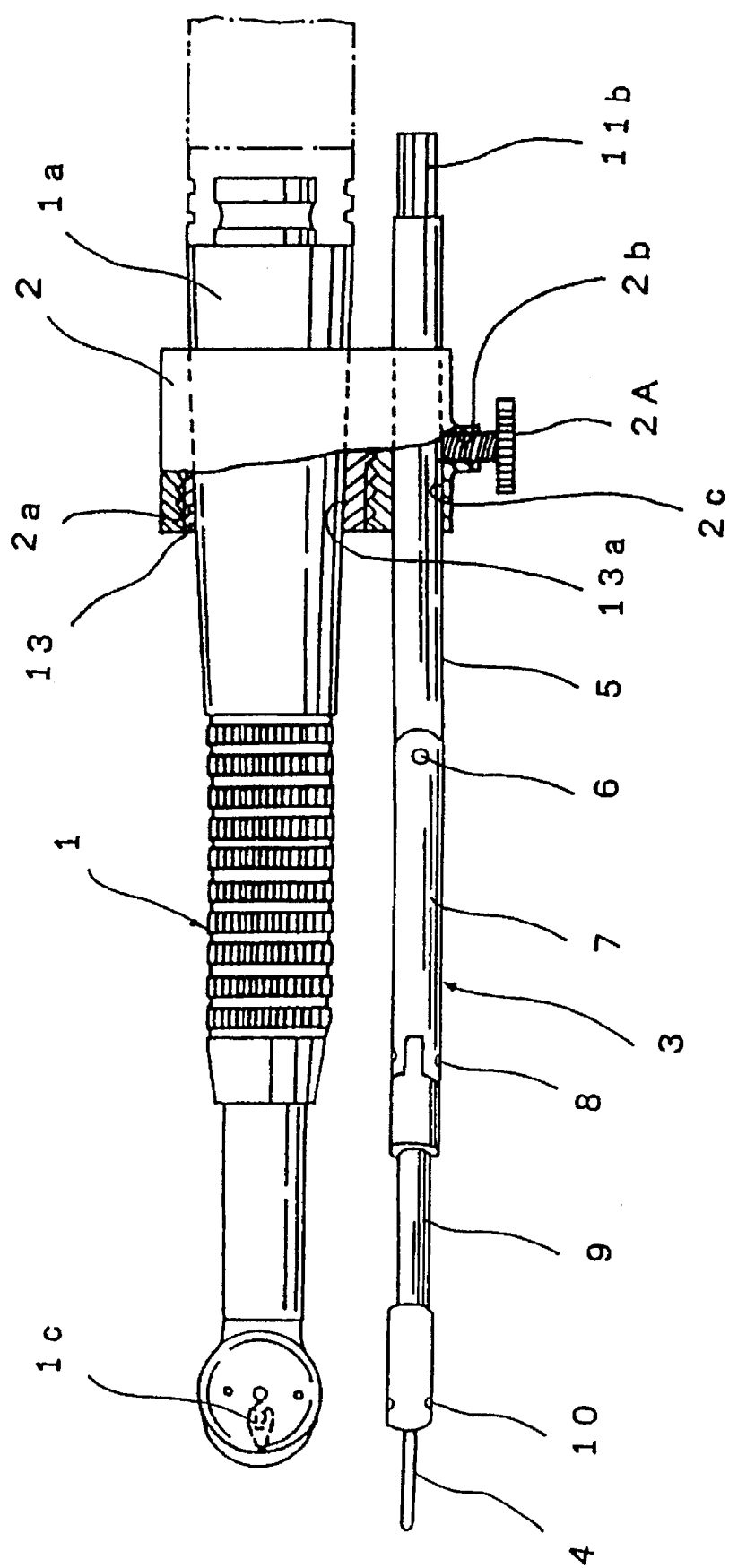
Figure 31:
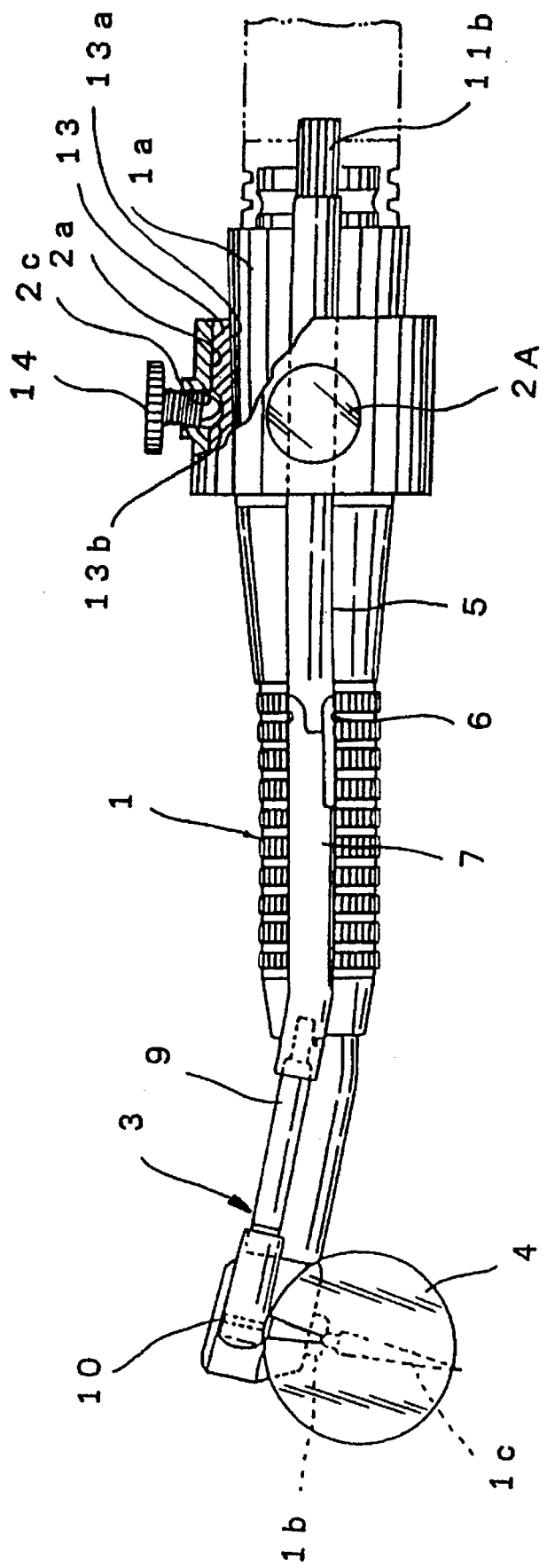
Figure 32:
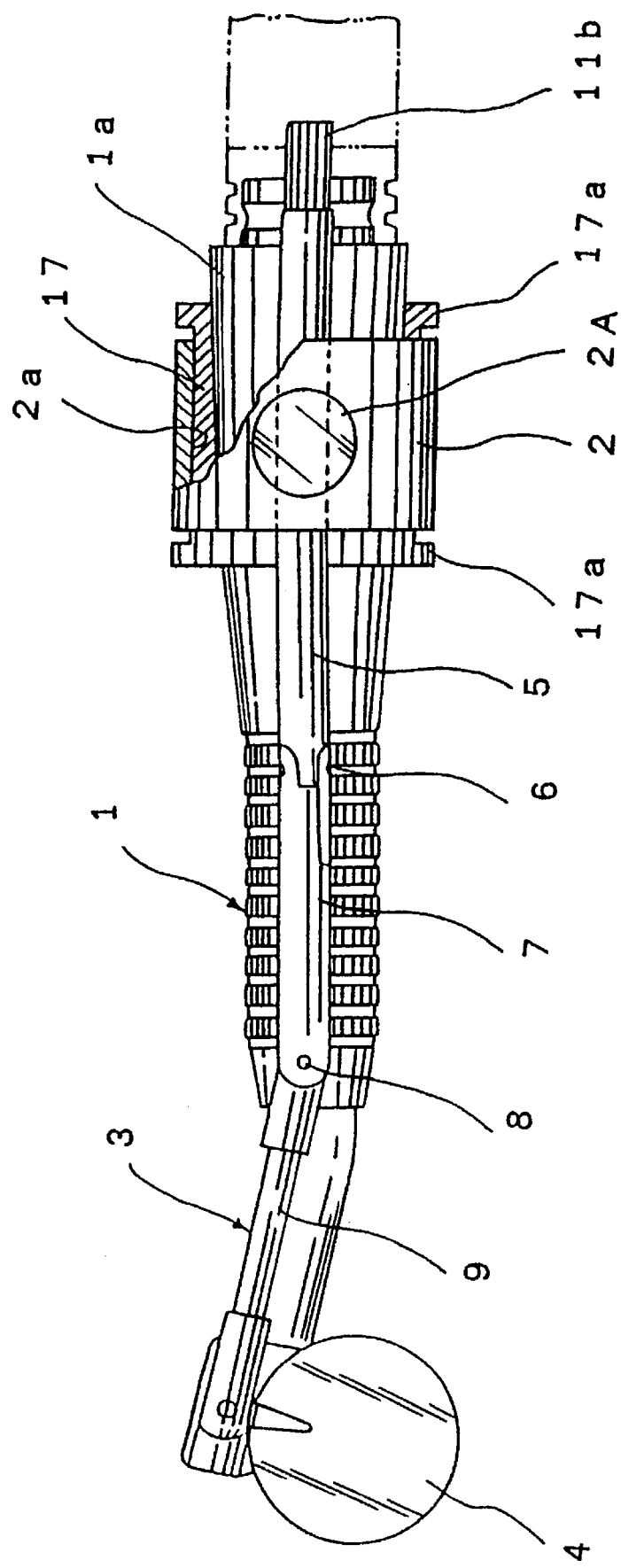
Figure 33:
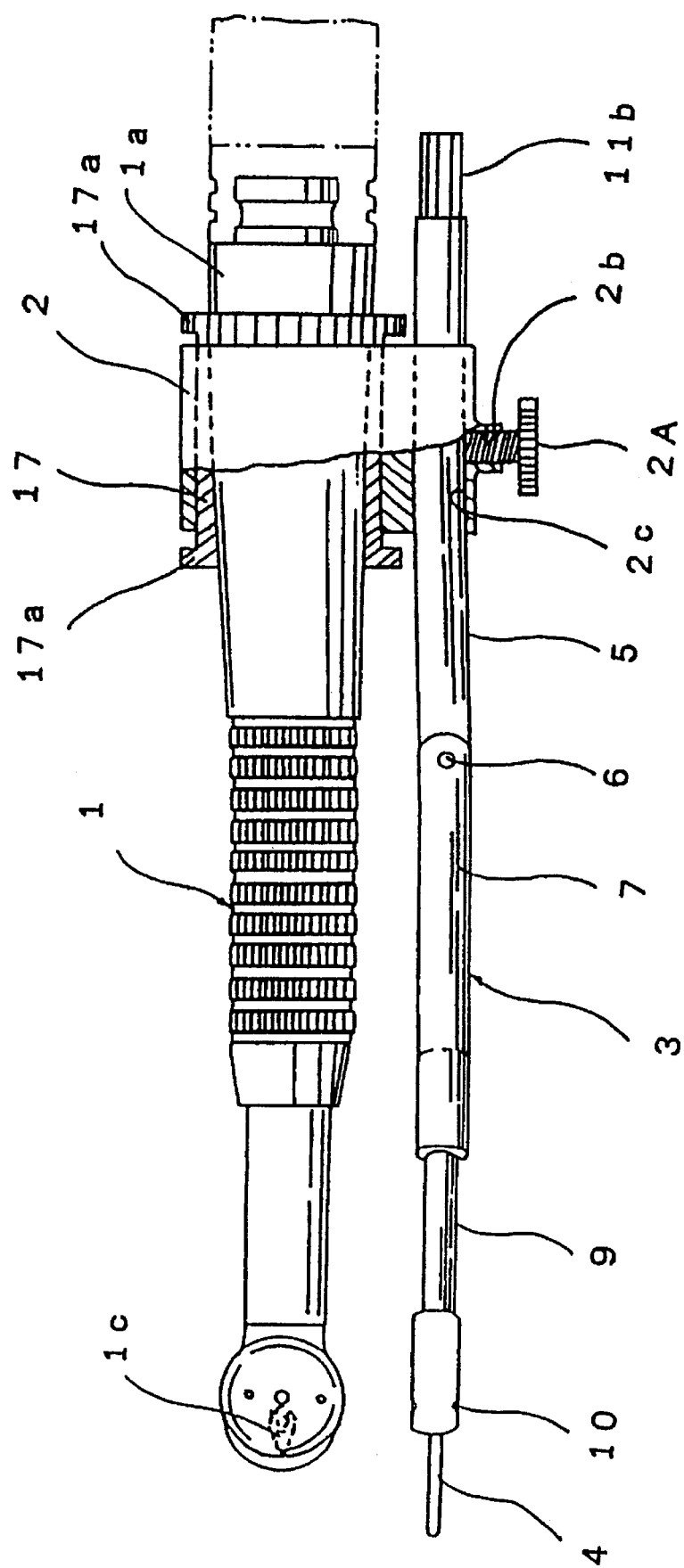
Figure 34:
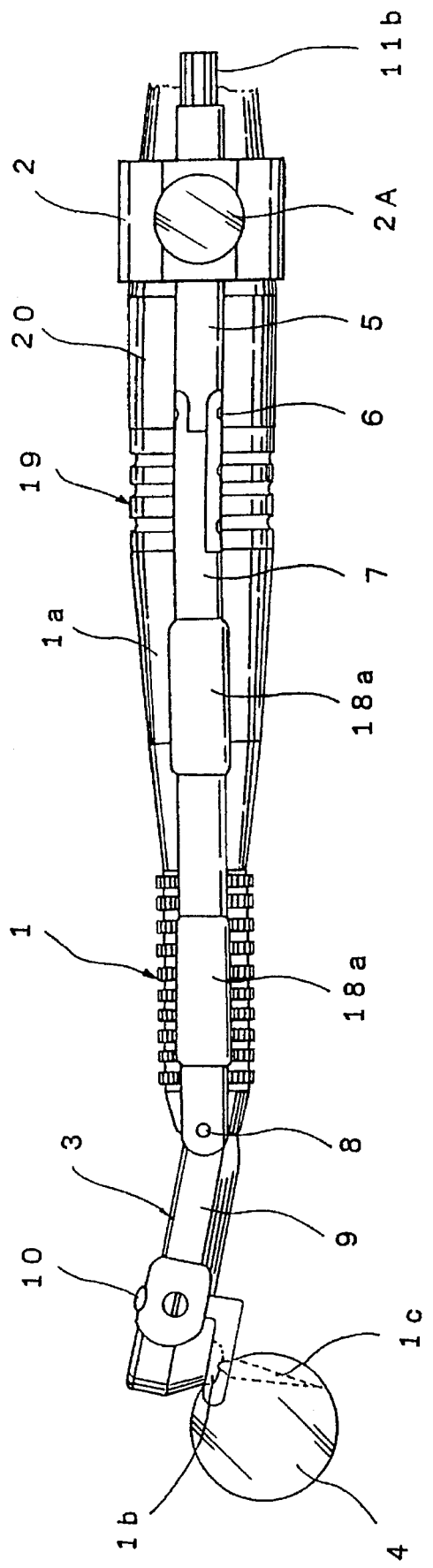
Figure 35:
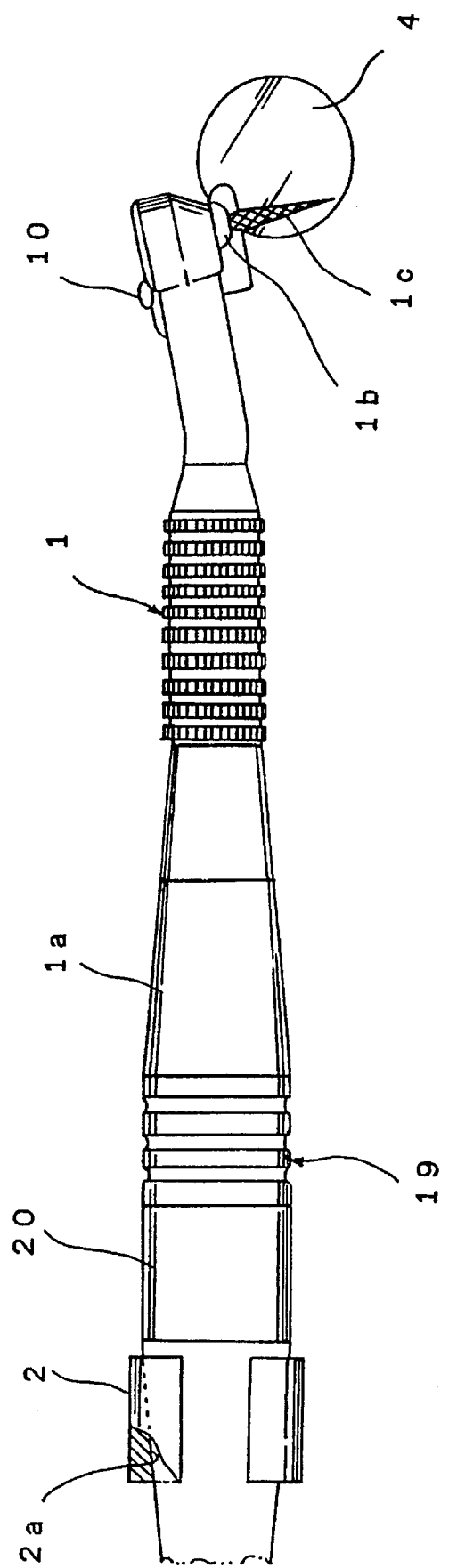
Figure 36:
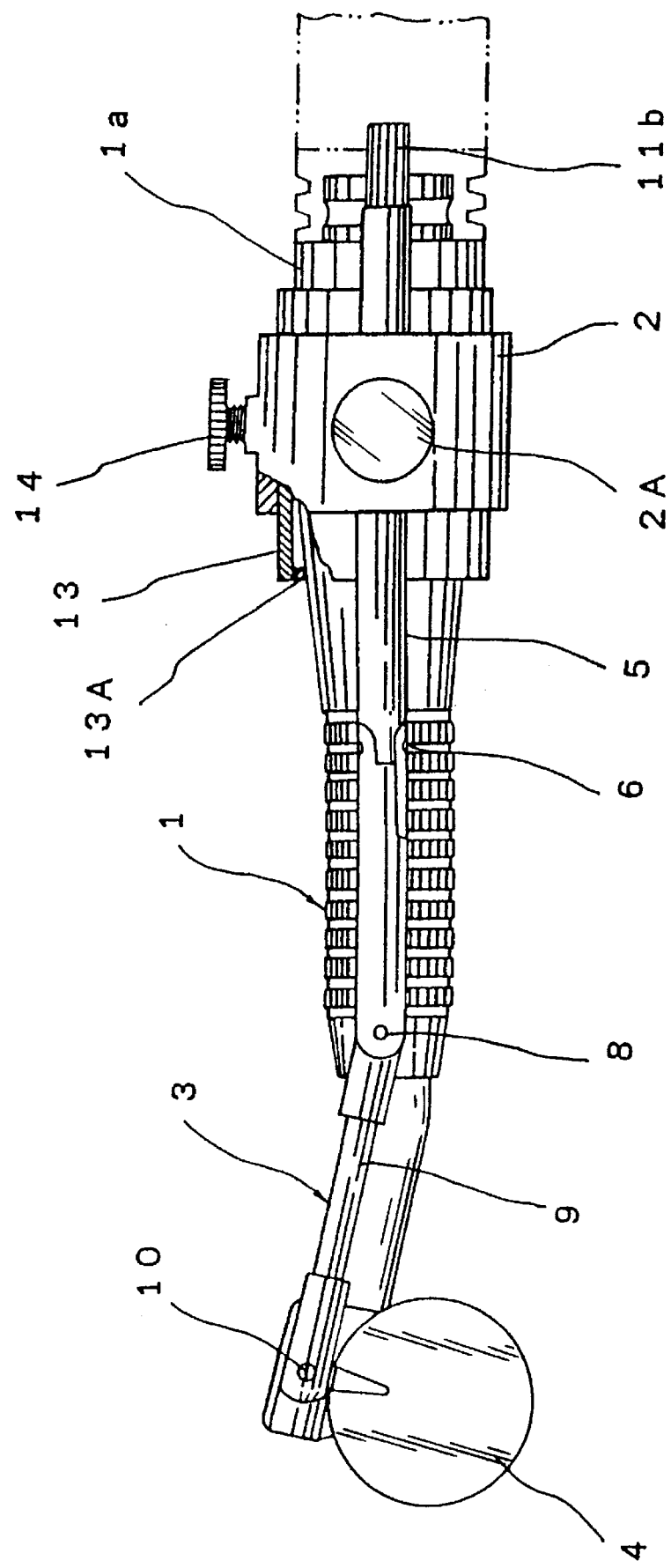
Figure 37:
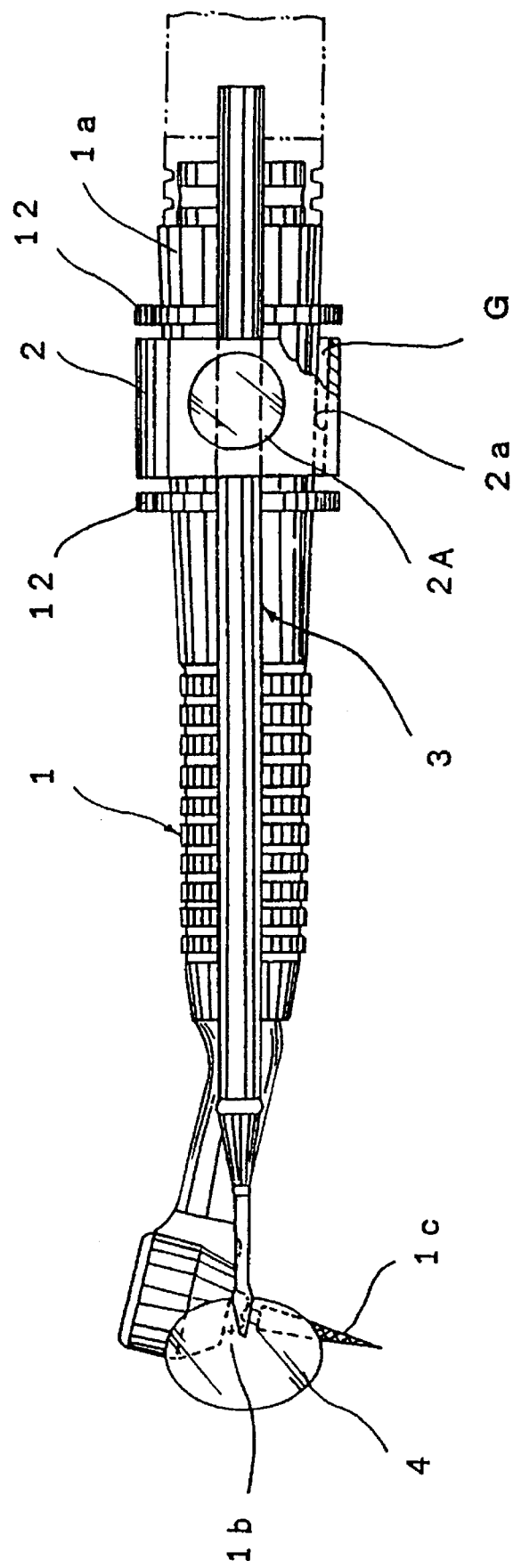
Figure 38:
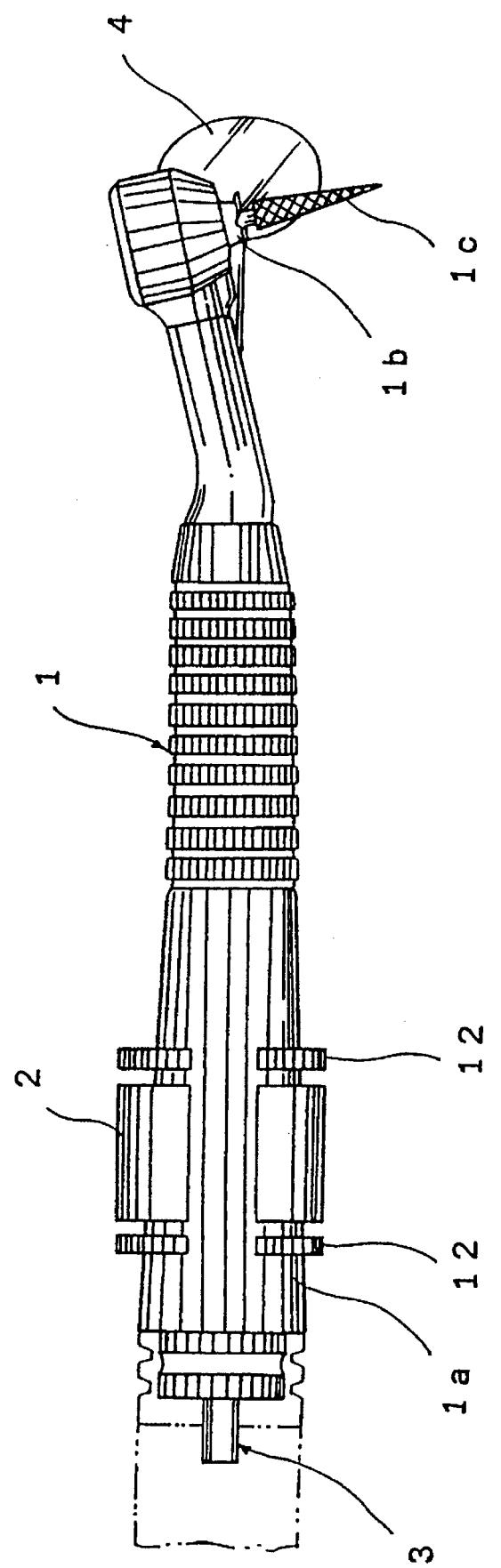
Figure 39:
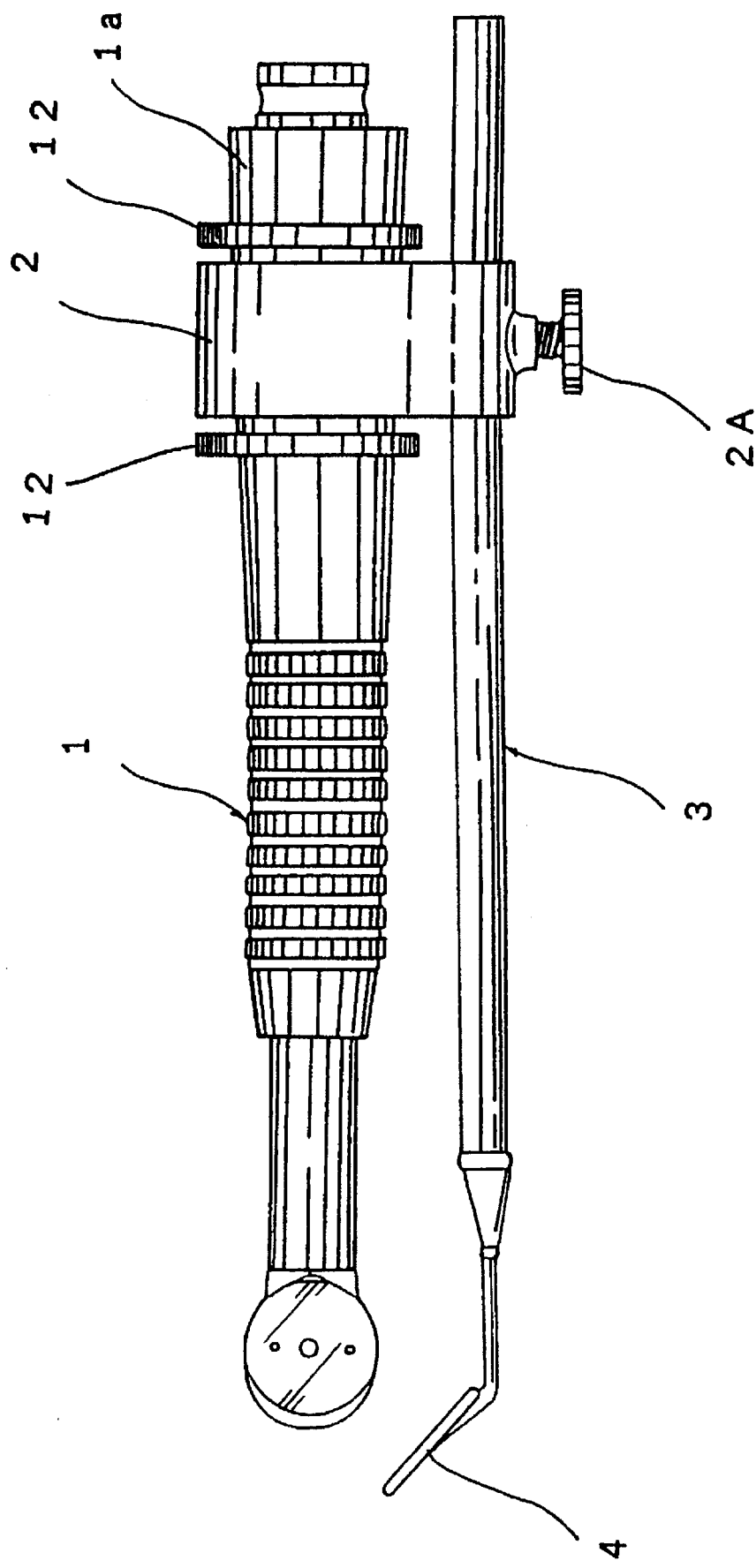
Figure 40:
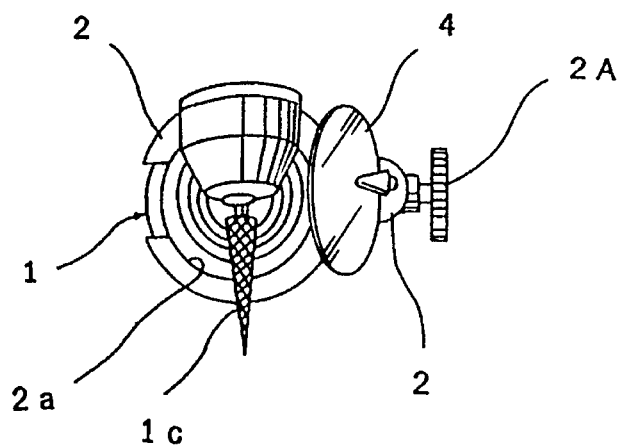
Figure 41:
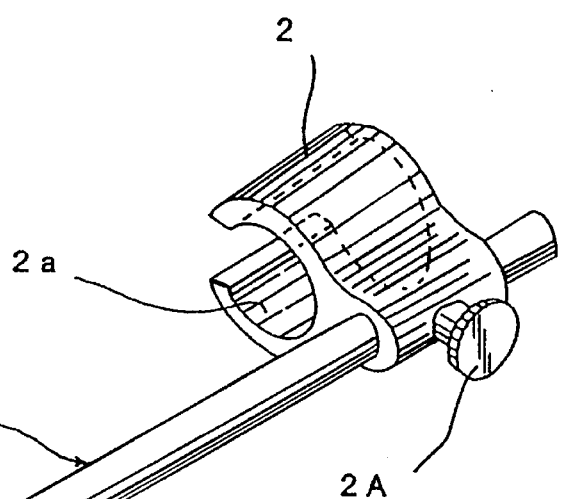
Figure 42:
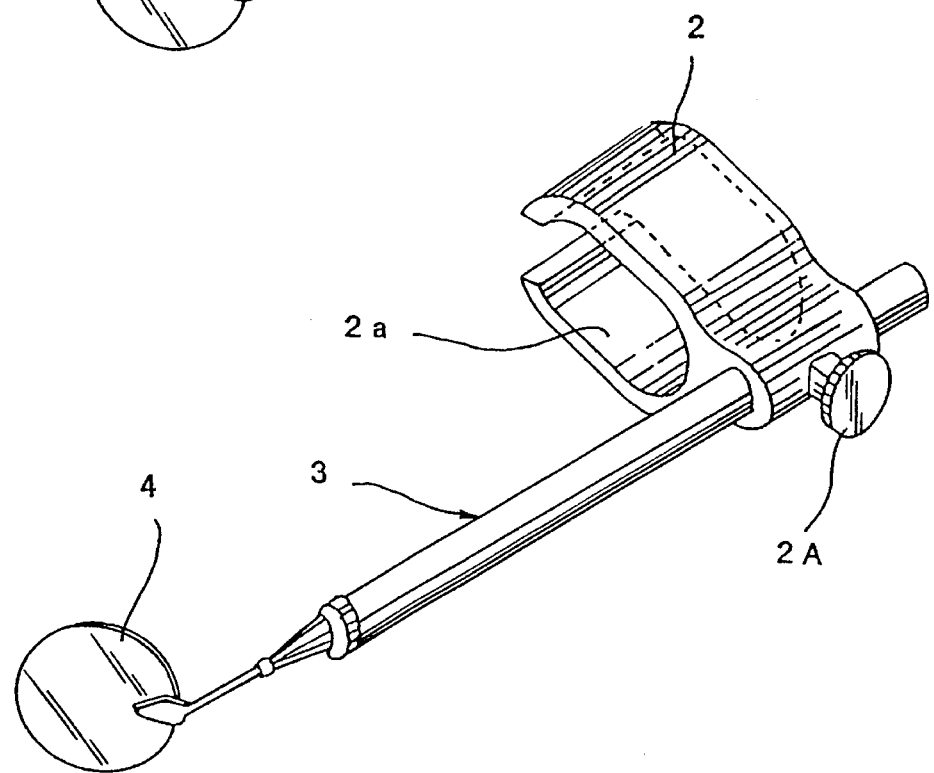
Figure 43:
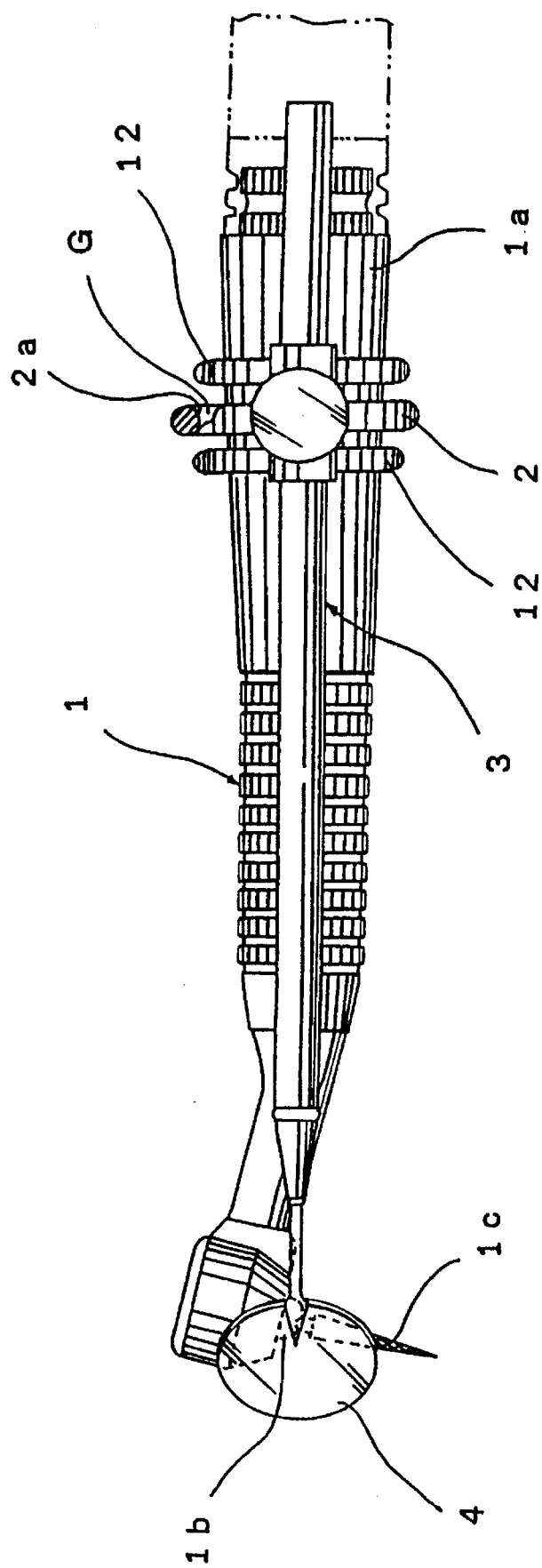
Figure 44:
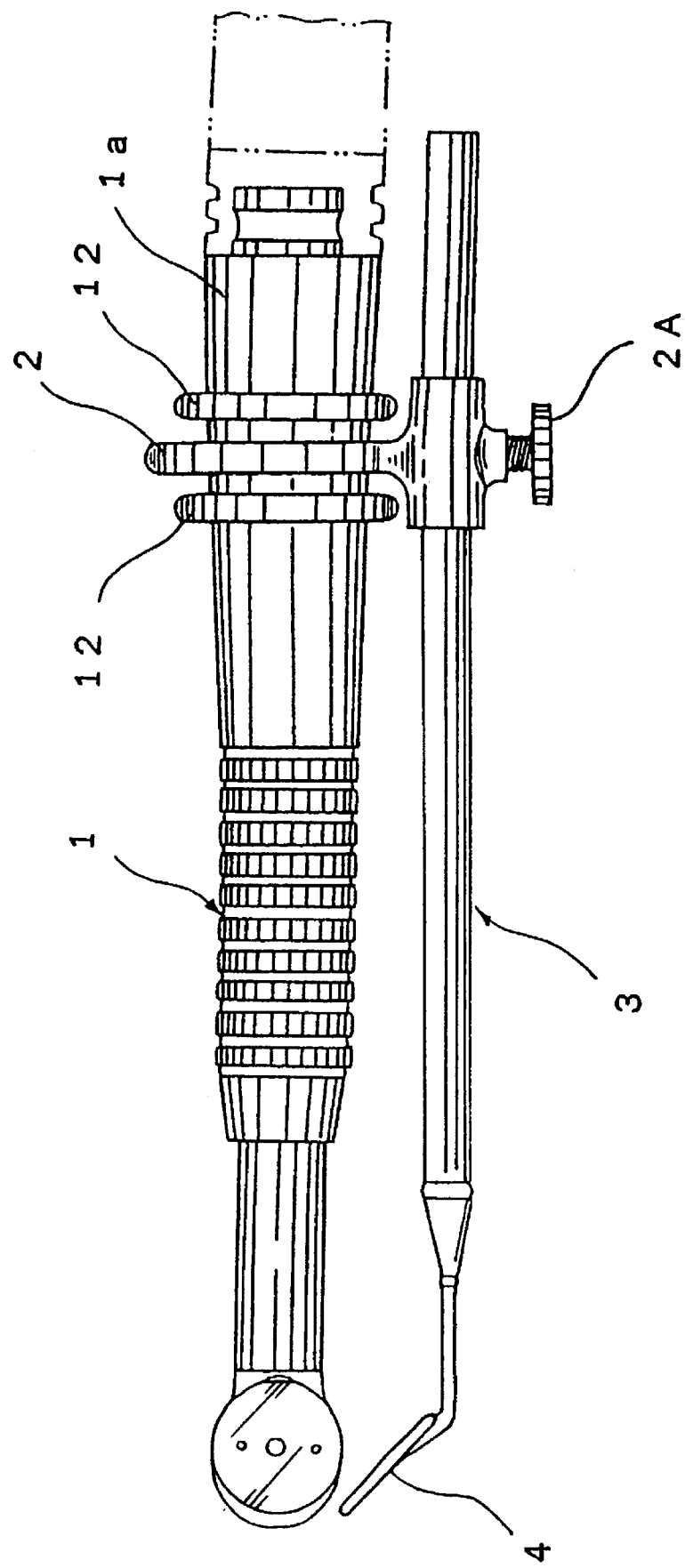
Figure 45:
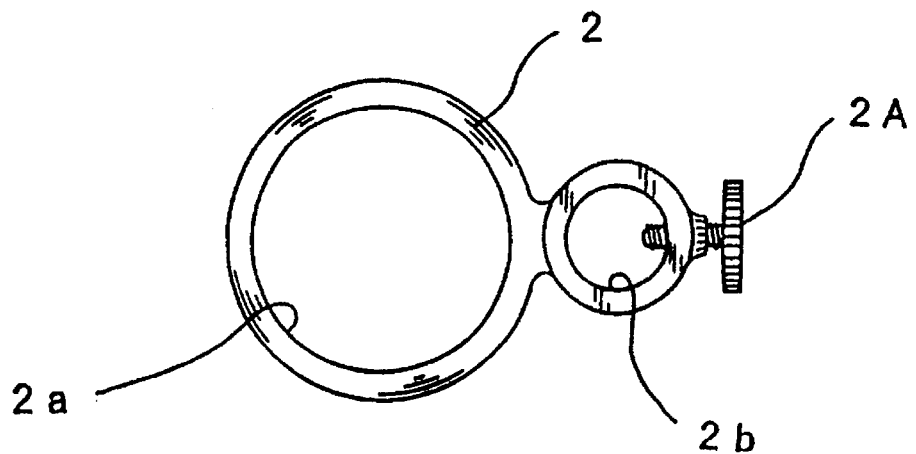
Figure 46:
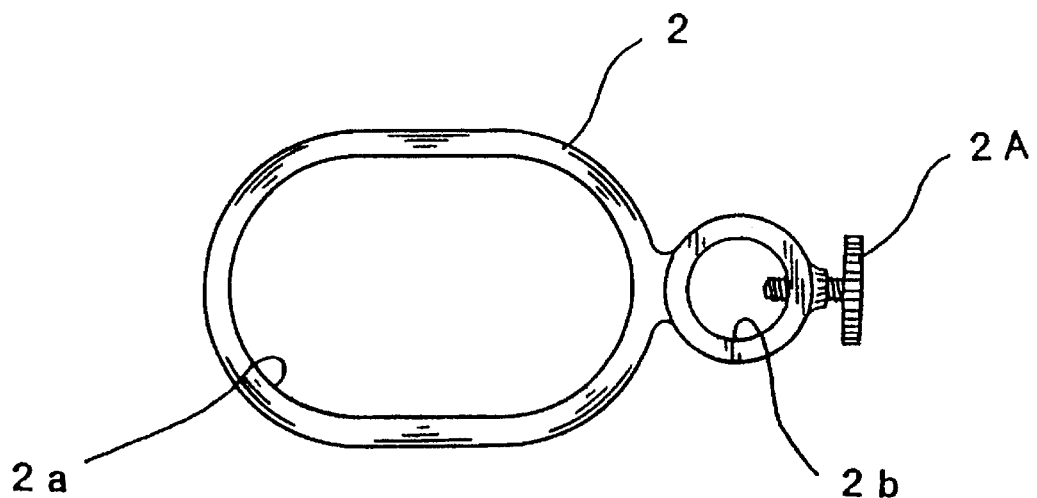
Figure 47:
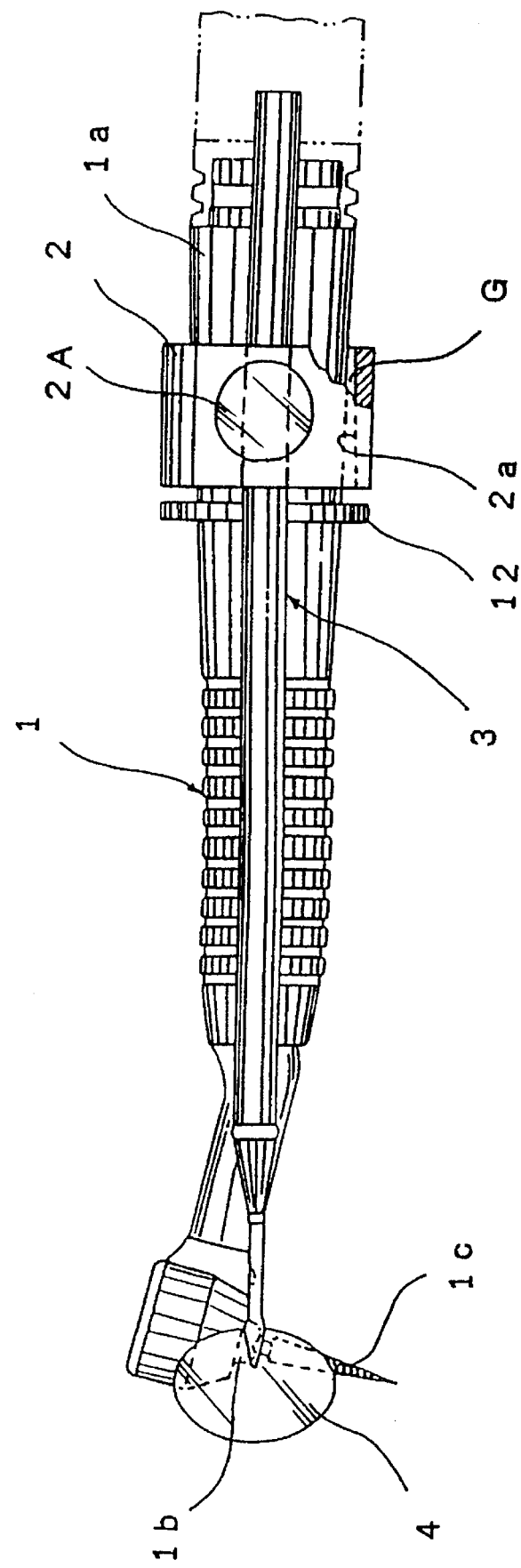
Figure 48:
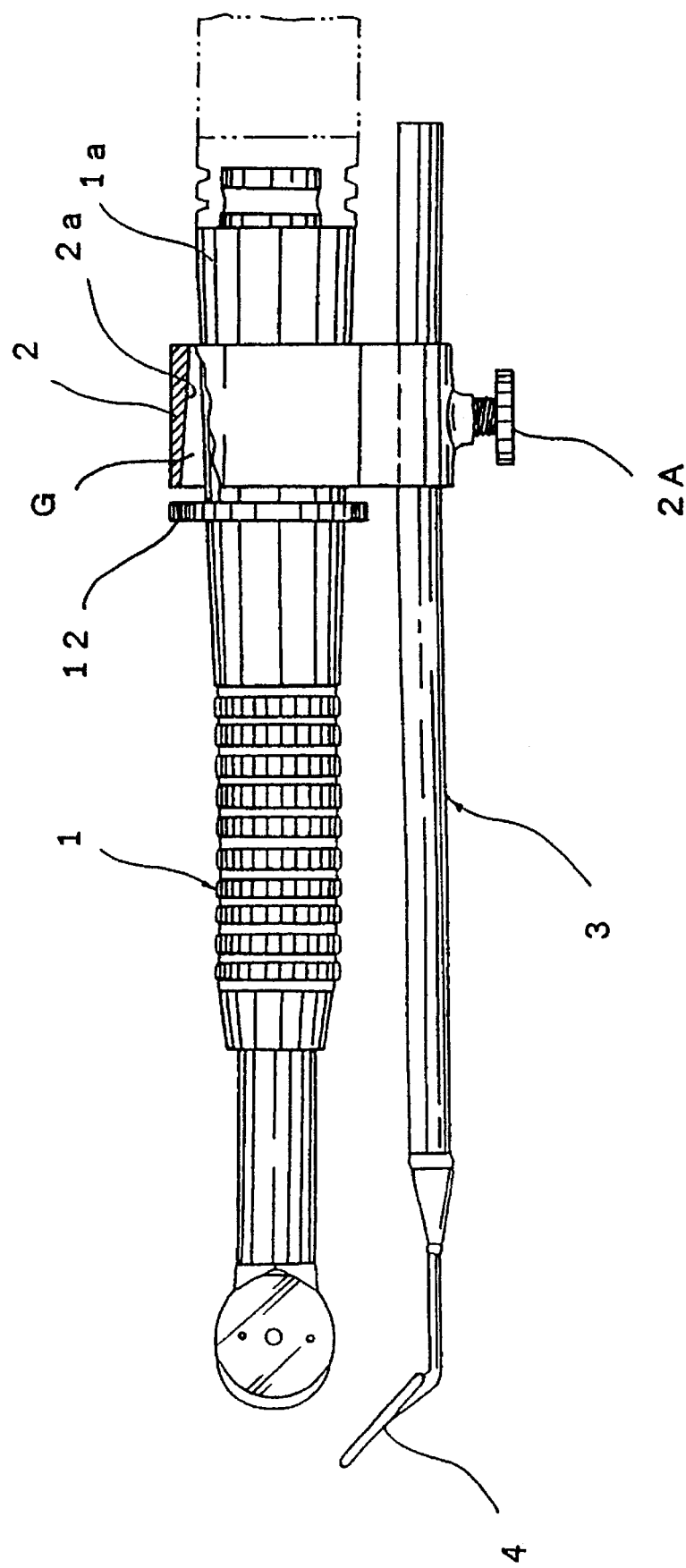
Figure 49:
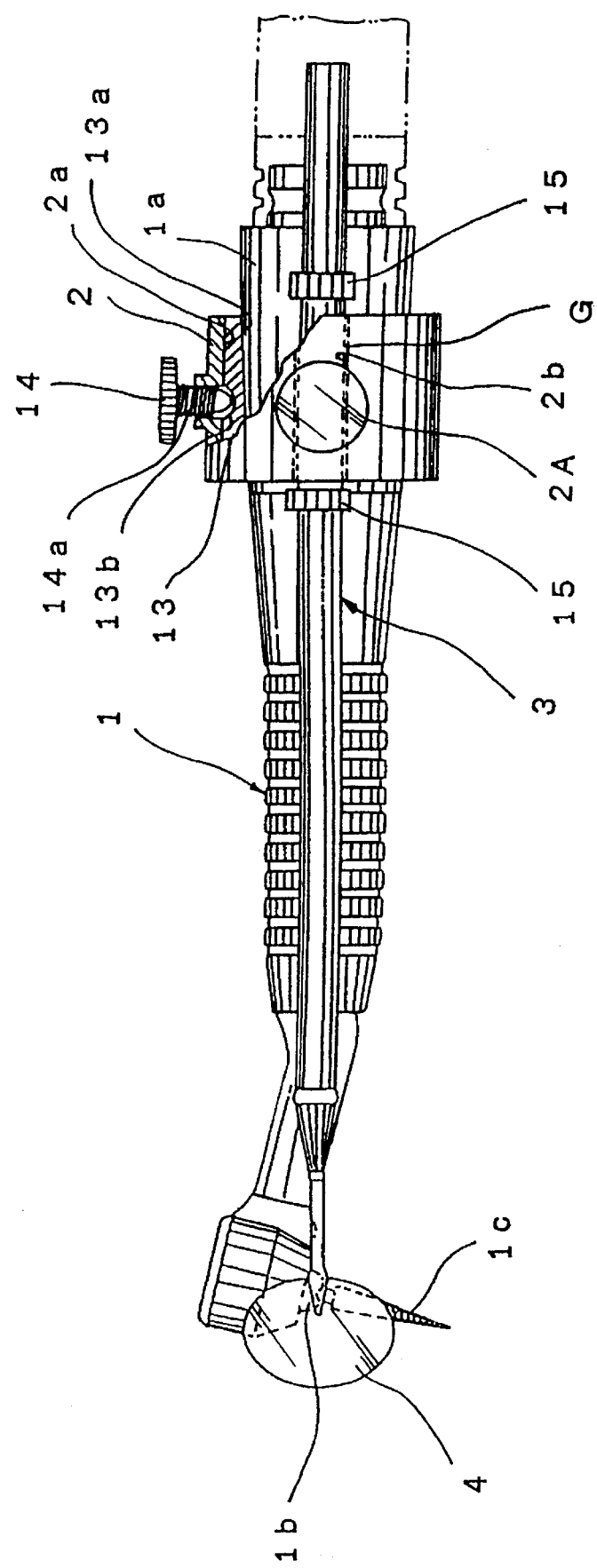
Figure 50:
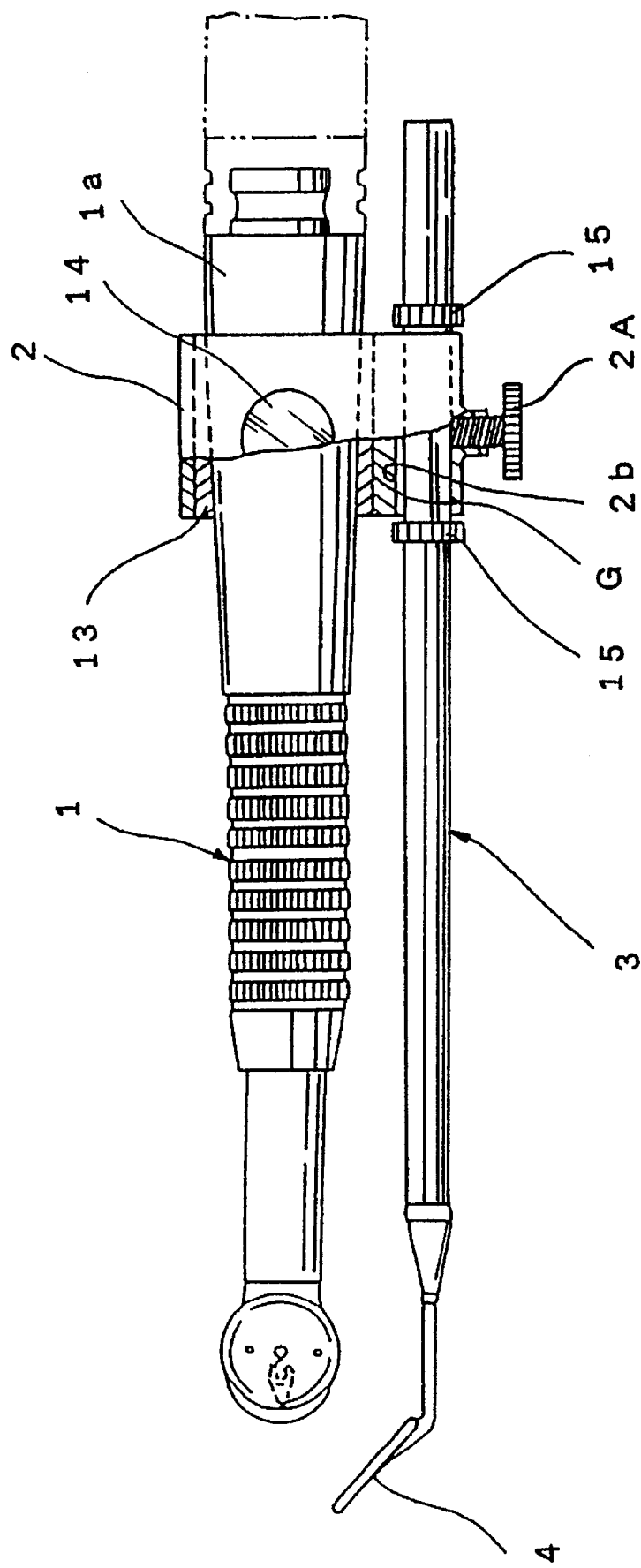
Figure 54:
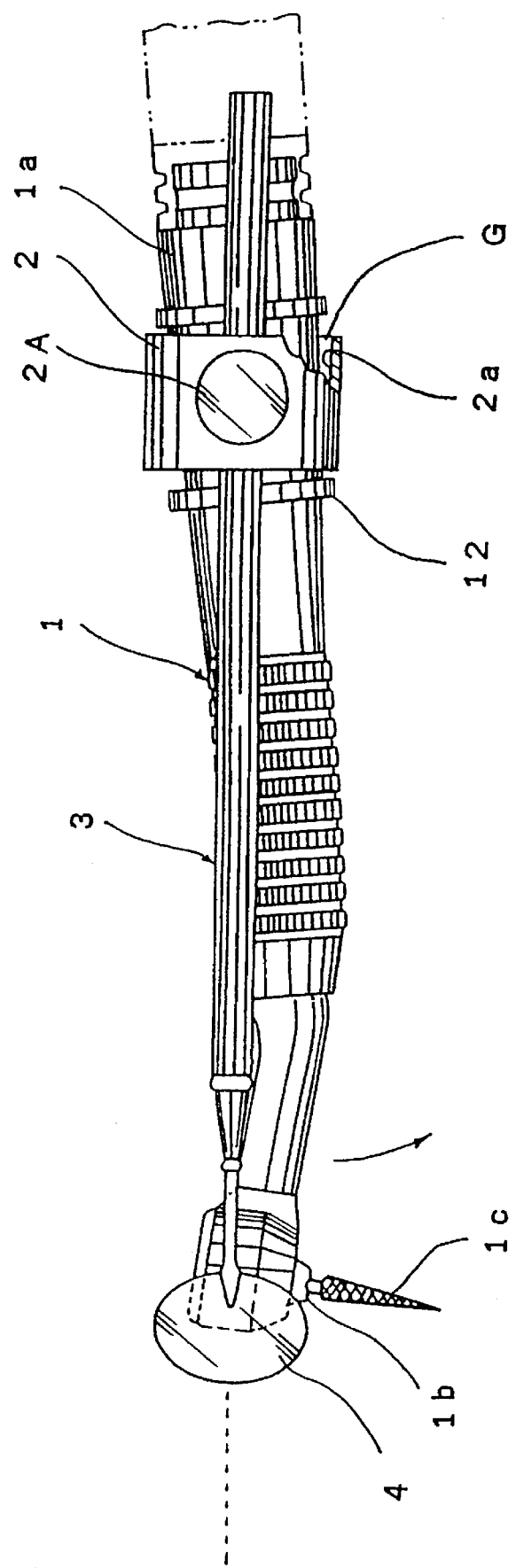
Figure 55:
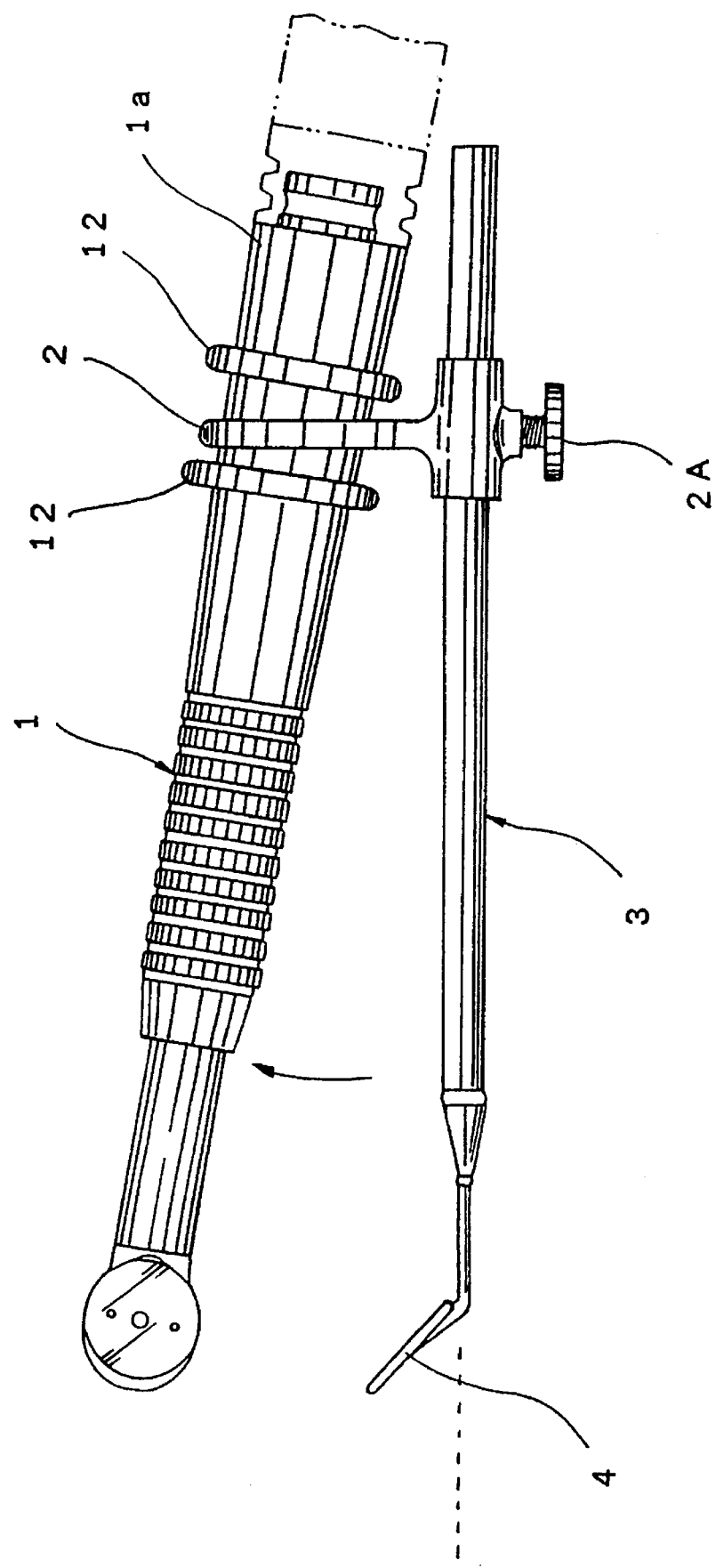
Figure 56:
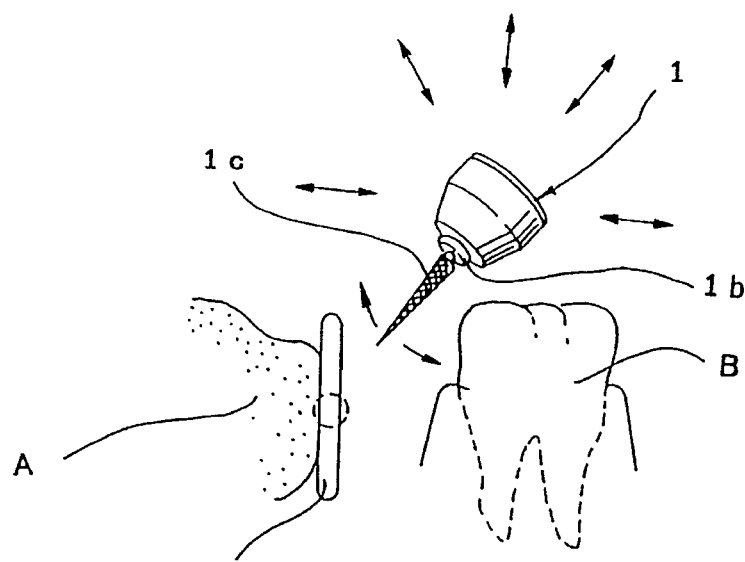
Figure 57:
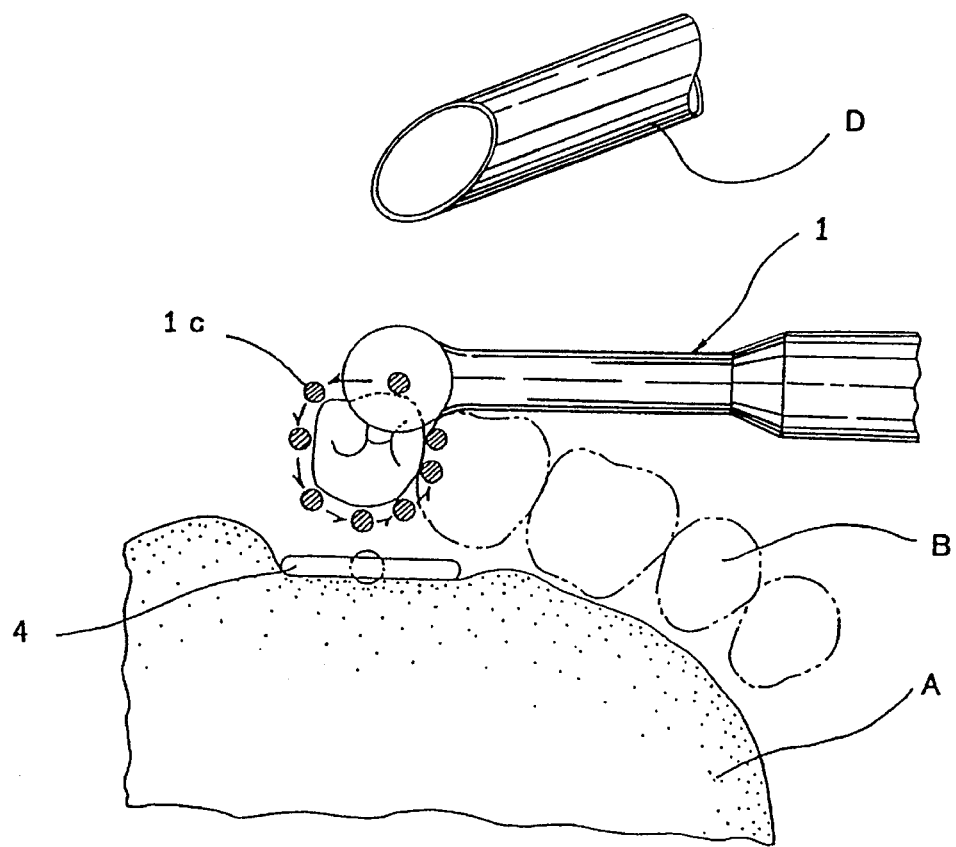
Figure 58:
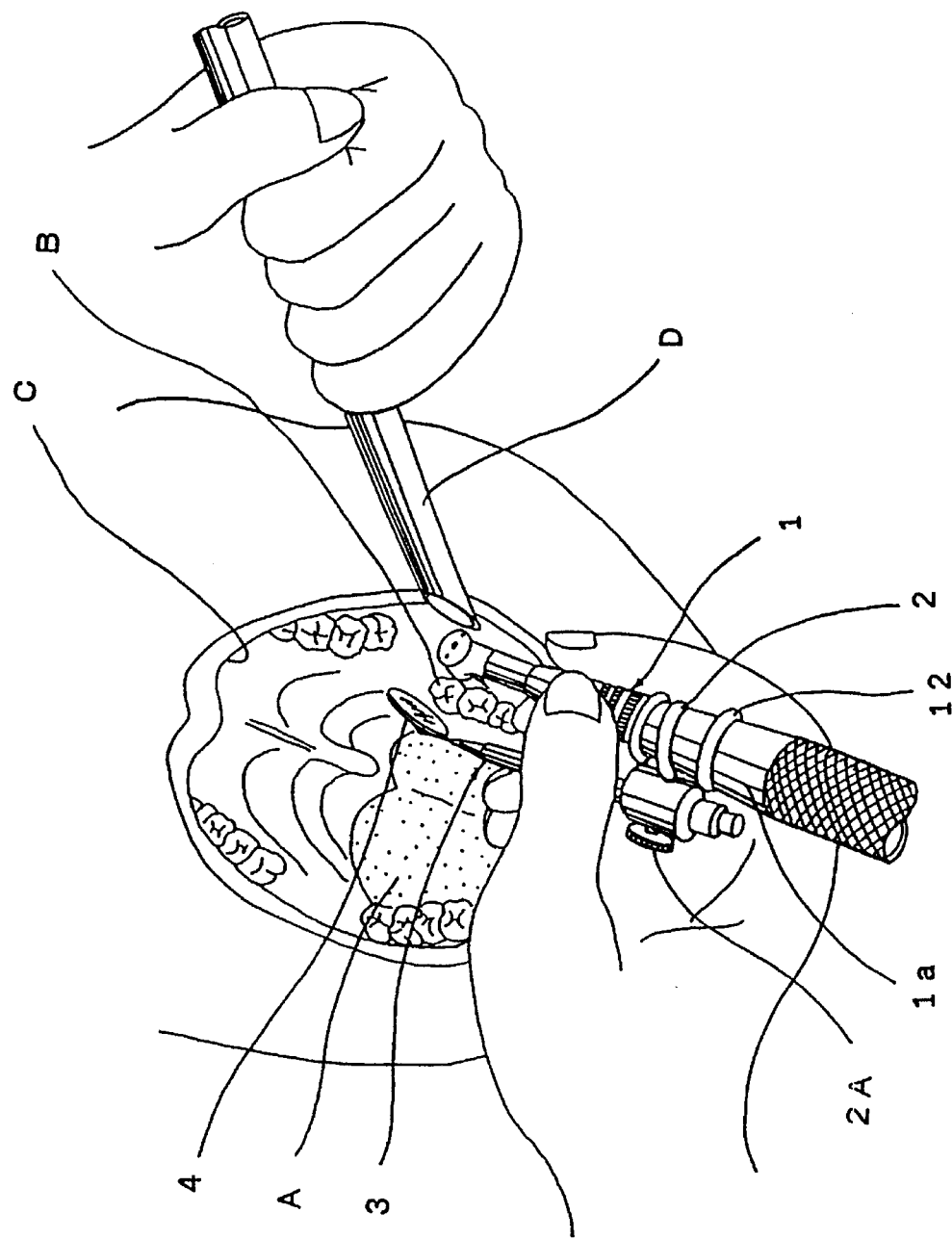
Figure 59A:
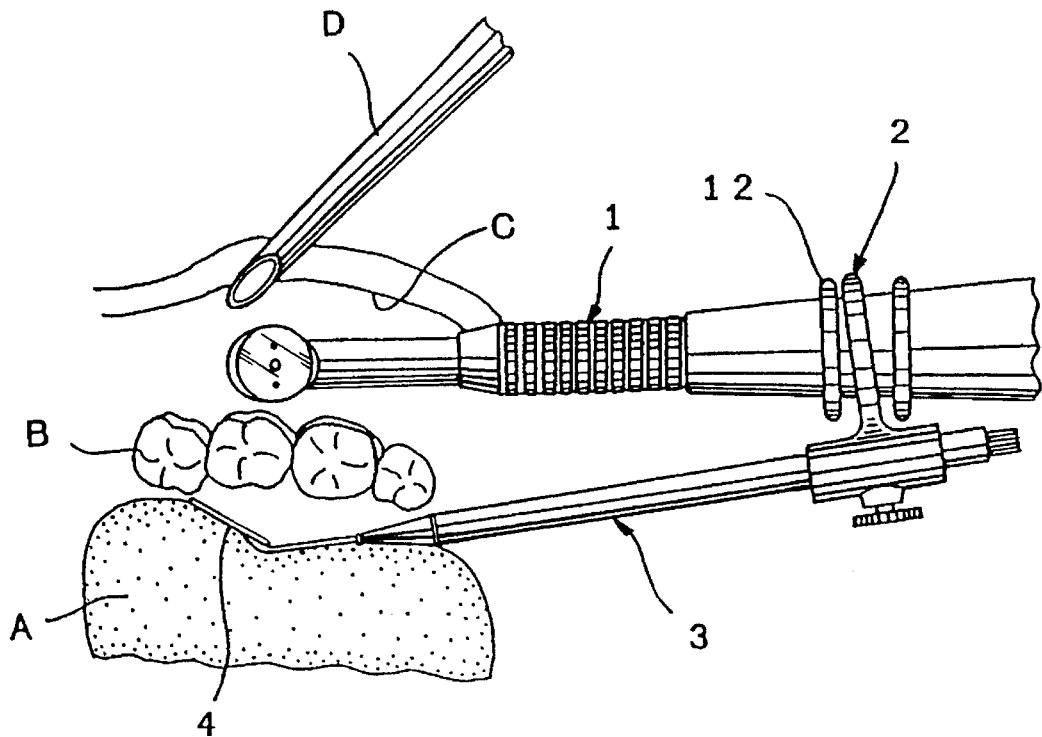
Figure 59B:
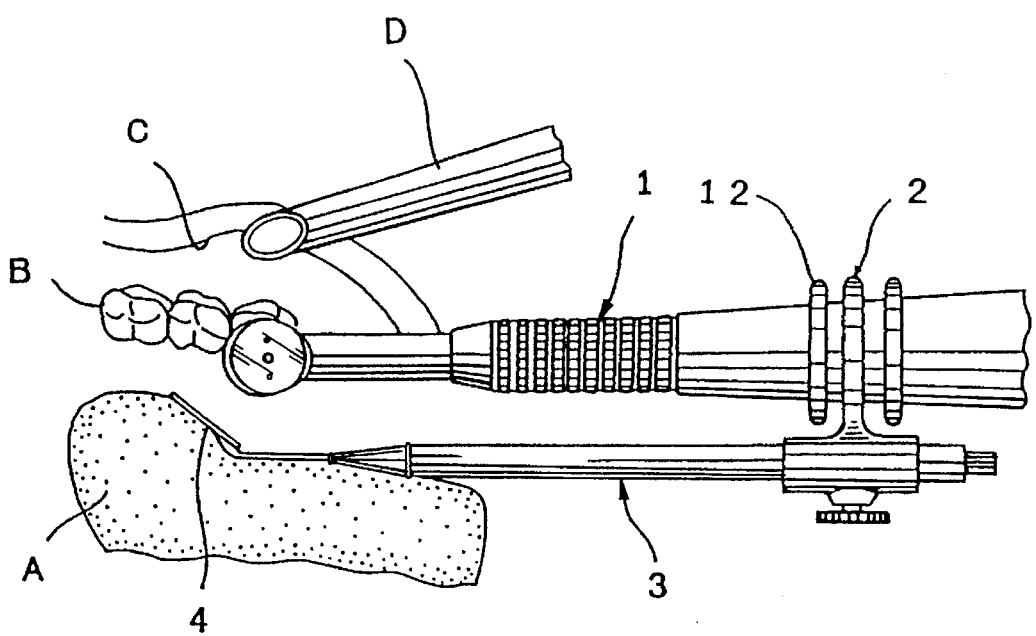
Figure 60A:
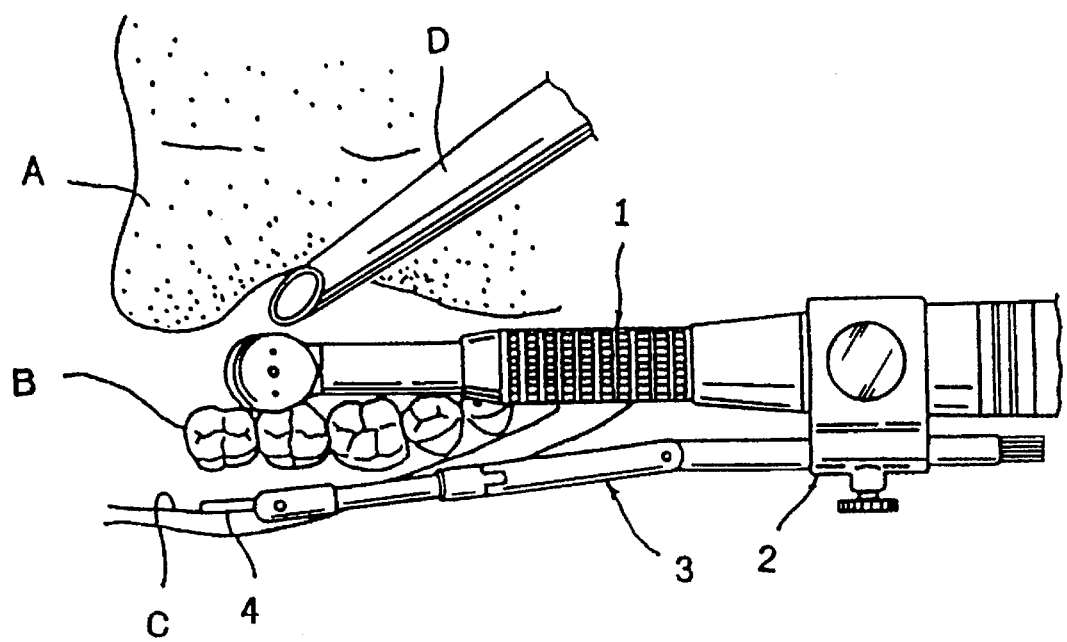
Figure 60B:
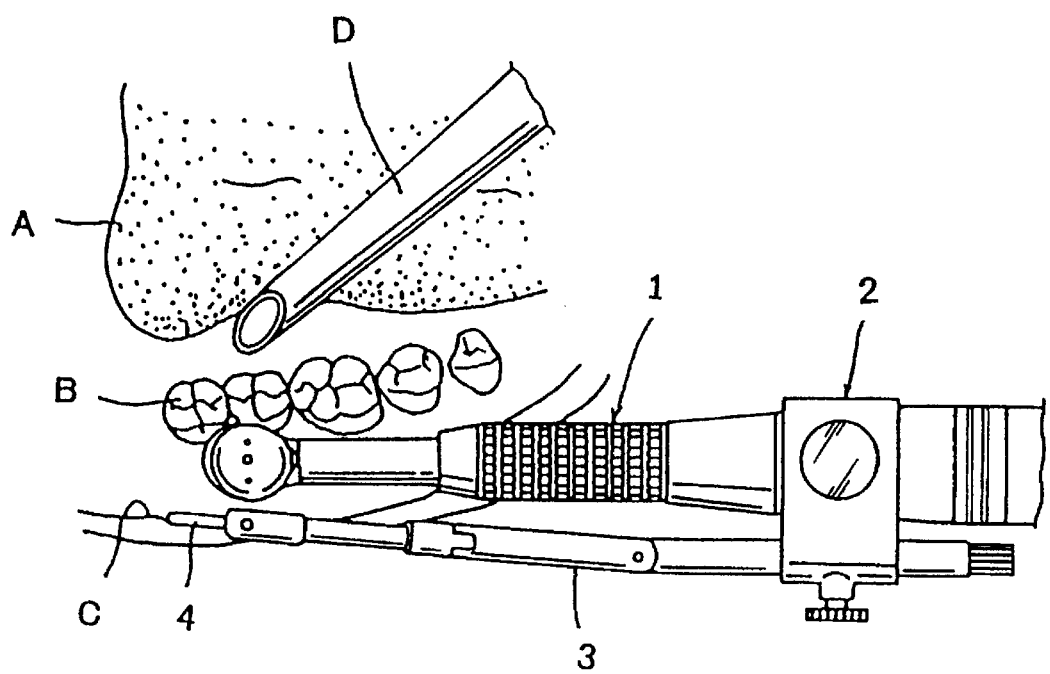
Figure 61:
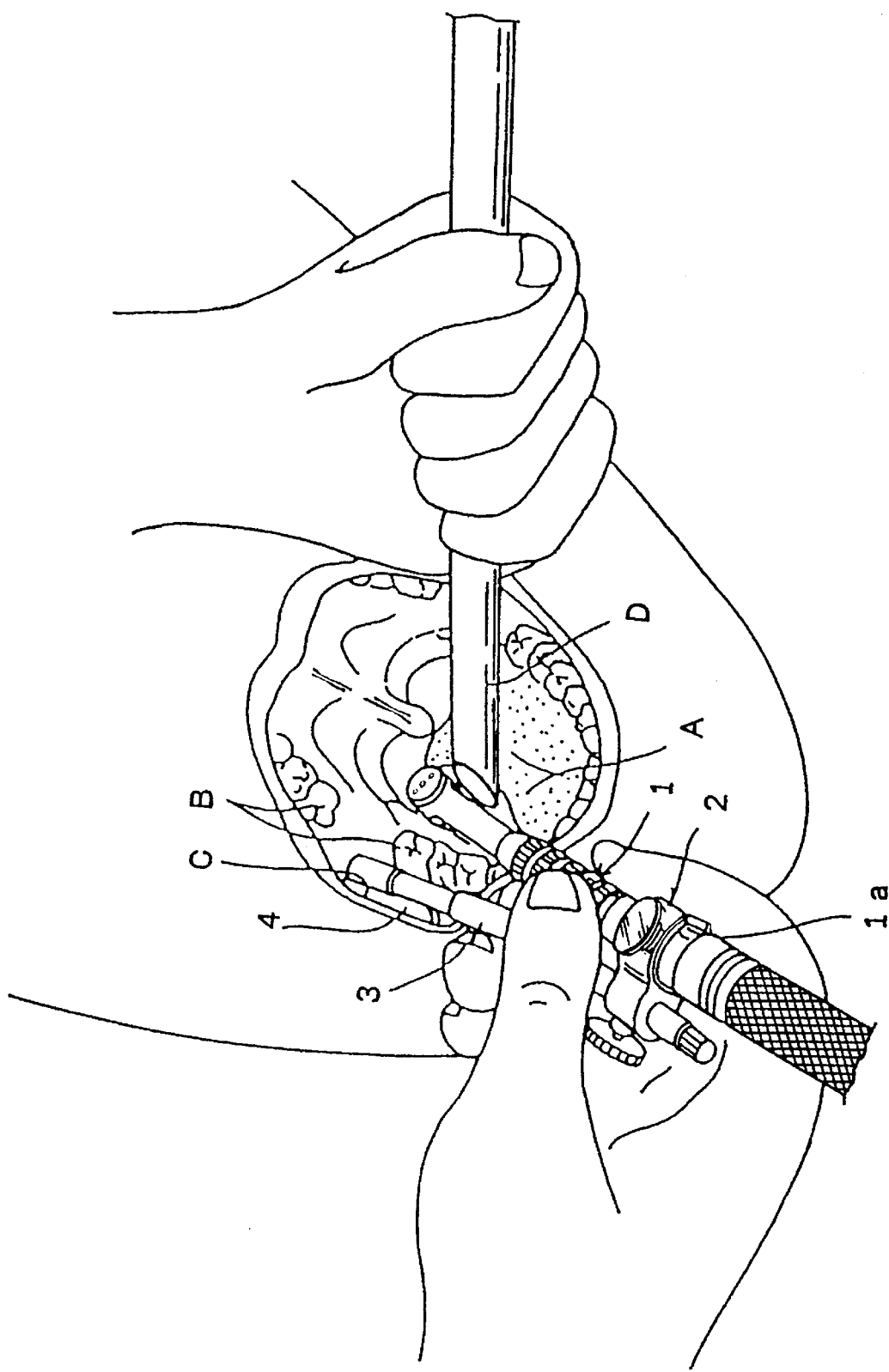
Figure 63A:
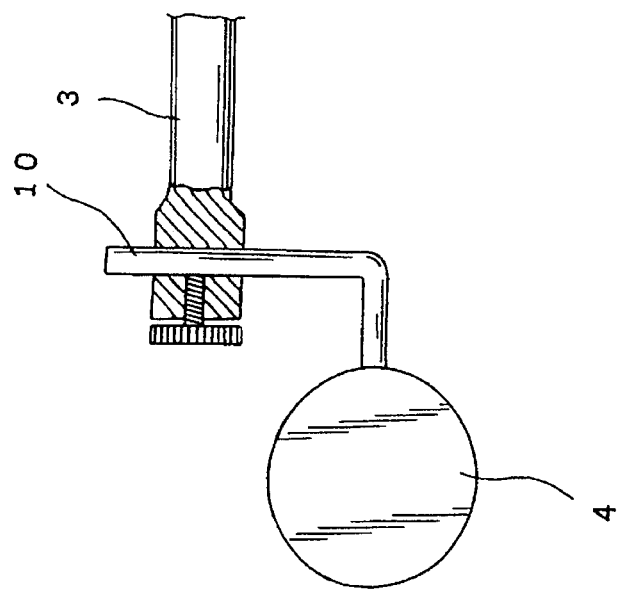
Figure 63B:
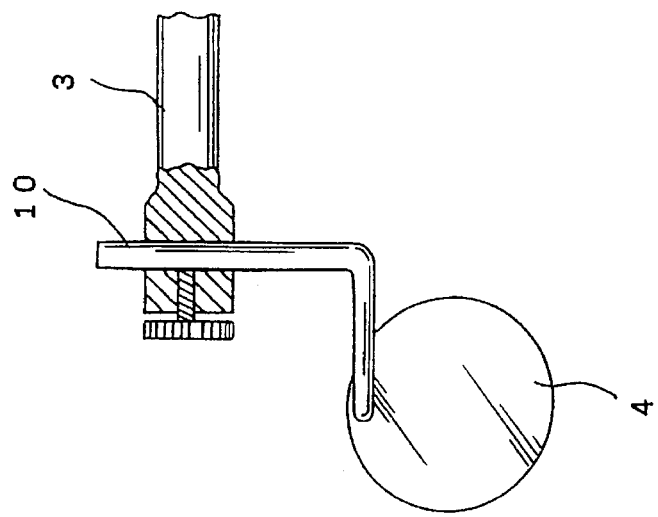
Figure 63C:
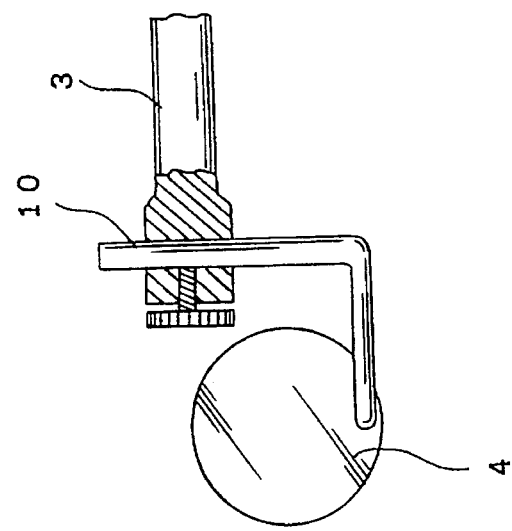
Figure 64:
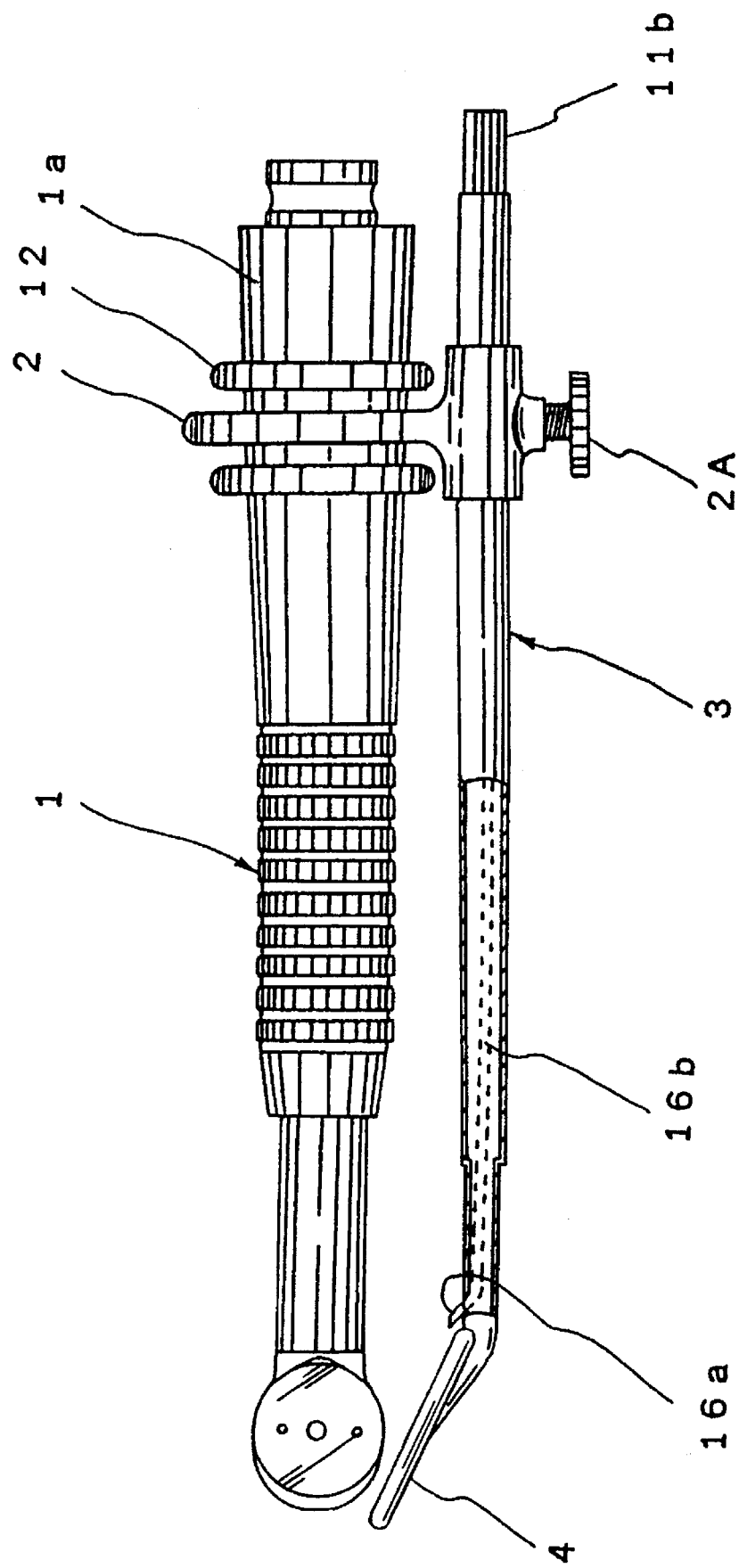
Figure 65:
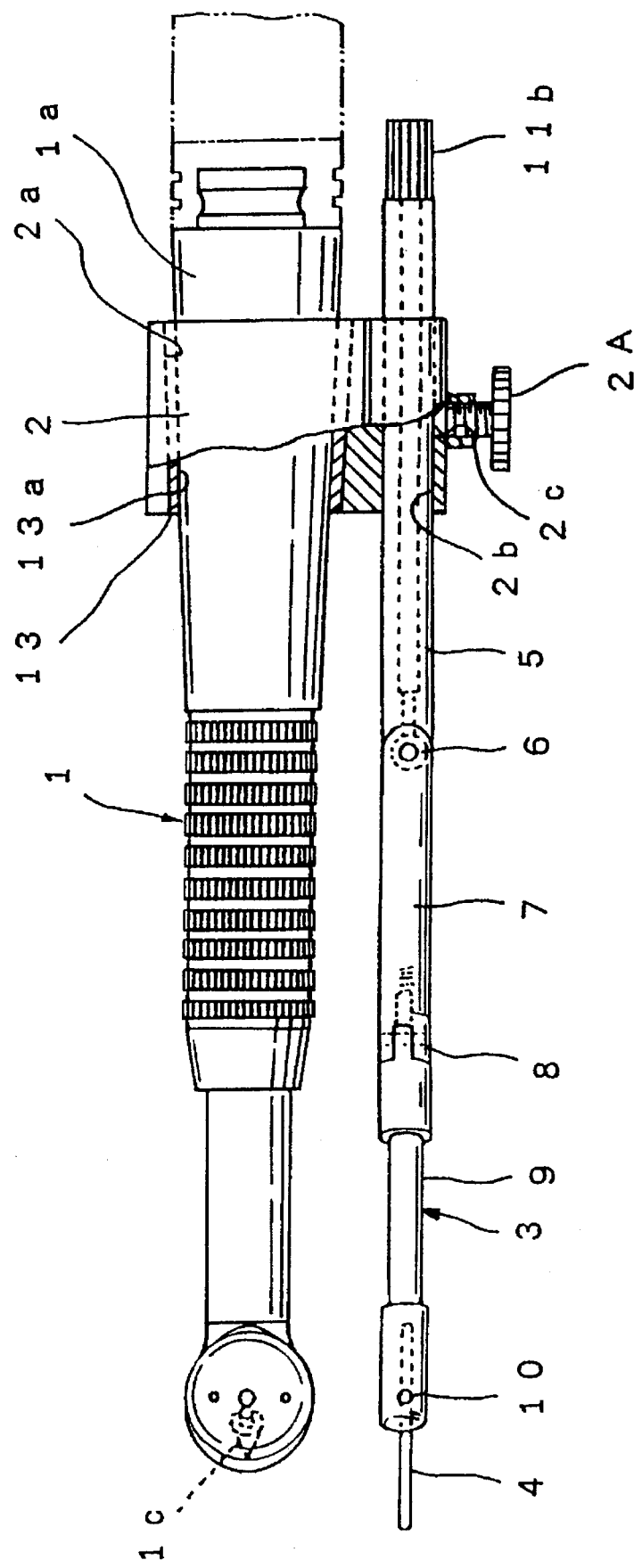
Figure 66:
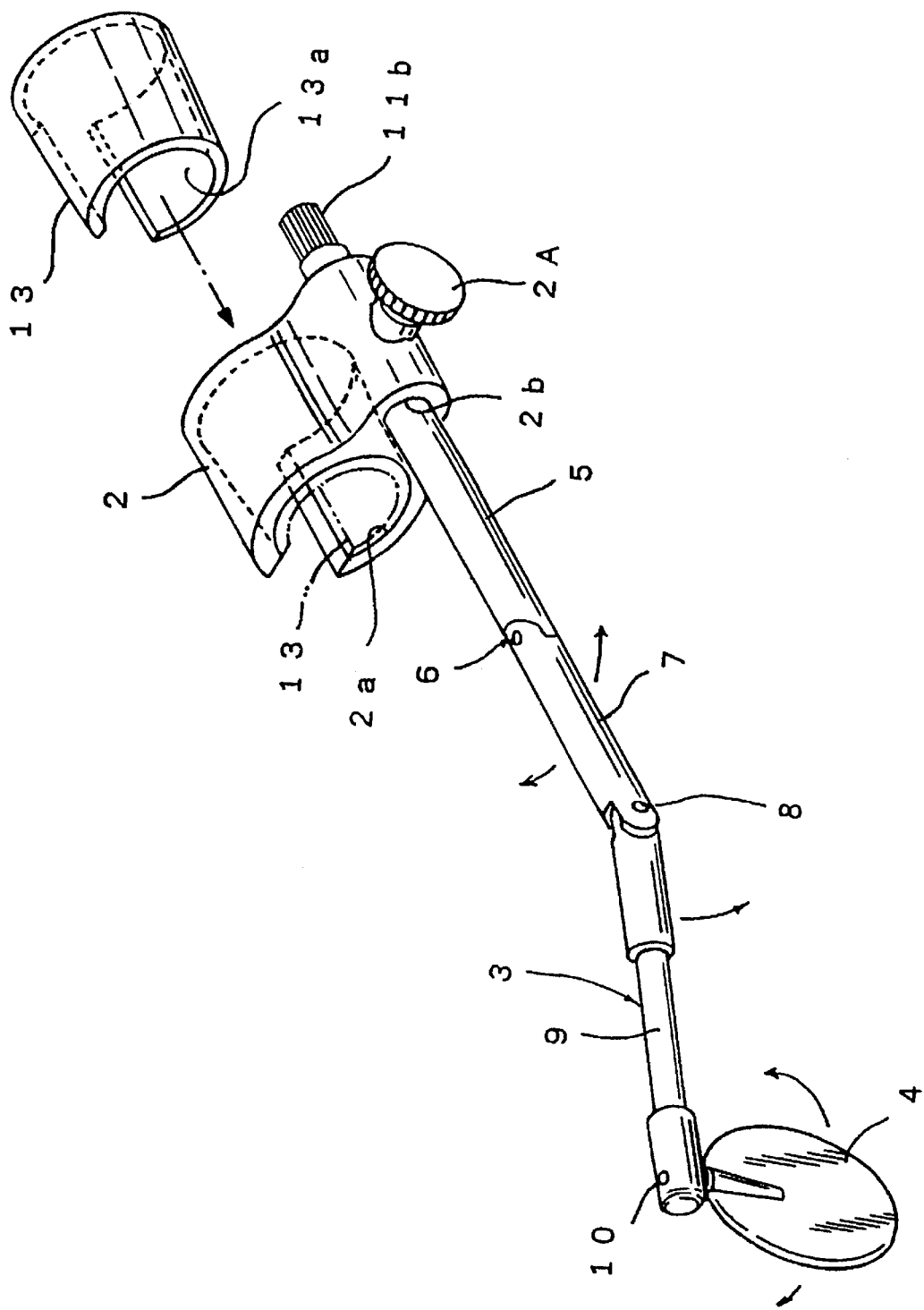
Figure 67:
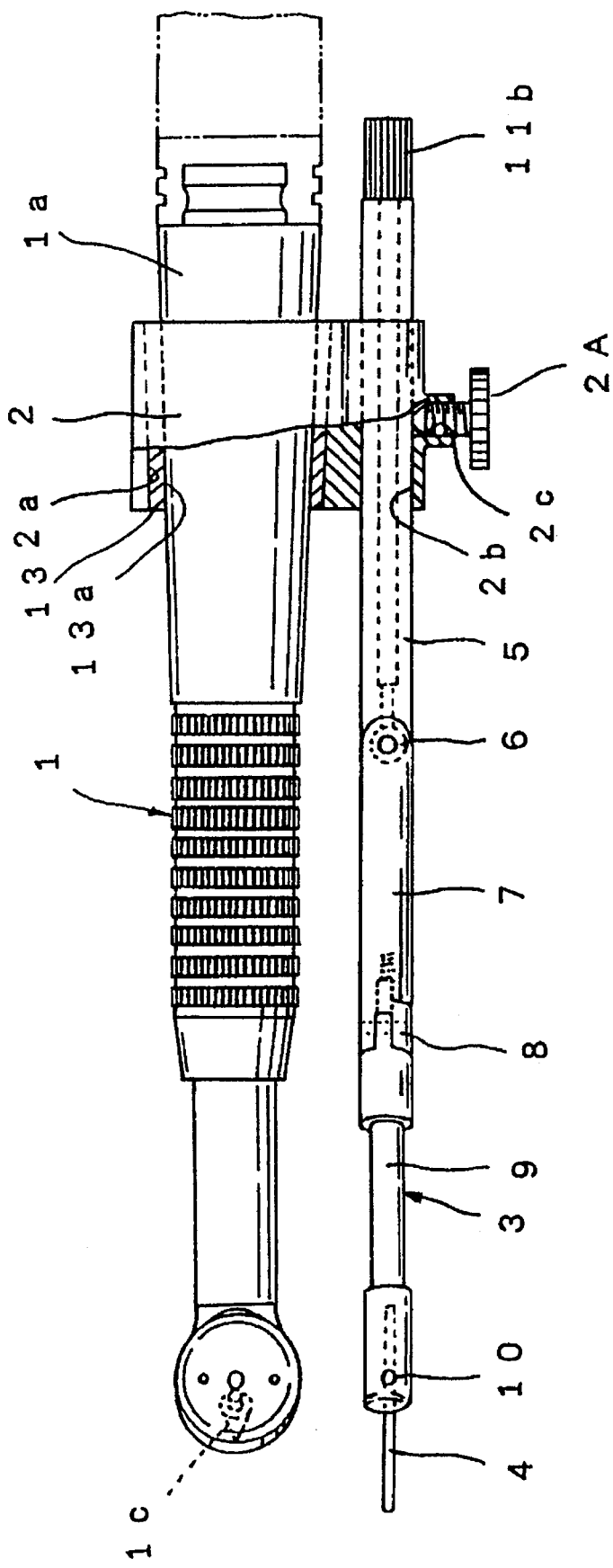
Figure 68:
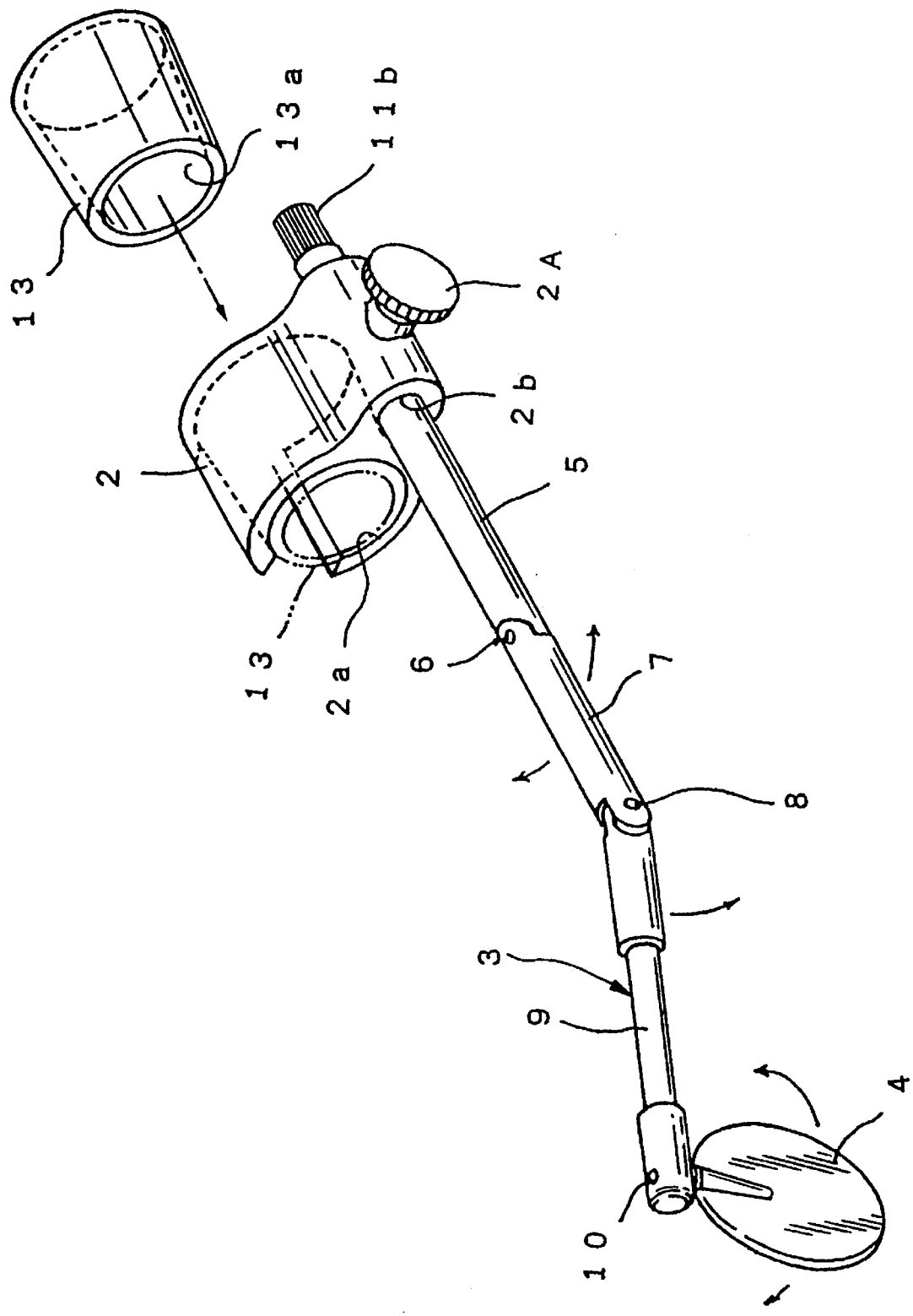
Figure 69:
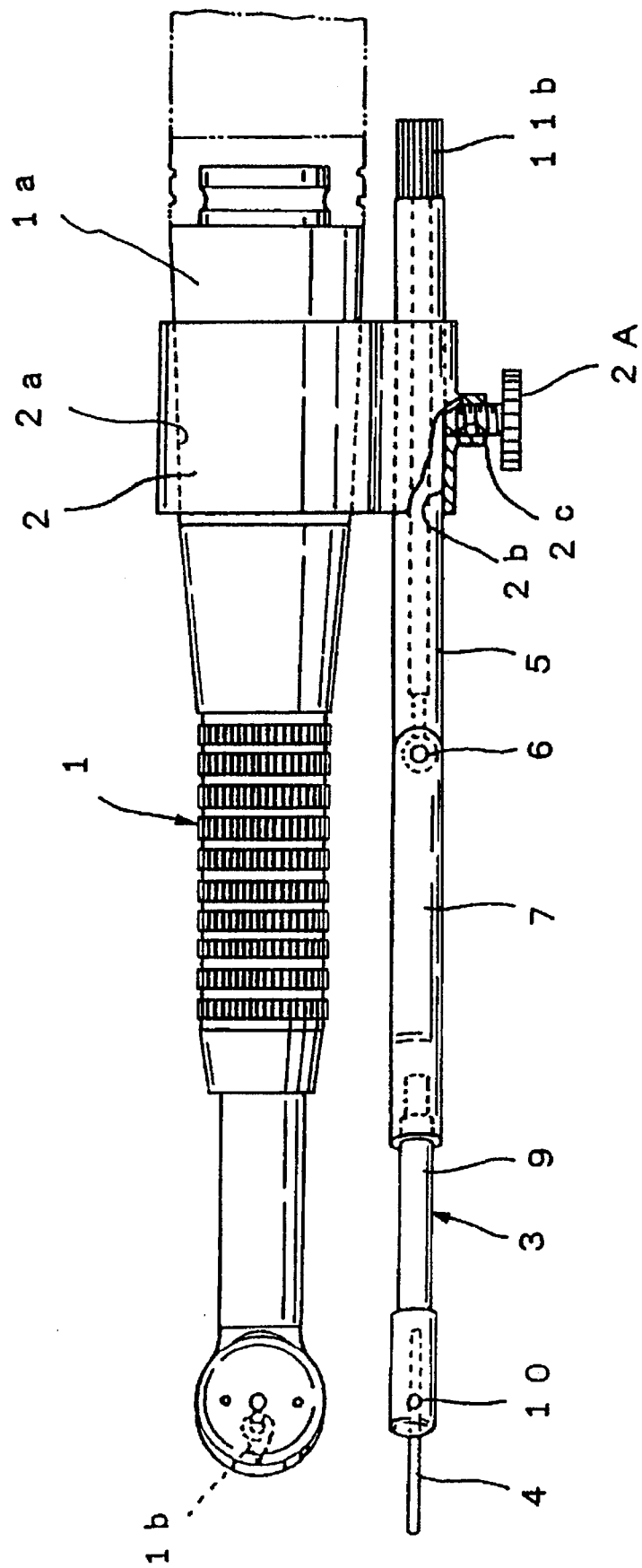

More particularly and with reference to FIG. 1, a preferred model 10 includes, among other things, an attitude indication member 12, an angle of attack indicator member 20, an aircraft member 50, an elevator assembly 60, a wing member 70 and a center of gravity symbol 80. As can be seen in FIGS. 2 and 5, the attitude indication member 12 comprises a relatively flat elongated bar 14 that has a downwardly extending connection tab 16 and a representative pilot FIG. 18 formed at the front end thereof. In addition, an axial bore 19 extends through the connection tab 16. In a preferred embodiment, the bar 14 is fabricated from a pressed cardboard material and is approximately 12" long, 1" wide and ⅛" thick. The skilled artisan will readily appreciate that such construction is particularly well adapted to be manually held and, manipulated. Those of ordinary skill in the art will also appreciate that the attitude indication member 12 may be fabricated from a myriad of other materials such as plastic, wood, etc. and may be provided in different sizes.

Figure 3:
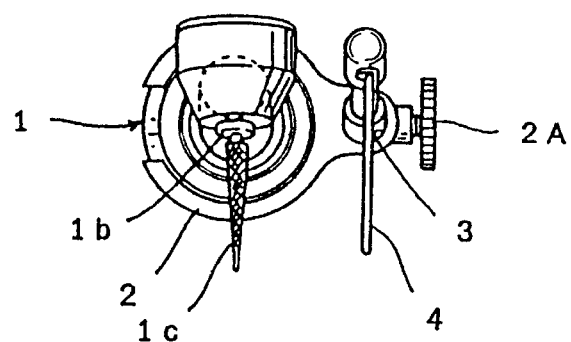
FIG. 3 is a side elevational view of a preferred angle of attack indicator member of the present invention.

A preferred angle of attack indicator 20 of the present invention is preferably configured as shown in FIGS. 3 and 5. The angle of attack indicator 20 preferably comprises a bar member 22 that has an extended handle portion 23 and is preferably fabricated from the same material that was used to construct the attitude indication member 12. In addition, the bar member 22 preferably has a downwardly extending connection tab 24 that has a bore 26 extending therethrough. The indicator 20 is preferably 16" longs 1" wide and ⅛" thick; however, the indicator 20 may have other suitable sizes and shapes. Preferably, the bottom edge 29 of the indicator member represents the instantaneous flight path of the aircraft 50 as will be described in further detail below.

Figure 4:
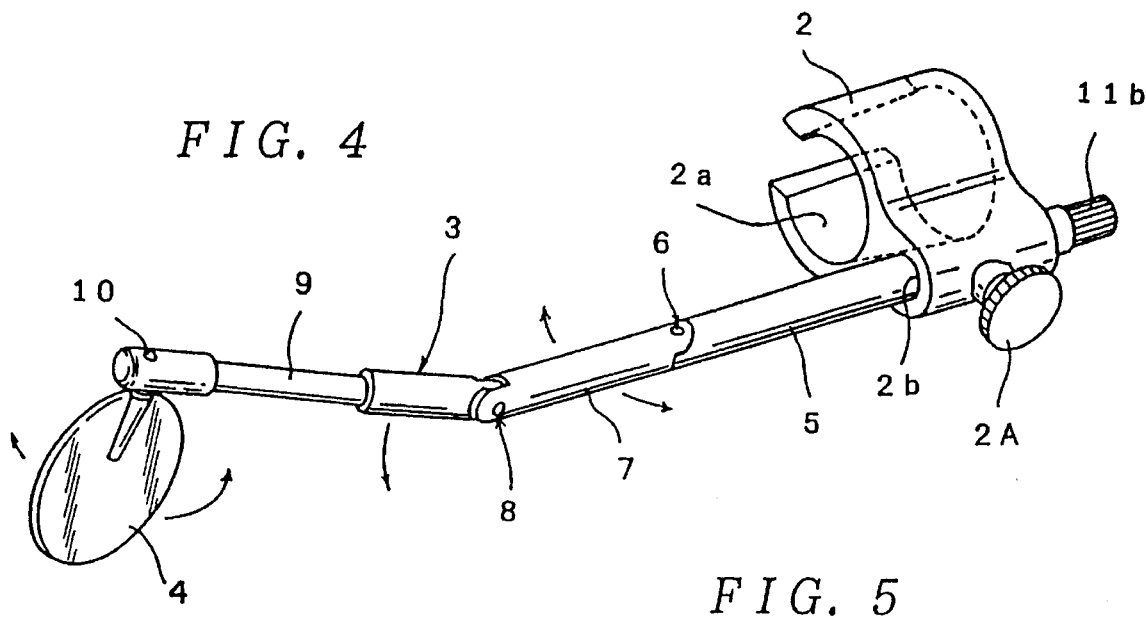
FIG. 4 is an enlarged view of preferred attack angle indicia provided on a preferred angle of attack indicator of the present invention.

As shown in FIGS. 3 and 4, the angle of attack indicator 20 is provided with indicating indicia, generally designated as 30, that represent various angles of attack relative to the instantaneous flight path that can be assumed by an aircraft. More particularly, as can be seen in FIG. 4, bore 26 is located in the bar 22 such that the center axis of the bore 26 corresponds to the lower edge 29 of the bar 22. The first angular area 32 preferably extends approximately 14° up from the bottom edge 29 of the bar 22. That 14° angle is represented by arrow "C" in FIG. 4. As will be discussed in further detail below, area 32 represents a range of angles of attack that can be safely assumed by the aircraft without danger of stalling. A second angular area 34 is also provided that represents a range of attack angles that can be assumed by the aircraft with caution, without substantial danger of stalling the aircraft. The upper limit of angular area 34 is preferably 16° up from the lower edge 29 of the bar 22. That 16° angle is represented by arrow "D" in FIG. 4. The third angular area 36 is defined by a line that is about 20° up from the lower edge 29 of the bar 22 and represents angles of attack that, if assumed by an aircraft would likely result in the aircraft stalling. That 20° angle is represented by arrow "E" in FIG. 4. Because the first angular area 32 represents a range of angles of attack that can be safely assumed without any danger of stalling the aircraft, I prefer that angular area 32 be represented by green indicia 38. Similarly, because the angular area 34 represents a range of angles of attack that can, with some caution, be assumed without a substantial risk of stalling the aircraft, I prefer that angular area 34 be represented by yellow indicia 40. Also, because the angular area 36 represents those angles of attack that will likely result in the aircraft ceasing to fly, I prefer that angular area 36 be represented by red indicia 42. Those of ordinary skill in the art will appreciate, however, that the angular areas (32, 34, 36) may be represented in a variety of other manners without departing from the spirit and scope of the present invention. As can also be seen in FIGS. 1, 3 and 4, the bar 22 is provided with an arrow member 44 that extends upward from the center axis of bore 26 and substantially perpendicular to the bottom edge 29 of the bar 22. Arrow 44 serves to represent the center of pressure acting on the aircraft.

Figure 6:
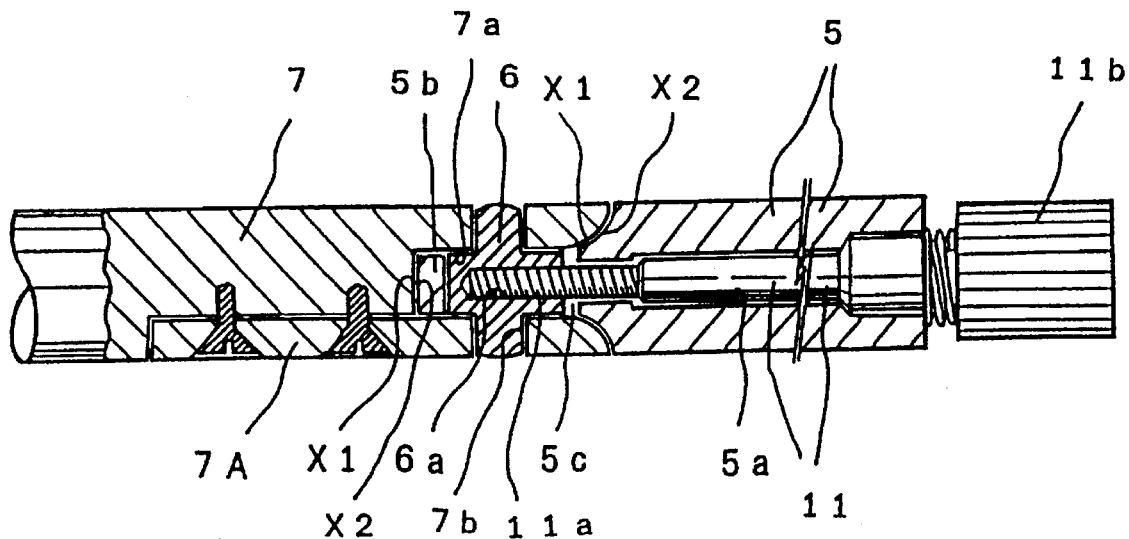
FIG. 6 is a partial side elevational assembly view of the present invention.

A preferred instructional model 10 also includes an aircraft member 50 that has a downwardly extending connection tab 52 formed along its bottom edge. See FIG. 5. The connection tab 52 also preferably has an elongated longitudinally extending slot 54 extending therethrough. In a preferred embodiment, the aircraft member 50 has a viewing window 56 therein that enables the arrow 44 on the angle of attack indicator 22 to be viewed therethrough. In addition, an elevator connection bore 57 is provided in the tail portion of the aircraft member 50 as shown in FIG. 5 to enable an elevator assembly 60 to be pivotally attached thereto. Preferably, when the slot 54 of the aircraft member 50 is aligned with the bore 26 in the angle of attack indicator 20, the bore 57 is aligned on a common horizontal plane, designated by line B—B in FIG. 6, with a bore 48 in the handle portion 23 of the angle of attack indicator 20.

Figure 9:
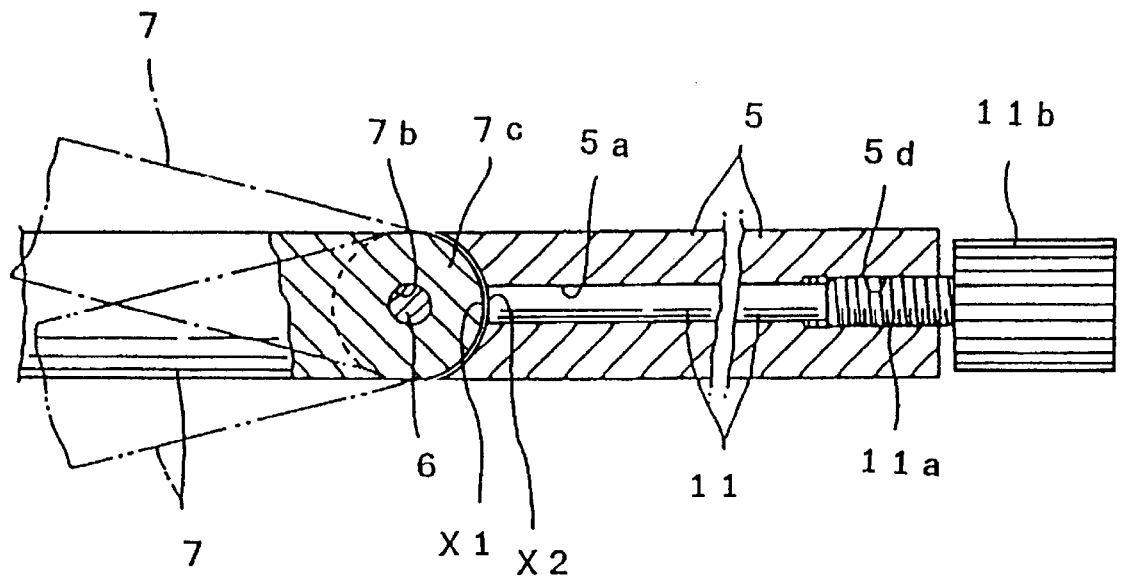
FIG. 9 is an exploded top assembly view of the instructional model of FIG. 1.

Elevator assembly 60 preferably comprises a fixed member 61 that is non-movably attached to the aircraft member 50 and an elevator 62 that is preferably attached to a pivot rod 64 by commercially available adhesive. However elevator member 62 may be fabricated from plastic or other material such that it could be removably snapped to the rod 64. Rod 64 is preferably configured as shown in FIG. 9 with a first attachment hook 66 being formed in one end and a second attachment hook 68 being formed in its other end. The first attachment hook 66 extends through the bore 57 in the tail of aircraft member 50 such that it is pivotally retained therein. Similarly, the second hook 68 is pivotally received in a bore 48 provided in the handle portion 23 of the angle of attack indicator 20.

As can be seen in FIG. 9, the attitude indication member 12, the angle of attack indicator member 20 and the aircraft member 50 are adapted to be pivotally interconnected about the axis A—A by a screw 25 and a wing nut 27. More specifically, the connection tab 16 of the attitude indication member 12, the connection tab 24 of the angle of attack indicator member 20 and the connection tab 52 of the aircraft member 50 are arranged such that their respective connection bores (19 and 26) of the attitude indication member 12 and the angle of attack indicator member 20, respectively are coaxially aligned on axis A—A with the slot 54 in the aircraft member 50. The screw member 25 is then inserted through slot 54 and bores (19, 26) and the wing nut 27 is attached thereto to complete the assembly. Those of ordinary skill in the art will appreciate, however, that the attitude indication member 12, the angle of attack indicator member 20 and the aircraft member 50 may be pivotally interconnected together along a common axis by a variety of other suitable fastening means such as rivets and the like.

Also in a preferred embodiment; a wing member 70 is adapted to be attached to the aircraft member 50. See FIGS. 1 and 7. Wing member 70 is preferably marked with a line 72 that represents the chord line of that particular wing design. Preferably, the wing member 70 is removably attached to the aircraft member 50 by pieces of hook and loop fastening material (not shown) sold under the mark Velcro®; however, other suitable fastening means may also be successfully used. It will be appreciated that such arrangement permits various differently configured wings to be selectively attached to the aircraft member 50 for instructional purposes.

Also, as was mentioned above, a preferred form of the present invention includes a center of gravity symbol 80 that is preferably attached to the outer surface of the wing member 70 by hook and loop fastening means (not shown) attached along the outer surface of the wing member 70 and the rear side of the symbol 80. See FIGS. 1 and 8. It will be appreciated that the hook and loop fastening means on the wing member 70 are arranged so as to avoid obliterating the chord line 72.

An understanding of a preferred method of using the above-described embodiment of the present invention can be gleaned from reference to FIG. 1. To use the model 10 of the present invention, the wing member 70 is attached to the aircraft member 50 in the manner described above. Thereafter, the center of gravity symbol 80 is attached to the wing member 70 in a position that represents the manner in which the aircraft in which the model 10 is intended to represent is loaded. For example, if the user desires to demonstrate various principles relating to an aircraft that is not loaded with cargo, the center of gravity locator 80 would be attached to the wing member 70 such that the center of gravity symbol 80 is located directly under the arrow If, however, the user chooses to demonstrate principles relating to an aircraft that is carrying cargo that would tend to shift the center of gravity of the aircraft rearwardly, the center of gravity symbol 80 would be attached to the wing member such that it is closer to the wing's trailing edge. Conversely, if the user chooses to demonstrate principles relating to an aircraft that is loaded such that the center of gravity thereof is shifted more to the front of the aircraft, the user would attach the center of gravity symbol 80 closer to the wing's leading edge.

After the wing member 70 and center of gravity symbol 80 have been attached in the above-described manner, the user grasps the angle of attack indicator member 20 in the user's left hand so that the printed indicia 30 on the angle of attack indicator 20 is facing the user. The user then selectively pivots the aircraft member 50 relative to the angle of attack indicator 20 to a selected angle of attack with the user's right hand. After the user selects the angle of attack, the instantaneous flight path is selected by pivoting the angle of attack indicator 20 relative to the attitude indicator 12. It will be understood that the bottom leading edge of the angle of attack indicator represents the direction of the instantaneous flight path or the direction of the relative wind.

After the user has adjusted the model 10 in the manner described above, the user can view the relationship between the pilot's viewing attitude (represented by the pilot figure on the attitude indicator) and the aircraft's instantaneous flight path (represented by the lower edge 29 of the bar 22). For example, in the arrangement depicted in FIG. 1, the pilot's viewing attitude is relatively horizontal (represented by arrow "G" in FIG. 1) while the instantaneous flight path (i.e., the direction of the relative wind) is approaching the aircraft member 50 at an upward angle relative thereto. The user can also view the position of the center of pressure (represented by arrow 44) relative to the center of gravity (symbol 80) and angle of attack through the viewing window 56 in the aircraft member 50. In addition, when the aircraft member 50 is pivoted to a desired angle of attack, it causes the elevator 62 to pivot to a position that is representative of the position that the elevator of an aircraft would assume if the aircraft was flying at the selected angle of attack.

Figure 10:
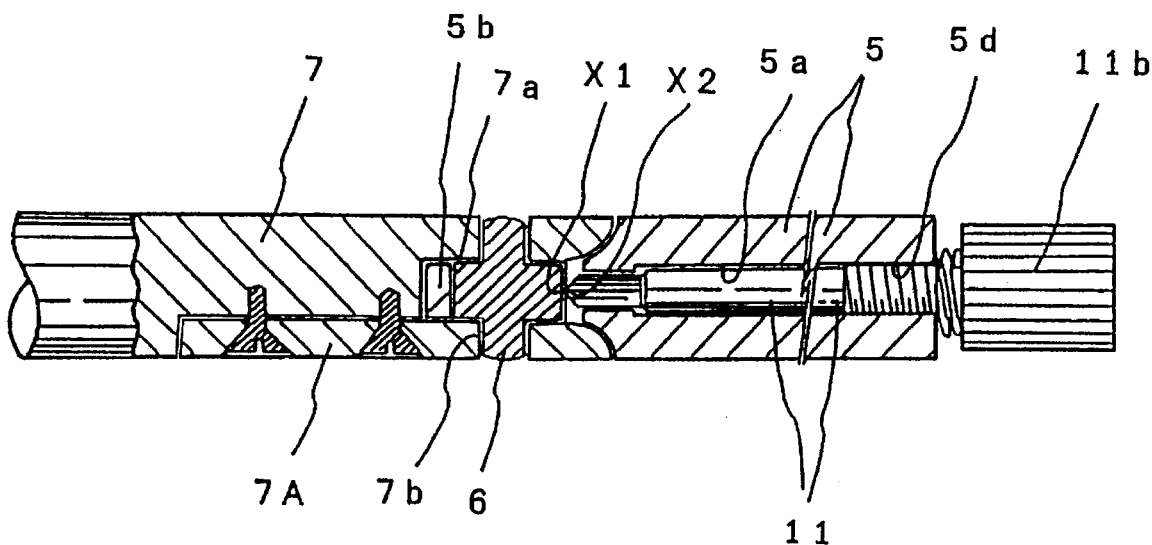
FIG. 10 is a side elevational assembly view of another preferred instructional model of the present invention.
Figure 11:
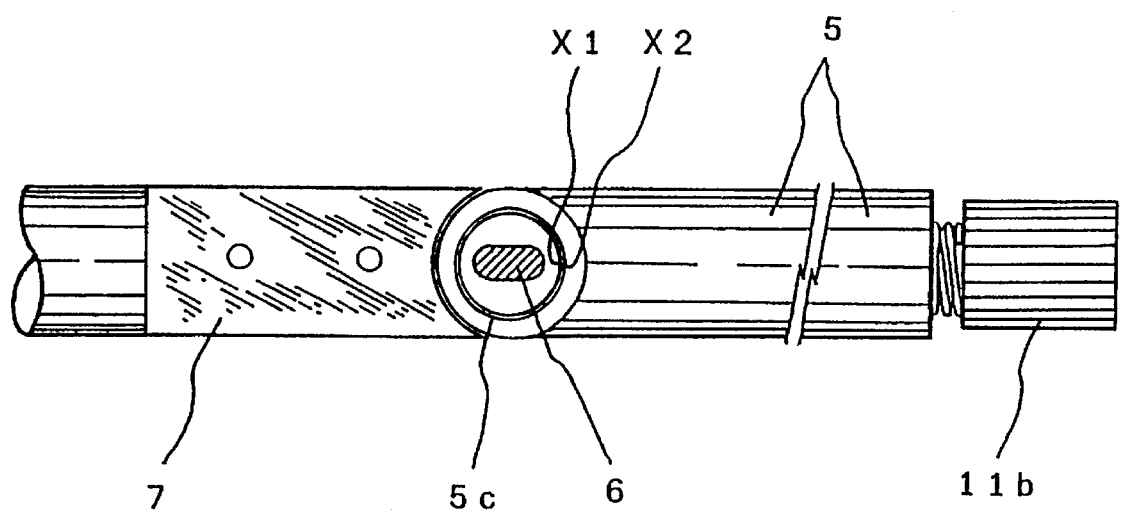
FIG. 11 is a side elevational view of a preferred angle of attack indicator member of the instructional model of FIG. 10.
Figure 12:
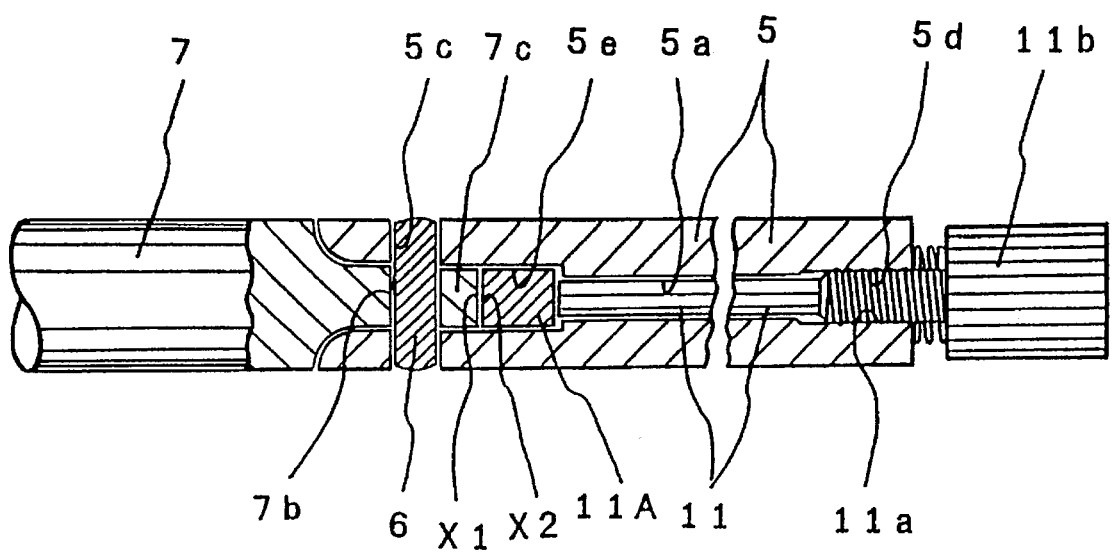
FIG. 12 is an exploded top assembly view of the instructional model of FIGS. 10 and 11.
Figure 13:
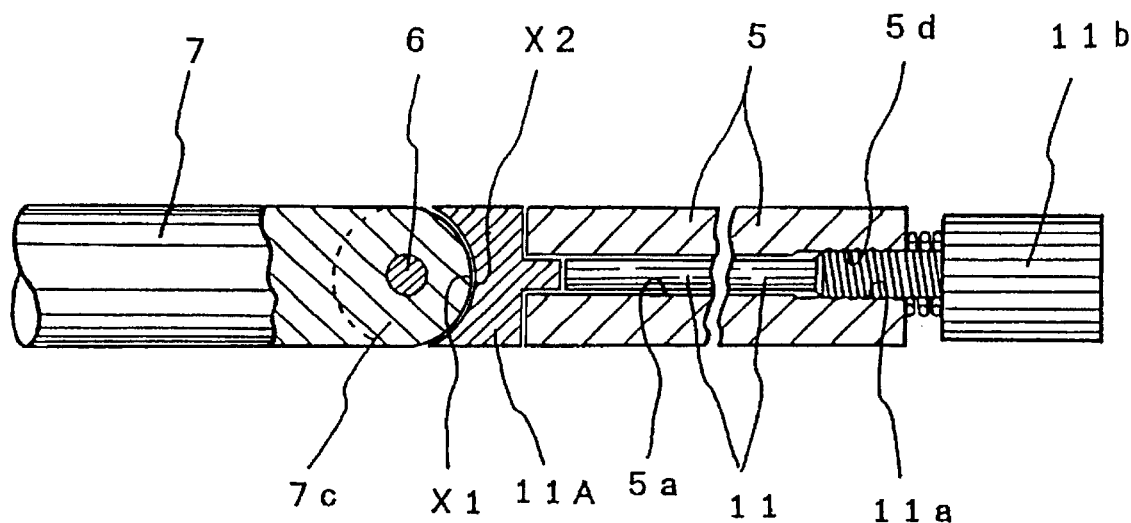
Figure 14:
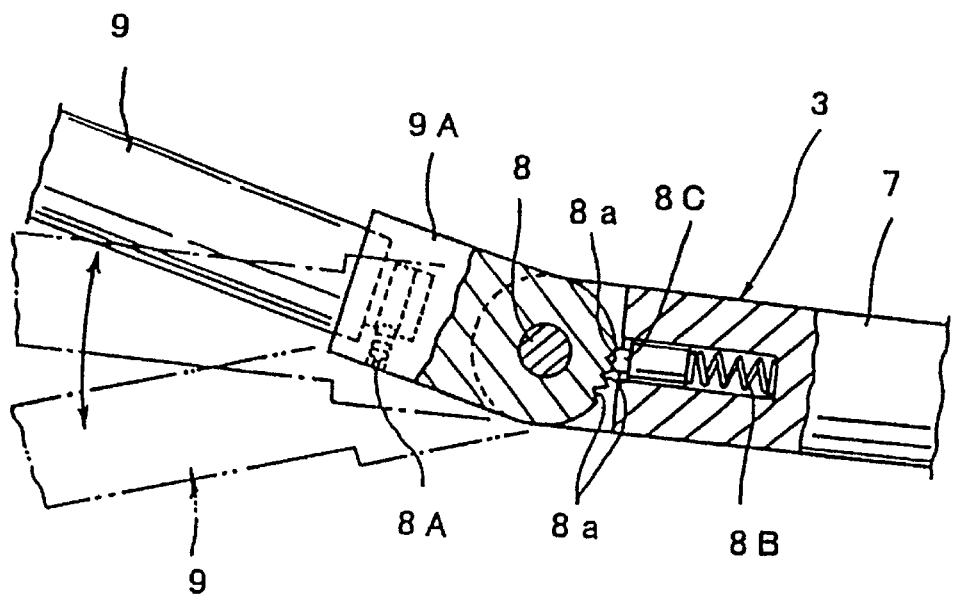
Figure 15:
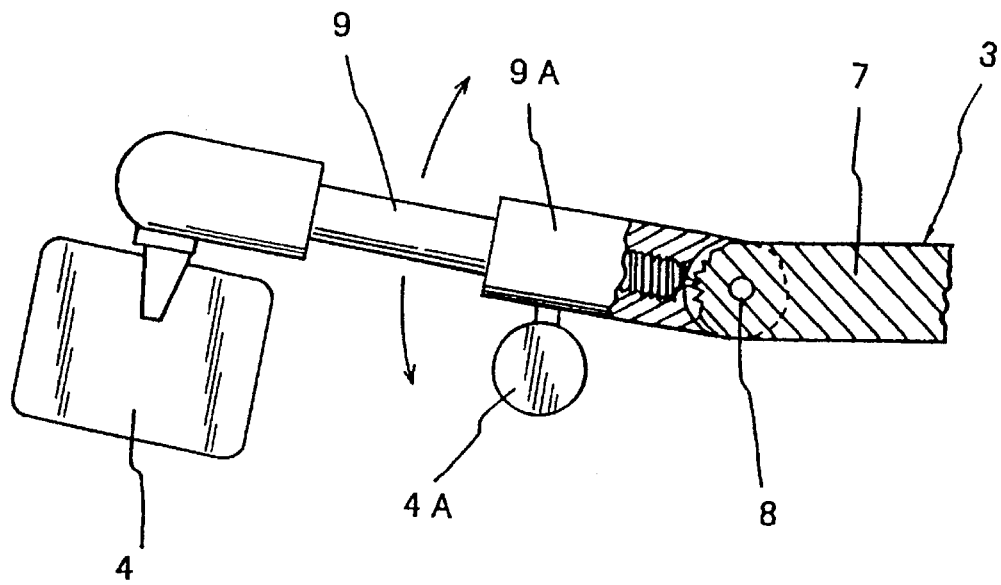
Figure 16A:
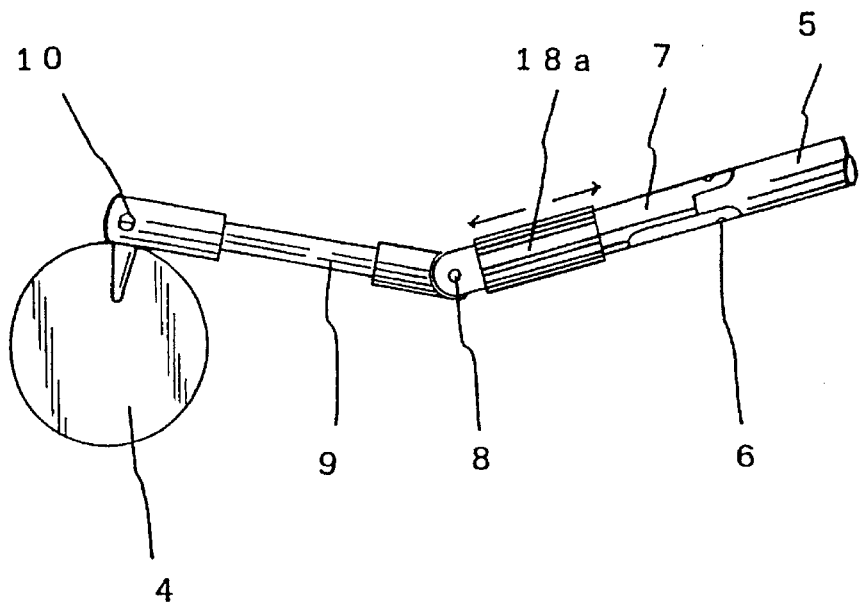
Figure 16B:
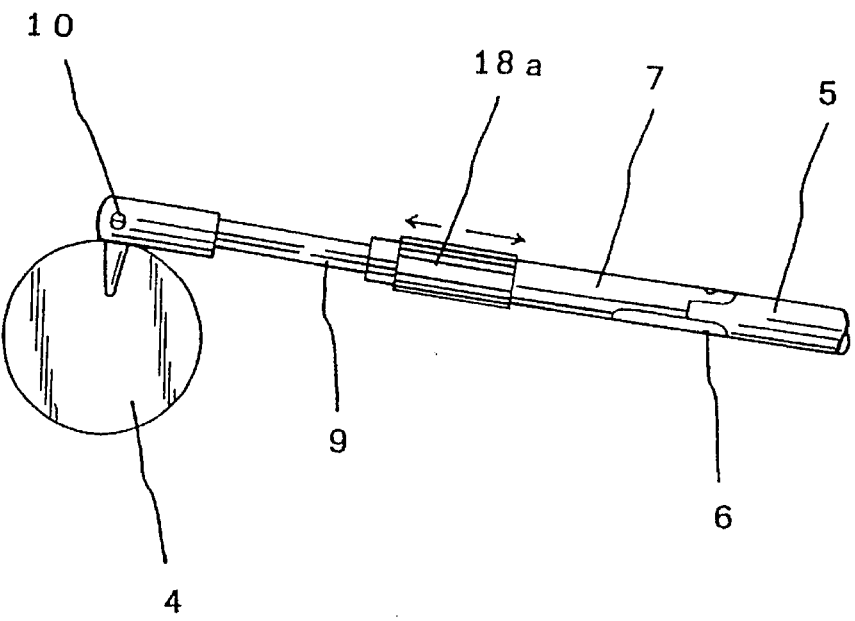
Figure 17A:
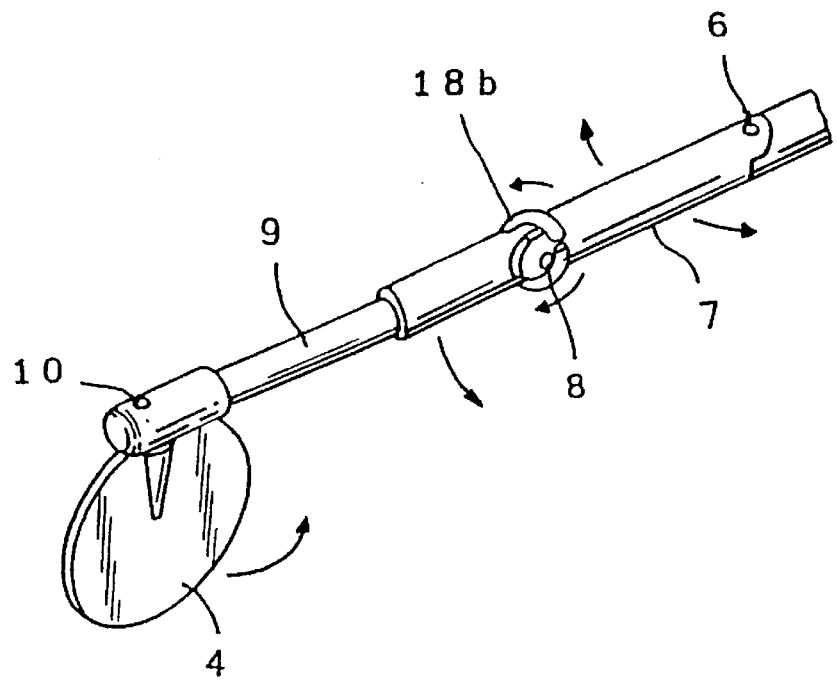
Figure 17B:
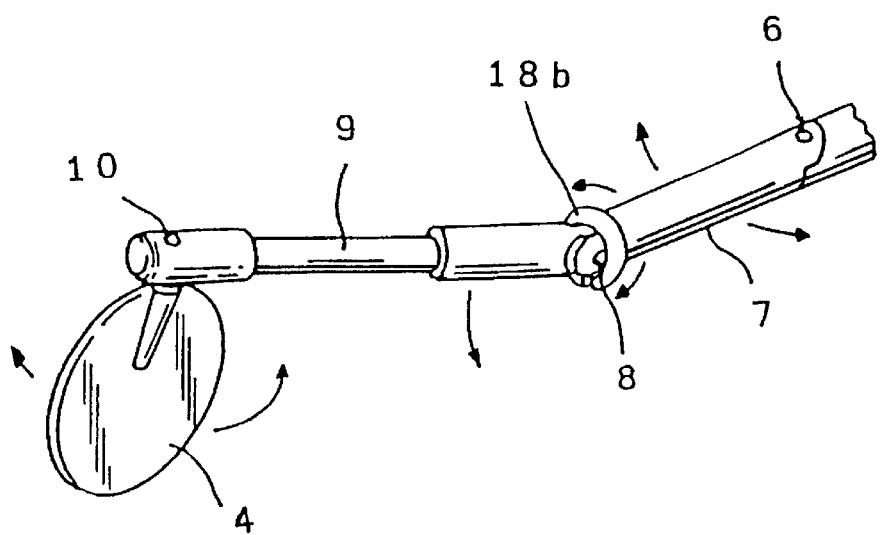

Another preferred embodiment of the present invention is depicted in FIGS. 10–12. As can be seen in those Figures, the model 10' is substantially identical to the model 10 described above; however, in this embodiment, the pilot FIG. 18' is formed on the front portion of the angle of attack indicator 20' and, therefore, no separate angle of attack indicator is provided. The remaining portions of the elements of model 10' are identical to the elements of model 10 and are identified in FIGS. 10–12 by a (') symbol. Those of ordinary skill in the art will appreciate, however, that model 10' does not permit the instantaneous flight path to be selectively changed relative to the pilot's viewing attitude.

Thus, as can be appreciated from the foregoing description, the present invention solves many problems encountered when using prior apparatuses to educate pilots. In particular, it provides an inexpensive and portable model that can be used to demonstrate relationships between an aircraft's angle of attack, instantaneous flight path, center of pressure, load distribution and elevator positions. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. An instructional model, comprising:

an indicator member having a means thereon that represents the instantaneous flight path of an aircraft, said indicator member further having attack angle means thereon for representing a range of attack angles at which said aircraft can fly relative to said instantaneous flight path, said indicator member having center of pressure means for representing the center of pressure acting on said aircraft when flying at said attack angles; and a second member representing said aircraft, said second member being pivotally attached to said indicator member such that said second member can be selectively pivoted relative to said indicator member to an attack angle within said range of said attack angles such that said center of pressure means identifies a point on said second member which represents a corresponding point on said aircraft at which the center of pressure forces are applied thereto when flying at said selected attack angle.

2. The instructional model of claim 1 further comprising attitude indicator means attached to indicator member for representing a viewing attitude that a pilot piloting said aircraft would have when flying said aircraft at said selected attack angle.

3. The instructional model of claim 2 wherein said attitude indicator means is pivotally attached to said indicator member such that said viewing attitude may be selectively altered relative to said instantaneous flight path for demonstrative purposes.

4. The instructional model of claim 1 wherein said attack angle means identifies an attack angle which, if exceeded by said aircraft, will cause said aircraft to cease flying.

5. The instructional model of claim 1 wherein said second member has a shape that corresponds to the shape of said aircraft.

6. The instructional model of claim 5 further comprising elevator means attached to said second member for representing corresponding elevators on said aircraft.

7. The instructional model of claim 6 wherein said elevator means is pivotally attached to said second member and said indicator member such that when said second member is pivoted to a selected attack angle, said elevator means is pivoted to an elevator position that represents a position in which said corresponding elevators are in when said aircraft is flying at said selected attack angle.

8. The instructional model of claim 1 further comprising wing means removably attached to said second member for representing the wings of said aircraft.

9. The instructional model of claim 8 further comprising center of gravity means for representing the center of gravity of said aircraft.

* * * * *

UNITED STATES PATENT AND TRADEMARK OFFICE
CERTIFICATE OF CORRECTION

Figure 70:
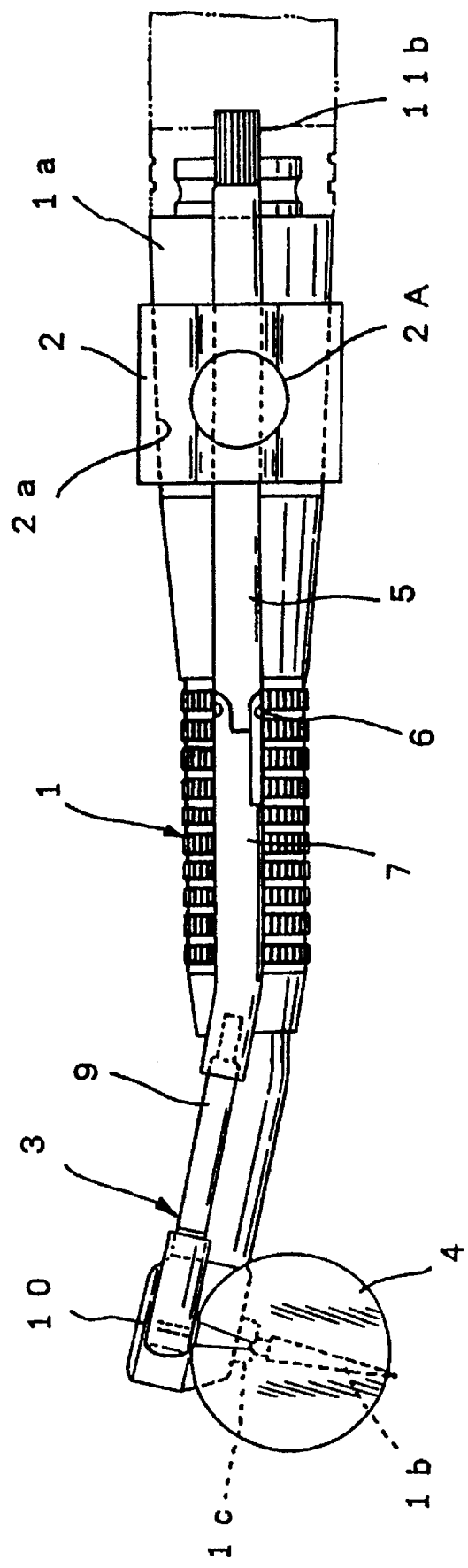
Figure 1:
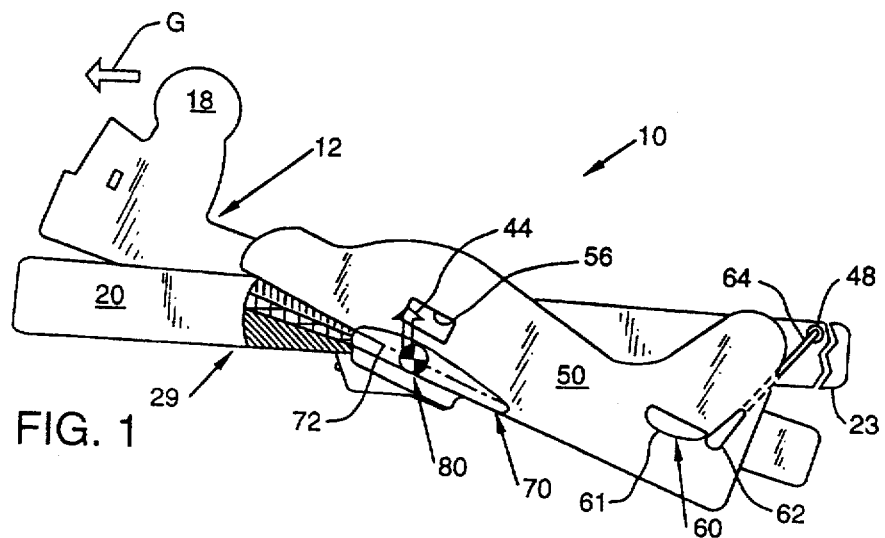
Figure 2:
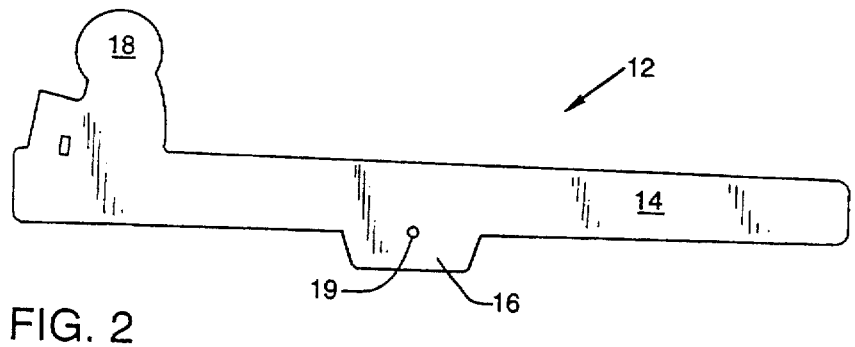
Figure 3:
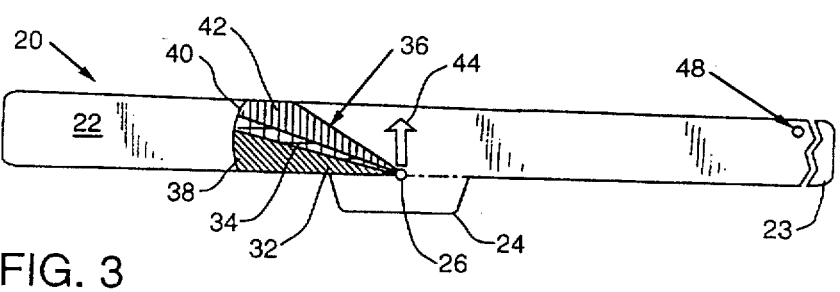
Figure 4:
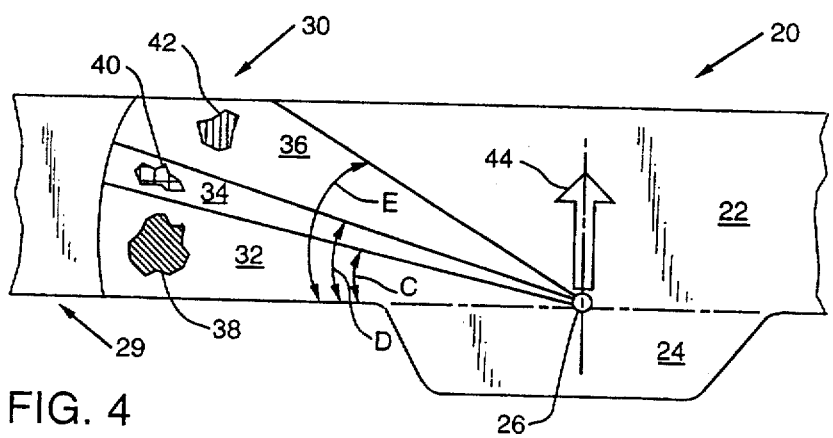
Figure 5:
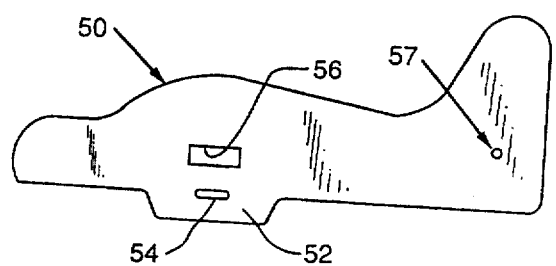
Figure 6:
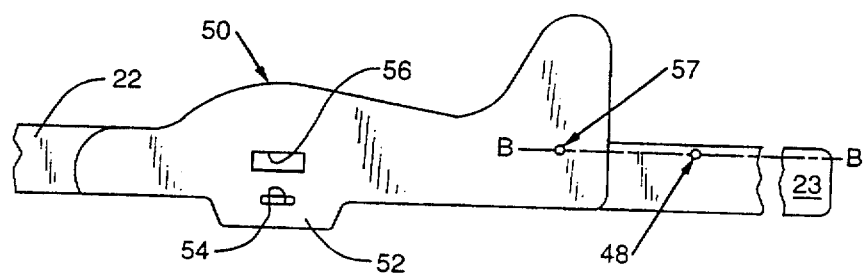
Figure 10:
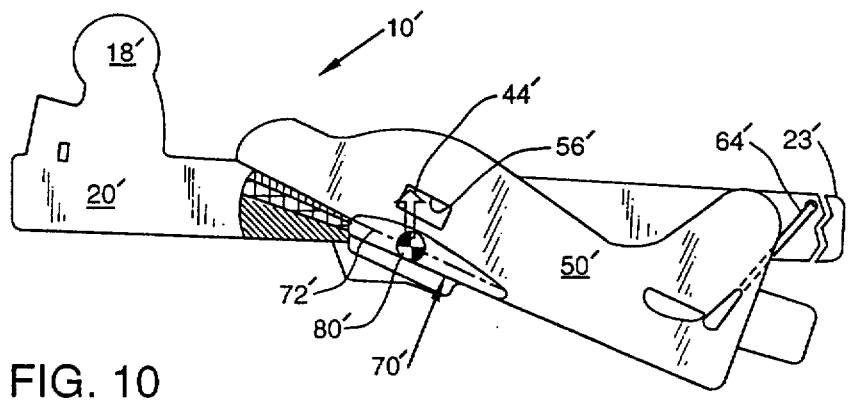
Figure 11:
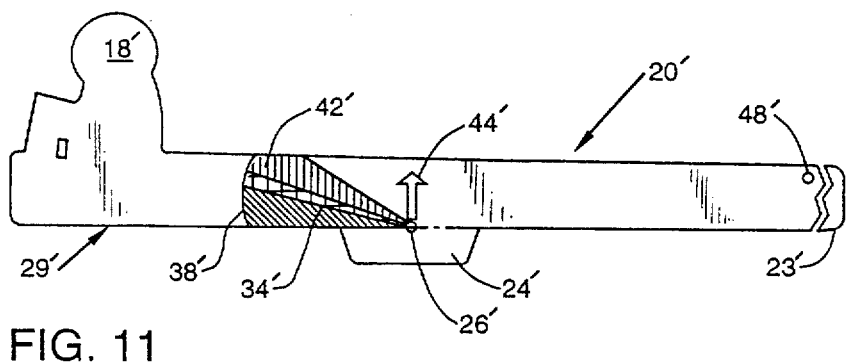
Figure 12:
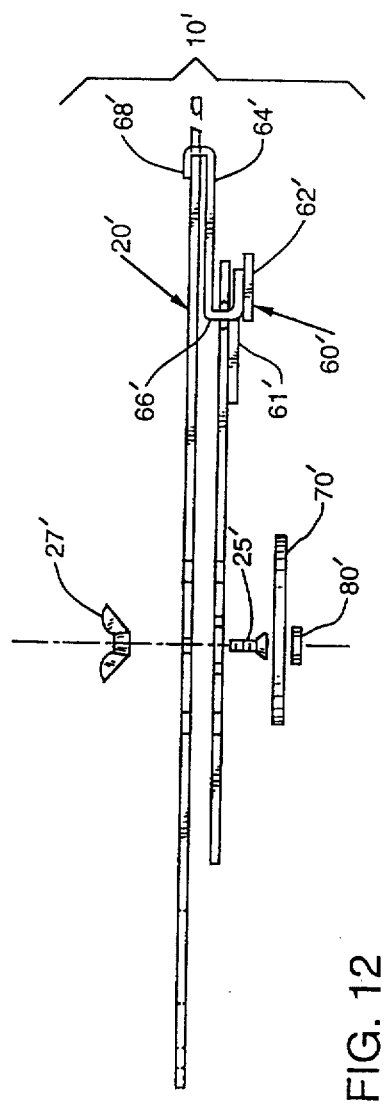

PATENT NO.   : 5,607,307
DATED        : Mar.4, 1997
INVENTOR(S)  : Thomas F. Shefchunas It is certified that error appears in the above-identified patent and that said Letters Patent is hereby corrected as shown below:

The title page, should be deleted to be replaced with the attached title page.
The drawing sheets, consisting of Figs 1 - 70, should be deleted to be replaced with the drawing sheets, consisting of Figs. 1 - 12, as shown on the attached pages.

Signed and Sealed this

Twenty-third Day of September, 1997

Attest:

BRUCE LEHMAN

*Attesting Officer*　　　*Commissioner of Patents and Trademarks*

United States Patent [19]

Shefchunas

[11] Patent Number: 5,607,307
[45] Date of Patent: Mar. 4, 1997

[54] INSTRUCTIONAL APPARATUS FOR SIMULATING THE OPERATION OF AN AIRCRAFT

[76] Inventor: Thomas E. Shefchunas, 112 Edwin Cir., Franklin, Pa. 16323

[21] Appl. No.: 495,354

[22] Filed: Jun. 27, 1995

[51] Int. Cl.⁶ .............................. G09B 9/16; G09B 9/20
[52] U.S. Cl. .............................................. 434/30; 434/49
[58] Field of Search .............................. 434/30, 32, 35, 434/37, 45, 49

[56] References Cited

U.S. PATENT DOCUMENTS

| D. 148,800 | 2/1948 | Laughead | 434/32 |
|---|---|---|---|
| 1,876,418 | 9/1932 | Holst | |
| 2,331,304 | 10/1943 | Carmody | |
| 2,428,706 | 10/1947 | Hardell | 434/32 |
| 2,495,709 | 1/1950 | Drown et al. | 235/61 |
| 2,584,113 | 2/1952 | Butler | |
| 2,935,796 | 5/1960 | Hunt | 434/49 |
| 3,471,942 | 10/1969 | Wieitzman et al. | 434/49 |
| 3,680,230 | 8/1972 | Thompson | 434/30 |
| 3,702,504 | 11/1972 | Cramer | 434/49 |
| 3,886,334 | 5/1975 | Cummings et al. | 434/30 |
| 4,269,596 | 5/1981 | D'Andrade | 434/32 |

OTHER PUBLICATIONS

Michael A. Argentieri, *Flying Angle of Attack Can Help Pilots Make Safer, Easier Landings*, Aero, Jan., 1978.

Bud Corban, *Should You Fly By Angle-of-Attack Indicator?*, Avionics—Reprinted from *Plane & Pilot*, Feb., 1981.

Navweps 00-80T-80 *Application of Aerodynamics To Specific Problems of Flying*, pp. 350–353, Revised Jan., 1965.

Navweps 00-80T-80, *Basic Aerodynamics*, pp. 22–27 and 63–67, Revised Jan., 1965.

Richard D. Gless, Paul Bray, *Avoiding The Stall/Spin Accident*, AOPA Air Safety Foundation, pp. 1–12, 1991.

FAA, Flight Training Handbook AC61-21A, pp. 257–270, publication date unknown.

*Primary Examiner*—Paul J. Hirsch
*Attorney, Agent, or Firm*—Kirkpatrick & Lockhart LLP

[57] ABSTRACT

An instructional model. The model, in a preferred form, includes an indicator member that represents the instantaneous flight path of an aircraft. The indicator member has indicia thereon that represents a range of attack angles at which the aircraft could fly relative to the instantaneous flight path. The indicator member also has indicia thereon that represents the center of pressure acting on the aircraft when flying at a selected attack angle. A second member that represents an aircraft is pivotally attached to the indicator member such that it can be selectively pivoted relative to the indicator member to an attack angle such that the center of pressure indicia identifies a point on the second member which represents a corresponding point on the aircraft at which the center of pressure forces are applied thereto when flying at that selected attack angle.

9 Claims, 6 Drawing Sheets

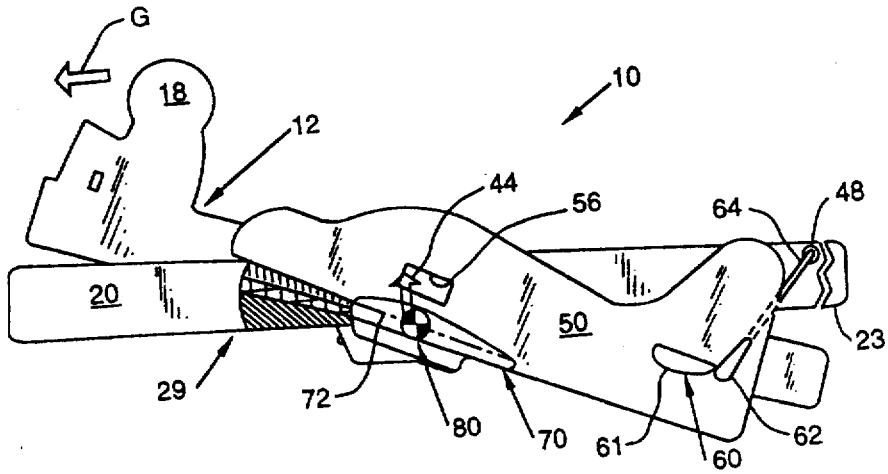

Figure 7:
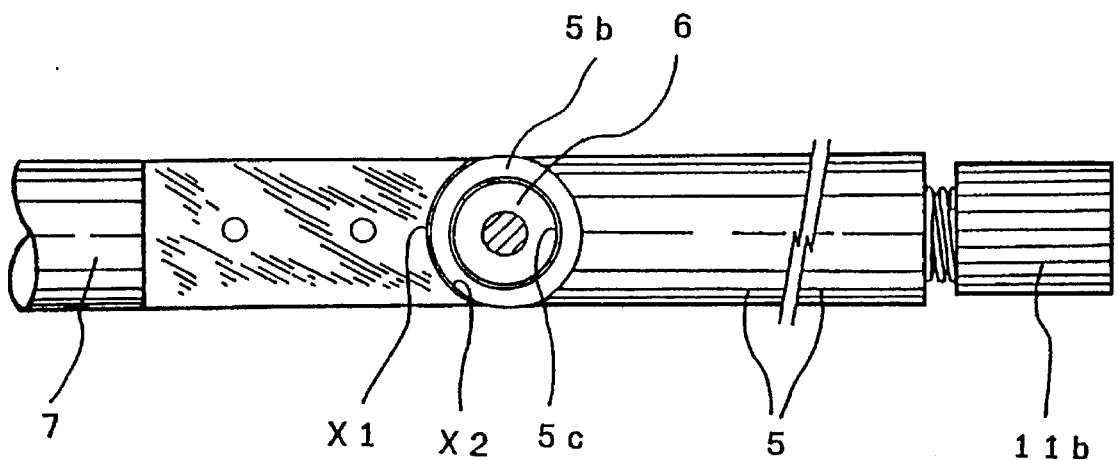
FIG. 7 is a side elevational view of a preferred wing member of the present invention.
Figure 8:
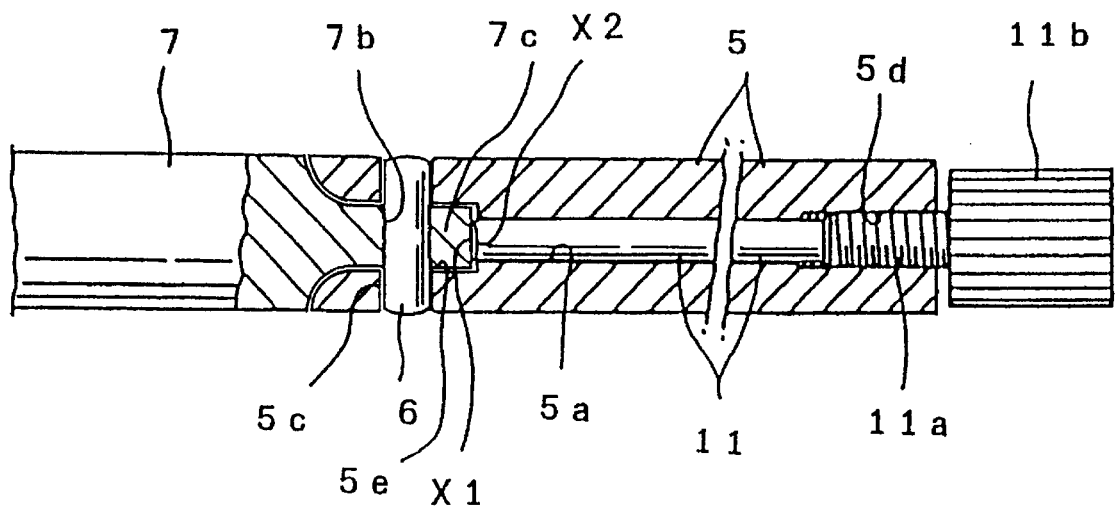
FIG. 8 is a side elevational view of a preferred center of gravity indicator of the present invention.

FIG. 7
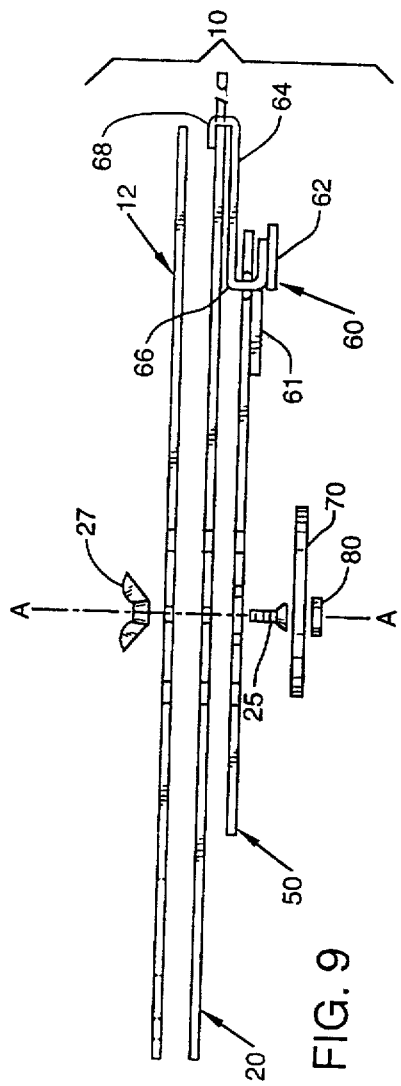
FIG. 8
FIG. 9